(12) United States Patent
Lutnick et al.

(10) Patent No.: US 8,321,323 B2
(45) Date of Patent: Nov. 27, 2012

(54) INTERPROGRAM COMMUNICATION USING MESSAGES RELATED TO ORDER CANCELLATION

(75) Inventors: Howard W. Lutnick, New York, NY (US); Dean P. Alderucci, New York, NY (US); Andrew Fishkind, New York, NY (US); Brian L. Gay, New York, NY (US); Kevin Foley, New York, NY (US); Mark Miller, Cambridge, MA (US); Charles Plott, Pasadena, CA (US)

(73) Assignee: CFPH, LLC, New York, NY (US)

( * ) Notice: Subject to any disclaimer, the term of this patent is extended or adjusted under 35 U.S.C. 154(b) by 638 days.

(21) Appl. No.: 12/257,499

(22) Filed: Oct. 24, 2008

(65) Prior Publication Data

US 2010/0106636 A1   Apr. 29, 2010

(51) Int. Cl.
G06Q 40/00 (2012.01)
G06Q 30/00 (2012.01)
(52) U.S. Cl. .................. 705/37; 705/26.3
(58) Field of Classification Search .......... 705/26, 705/35–37
See application file for complete search history.

(56) References Cited

U.S. PATENT DOCUMENTS

| | | | |
|---|---|---|---|
| 5,126,936 A | 6/1992 | Champion et al. | |
| 5,136,501 A | 8/1992 | Silverman et al. | |
| 5,799,287 A | 8/1998 | Dembo | |
| 6,377,940 B2 | 4/2002 | Tilfors et al. | |
| 6,532,460 B1 * | 3/2003 | Amanat et al. | 705/36 R |
| 6,938,010 B1 | 8/2005 | Everson et al. | |
| 7,124,110 B1 | 10/2006 | Kemp et al. | |
| 7,136,834 B1 | 11/2006 | Merrin et al. | |
| 7,155,409 B1 | 12/2006 | Stroh | |
| 7,349,879 B2 | 3/2008 | Alsberg et al. | |
| 7,392,214 B1 * | 6/2008 | Fraser et al. | 705/37 |
| 7,392,217 B2 * | 6/2008 | Gilbert et al. | 705/37 |
| 7,418,416 B2 | 8/2008 | Guidi et al. | |
| 7,430,533 B1 * | 9/2008 | Cushing | 705/37 |
| 7,565,313 B2 | 7/2009 | Waelbroeck et al. | |
| 7,567,932 B1 | 7/2009 | Salvadori et al. | |
| 7,627,519 B2 | 12/2009 | Burns | |
| 7,653,584 B2 | 1/2010 | Schmitz et al. | |
| 7,685,057 B2 | 3/2010 | Chiulli et al. | |
| 7,711,644 B2 | 5/2010 | Claus et al. | |
| 7,734,533 B2 | 6/2010 | Mackey et al. | |
| 7,752,116 B2 | 7/2010 | Ascher et al. | |
| 7,752,122 B2 | 7/2010 | Friesen et al. | |
| 7,761,364 B2 * | 7/2010 | Wunsch et al. | 705/37 |
| 7,778,919 B2 | 8/2010 | Waelbroeck et al. | |
| 7,827,085 B1 | 11/2010 | Hochenberger et al. | |
| 7,827,089 B2 | 11/2010 | Sweeting et al. | |
| 7,840,481 B2 * | 11/2010 | Aloe et al. | 705/37 |
| 7,908,206 B2 | 3/2011 | Waelbroeck et al. | |
| 7,921,054 B2 | 4/2011 | Balabon | |
| 7,970,695 B2 | 6/2011 | Bartko et al. | |
| 8,015,099 B2 | 9/2011 | Reid | |

(Continued)

OTHER PUBLICATIONS

"Transparency, Anonymity, Personalization—ITG executive Tony Huck on client concerns in a fragmented trading environment"; Aug. 11, 2008; Securities Industry News.*

Schmerken, Ivy; "Shedding light on dark algos: as brokers begin to code dark pool access into all of their algorithms, the buy side is demanding more disclosure into executions."; Apr. 2008; Wall Street & Technology.*

Sullivan, Wally et al.; "The enlightened dark pool: each of the major dark pools offers a different approach for finding liquidity and a corresponding risk of information leakage."; Apr. 2008; Wall Street & Technology.*

(Continued)

*Primary Examiner* — Ryan D Donlon

(57) ABSTRACT

A trading platform and trading method that allows access to additional pools of liquidity is described. Other embodiments are also described.

24 Claims, 26 Drawing Sheets

U.S. PATENT DOCUMENTS

| | | | |
|---|---|---|---|
| 8,073,760 B2 | 12/2011 | Somech et al. | |
| 2002/0023045 A1* | 2/2002 | Feilbogen et al. | 705/37 |
| 2002/0052827 A1 | 5/2002 | Waelbroeck et al. | |
| 2002/0169703 A1 | 11/2002 | Lutnick et al. | |
| 2003/0004859 A1 | 1/2003 | Shaw et al. | |
| 2003/0069826 A1 | 4/2003 | Guidi et al. | |
| 2003/0182214 A1 | 9/2003 | Taylor | |
| 2003/0182224 A1 | 9/2003 | Horrigan et al. | |
| 2004/0015429 A1 | 1/2004 | Tighe et al. | |
| 2004/0034591 A1 | 2/2004 | Waelbroeck et al. | |
| 2004/0059666 A1 | 3/2004 | Waelbroeck et al. | |
| 2004/0133495 A1 | 7/2004 | Bosch et al. | |
| 2004/0158519 A1 | 8/2004 | Lutnick et al. | |
| 2004/0177023 A1 | 9/2004 | Krowas et al. | |
| 2004/0210511 A1 | 10/2004 | Waelbroeck et al. | |
| 2004/0210512 A1* | 10/2004 | Fraser et al. | 705/37 |
| 2005/0055305 A1* | 3/2005 | Lutnick et al. | 705/37 |
| 2005/0075963 A1 | 4/2005 | Balabon | |
| 2005/0125327 A1 | 6/2005 | Fishbain et al. | |
| 2005/0166046 A1 | 7/2005 | Bellowin et al. | |
| 2005/0171891 A1 | 8/2005 | Daley et al. | |
| 2005/0187866 A1 | 8/2005 | Lee | |
| 2005/0273421 A1 | 12/2005 | Rosenthal et al. | |
| 2005/0283427 A1 | 12/2005 | Owens et al. | |
| 2006/0026090 A1 | 2/2006 | Balabon | |
| 2006/0031156 A1 | 2/2006 | Noviello et al. | |
| 2006/0031157 A1 | 2/2006 | Gianakouros et al. | |
| 2006/0129477 A1 | 6/2006 | Goodwin et al. | |
| 2006/0136318 A1 | 6/2006 | Rafieyan et al. | |
| 2006/0136326 A1 | 6/2006 | Heckman et al. | |
| 2006/0143099 A1 | 6/2006 | Partlow et al. | |
| 2006/0259394 A1 | 11/2006 | Cushing et al. | |
| 2006/0287944 A1 | 12/2006 | Fishbain et al. | |
| 2007/0005484 A1 | 1/2007 | Waelbroeck et al. | |
| 2007/0005488 A1 | 1/2007 | Keith | |
| 2007/0038548 A1 | 2/2007 | Schlifstein et al. | |
| 2007/0055607 A1 | 3/2007 | Wunsch et al. | |
| 2007/0083452 A1 | 4/2007 | Mayle et al. | |
| 2007/0100735 A1* | 5/2007 | Kemp et al. | 705/37 |
| 2007/0118460 A1 | 5/2007 | Bauerschmidt et al. | |
| 2007/0124228 A1 | 5/2007 | Elias et al. | |
| 2007/0150405 A1 | 6/2007 | Greenberg et al. | |
| 2007/0150408 A1* | 6/2007 | Camenisch et al. | 705/37 |
| 2007/0192227 A1 | 8/2007 | Fitzpatrick et al. | |
| 2007/0244783 A1 | 10/2007 | Wright et al. | |
| 2007/0244790 A1 | 10/2007 | Olsson et al. | |
| 2007/0244792 A1 | 10/2007 | Couperier | |
| 2007/0250433 A1 | 10/2007 | Bhat et al. | |
| 2007/0250438 A1* | 10/2007 | Fraser et al. | 705/37 |
| 2007/0288342 A1 | 12/2007 | Maclin et al. | |
| 2007/0294160 A1 | 12/2007 | Brown et al. | |
| 2008/0021803 A1 | 1/2008 | Ahles et al. | |
| 2008/0033867 A1 | 2/2008 | Hirani et al. | |
| 2008/0077523 A1* | 3/2008 | Fraser et al. | 705/37 |
| 2008/0082439 A1 | 4/2008 | Everaert et al. | |
| 2008/0133393 A1 | 6/2008 | Arnold et al. | |
| 2008/0172323 A1* | 7/2008 | Feilbogen et al. | 705/37 |
| 2008/0249959 A1 | 10/2008 | Mittal et al. | |
| 2008/0294544 A1 | 11/2008 | Harrington et al. | |
| 2008/0301061 A1 | 12/2008 | Kittelsen | |
| 2008/0306856 A1* | 12/2008 | Aloe et al. | 705/37 |
| 2009/0018968 A1 | 1/2009 | Ardell et al. | |
| 2009/0024512 A1 | 1/2009 | Reid | |
| 2009/0083137 A1 | 3/2009 | Tsai et al. | |
| 2009/0089197 A1* | 4/2009 | Barker et al. | 705/37 |
| 2009/0177543 A1 | 7/2009 | Ram et al. | |
| 2009/0210337 A1 | 8/2009 | Mahoney et al. | |
| 2009/0319417 A1 | 12/2009 | Littlewood | |
| 2010/0023458 A1 | 1/2010 | Kociuba | |
| 2010/0076887 A1* | 3/2010 | Cushing | 705/37 |
| 2010/0100472 A1 | 4/2010 | Drumma | |
| 2010/0241591 A1 | 9/2010 | Fishbain et al. | |
| 2010/0332379 A1 | 12/2010 | Ram et al. | |
| 2011/0066545 A1* | 3/2011 | Aloe et al. | 705/37 |
| 2011/0087581 A1 | 4/2011 | Ram et al. | |
| 2011/0166982 A1 | 7/2011 | Cole et al. | |
| 2011/0178914 A1* | 7/2011 | Waelbroeck et al. | 705/37 |

OTHER PUBLICATIONS

"Lifeguarding the pool" Aug. 7, 2008, Liquidnet.com; Available at: http://www.liquidnet.com/docs/howLiquidnetWorks/lifeguarding_highlevel_080708.pdf.*

Schmarken, Ivy; "Are You Being Gamed?—The buy side is pressing the sell side for more anti-gaming technology to prevent price manipulation in dark pools."; Oct. 1, 2008; Wall Street & Technology.*

"The Year in Trading"; Dec. 1, 2007; Traders Magazine.*

Schmarken, Ivy; "OnePipe Rolls Out Advanced Anti-Gaming Logic to Catch Suspicious Trades in Dark Pools"; Jul. 8, 2008; Avalable at: http://www.advancedtrading.com/crossingnetworks/208803136.*

PCT International Search Report and Written Opinion for Application No. PCT/US10/21986 filed Jan. 25, 2010; 8 pages.*

Harris, Larry; "Trading & Exchanges, Market Microstructure for Practitioners"; 2003; 7 pages.*

"Transparency, Anonymity, Personalization-ITG executive Tony Huck on client concerns in a fragmented tradinq Environment"; Aug. 11, 2008; Securities Industry News.*

U.S. PTO Office Action for U.S. Appl. No. 12/237,941; Sep. 16, 2011; 27 pages.

U.S. PTO Notice of Panel Decision for U.S. Appl. No. 12/494,438; Jun. 19, 2012; 2 pages.

U.S. Appl. No. 12/204,403 filed Sep. 4, 2008; 170 Pages.

U.S. Appl. No. 12/237,941 filed Sep. 25, 2008; 185 Pages.

U.S. Appl. No. 12/237,958 filed Sep. 25, 2008; 176 Pages.

U.S. Appl. No. 12/237,976 filed Sep. 25, 2008; 177 Pages.

U.S. Appl. No. 12/204,341 filed Sep. 4, 2008; 163 Pages.

U.S. Appl. No. 12/135,479 filed Jun. 9, 2008; 75 Pages.

U.S. Appl. No. 12/239,803 filed Sep. 28, 2008; 114 Pages.

U.S. Appl. No. 12/239,804 filed Sep. 28, 2008; 114 Pages.

U.S. Appl. No. 12/257,499 filed Oct. 24, 2008; 169 Pages.

U.S. Appl. No. 12/358,753 filed Jan. 23, 2009; 163 Pages.

U.S. Appl. No. 12/358,768 filed Jan. 23, 2009; 165 Pages.

U.S. Appl. No. 12/494,438 filed Jun. 30, 2009; 169 Pages.

U.S. Appl. No. 12/631,181 filed Dec. 4, 2009; 169 Pages.

U.S. Appl. No. 12/631,208 filed Dec. 4, 2009; 167 Pages.

Schmerken, Ivy; "Credit Suisse Introduces Block Algos to Tap Liquidity in CrossFinder ATS and Other Venues Simultaneously"; Advanced Trading; Mar. 18, 2010; 2 pages.

"Official Launch of New York Block exchange announced"; Automated Trading News; Jan. 30, 2009; 1 page.

US PTO Office Action for U.S. Appl. No. 12/204,341 dated Oct. 26, 2010; 31 pages.

US PTO Office Action for U.S. Appl. No. 12/135,479 dated Apr. 4, 2011; 6 pages.

U.S. PTO Office Action for U.S. Appl. No. 12/239,803; Sep. 15, 2011; 40 pages.

U.S. PTO Office Action for U.S. Appl. No. 12/631,208; Oct. 27, 2011; 15 pages.

U.S. PTO Office Action for U.S. Appl. No. 12/631,181; Dec. 22, 2011; 12 pages.

"Transparency, Anonymity, Personalization-ITG executive Tony Huck on client concerns in a fragmented trading Environment"; Aug. 11, 2008; Securities Industry News.

U.S. PTO Office Action for U.S. Appl. No. 12/237,958; Mar. 9, 2012; 66 pages.

U.S. PTO Office Action for U.S. Appl. No. 12/204,341; Jan. 31, 2012; 47 pages.

U.S. PTO Office Action for U.S. Appl. No. 12/239,803; Apr. 9, 2012; 49 pages.

U.S. PTO Office Action for U.S. Appl. No. 12/239,804; Mar. 19, 2012; 39 pages.

U.S. PTO Office Action for U.S. Appl. No. 12/494,438; Apr. 1, 2011; 12 pages.

U.S. PTO Office Action for U.S. Appl. No. 12/494,438; Nov. 16, 2011; 12 pages.

* cited by examiner

AQUA 〇〇〇

BUY  SIVB  48.30 x 48.34
            Symbol  100 - 500

500,000  MIDPOINT  DAY
Size     Price     Time in Force 500,000  .01       48.32
Minimum Fill  Increment  Limit Show Full Size ☑

SUBMIT    CANCEL 50,000  [ 65% ]  750,000
                    |
                   801

FIG. 8

SIVB
SVB Financial Group 500,000
Size 150,000
Minimum Fill

FIRM OFFER (BROKER)
48.30 x 48.34  100 - 500

48.32
Price

:15
Shot Clock

BUY

IGNORE

Notify Me At:  48.32  or:  15:30
              Price        Time

FIG. 10

| 410 | 412 | 414 | 416 | 418 | 420 | 422 | 424 | 426 | 428 | 430 |
|---|---|---|---|---|---|---|---|---|---|---|
| ORDER ID | TRADER ID | ORDER STATUS | ORDER LAST UPDATE TIME | TRANSACTION TYPE | SECURITY SYMBOL | SECURITY TYPE | ORDER TYPE | LIMIT PRICE | TOTAL ORDER SIZE | QUANTITY PLACED ELSEWHERE |

400

FIG. 18

INTERPROGRAM COMMUNICATION USING MESSAGES RELATED TO ORDER CANCELLATION

CROSS-REFERENCE TO RELATED APPLICATIONS

Brief Description of the Drawings

FIG. 8 illustrates an example order entry interface;

FIG. 10 illustrates an example interface for presenting order query information.

DETAILED DESCRIPTION

Figure 1:
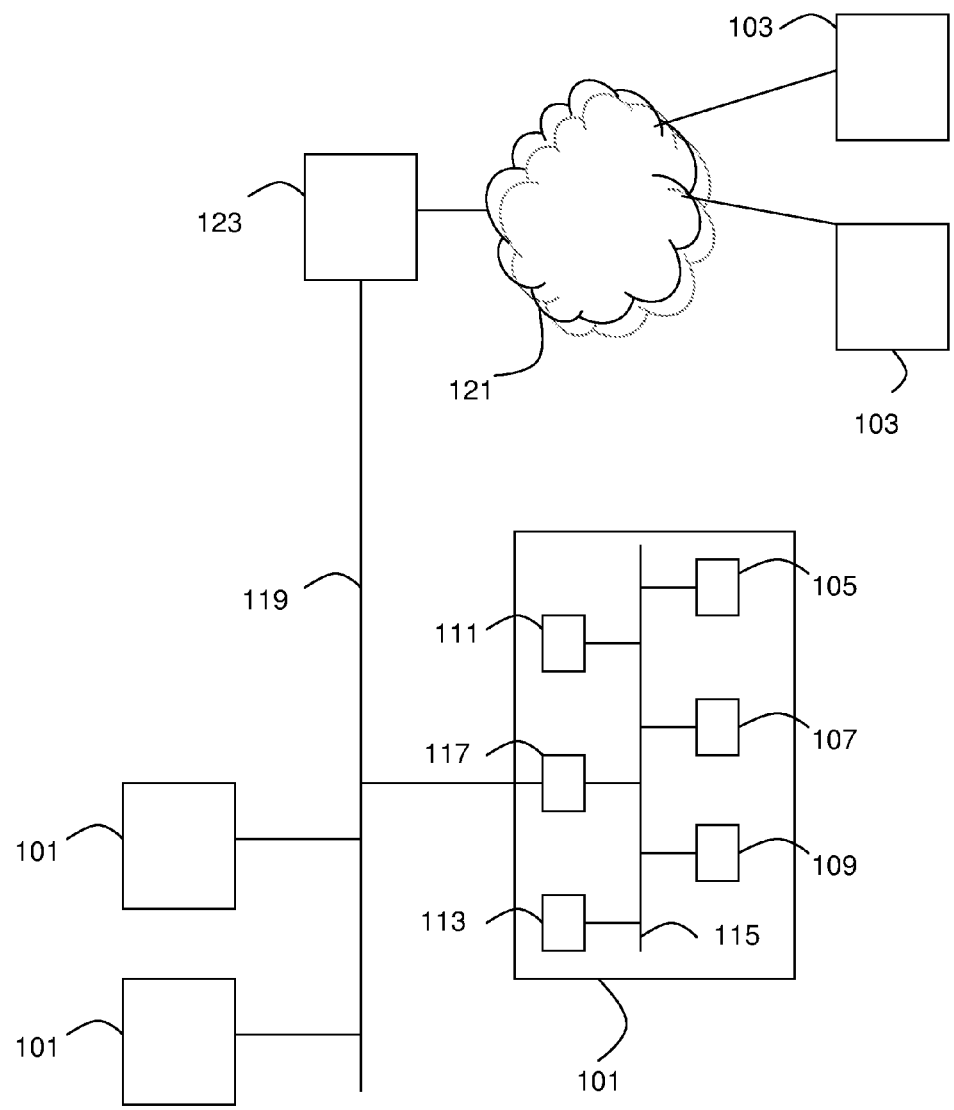
FIG. 1 illustrates an example computer system.

The following sections I-X provide a guide to interpreting the present application.

I. TERMS

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

The term "facilitating" and like terms may include any action or set of actions which help to bring about a result. Throughout this disclosure, examples of facilitation may be given. Such examples should be interpreted as non-limiting examples only.

An order query should be understood to include information that, when interpreted by a computer module, identifies an order for which a trade related action is desired. Such information may be interpreted by the computer module for use in querying stored information such as a database of stored order information.

A query should be understood to include information form which a question may be determined.

A computer module should be understood to include any combination of hardware and/or software.

A firm order should be understood to include an order for a financial instrument, for which a system will execute a trade with a matching order without additional intervening authorization from an originator of the firm order.

A financial instrument should be understood to include an instrument that evinces ownership of dept or equity, and/or any derivative thereof, including equities, stocks, fixed income instruments, bonds, debentures, certificates of interest or deposit, warrants, options, futures, forwards, swaps, or generally any security.

Although some embodiments are described with reference to Order Management Systems, which are understood in the art, it should be understood that other embodiments may include an order information system. An order information system should be understood any system through which information about orders to purchase and/or sell financial instruments is stored, including, for example, order management systems.

Two things should be understood to match if they share one or more properties. The exact properties shared may be different among various embodiments. Some example properties may include, a type of financial instrument (e.g., industry, capitalization, risk, etc.), a security identifier (e.g., stock symbol, etc.), an amount of shares, a price, etc.

A representation of a thing includes any indication from which a part of an underlying thing may be derived.

Enabling should be understood to include allowing an action to occur. An action may be enabled by, for example, providing/activating a mechanism (e.g., a button or other control) through which the action may be performed (e.g., by clicking a button or otherwise activating another control).

Binding acceptance of an order should be understood to include an acceptance of a trade fulfilling at least part of the order that does not allow for further intervention in the execution of the trade and without the ability to revoke the acceptance (e.g., without the ability to revoke the acceptance in any way, without the ability to revoke the acceptance without a penalty).

An acceptance of an order should be understood to include an agreement to participate in a trade fulfilling at least part of the order.

Suppressing evidence should be understood to include attempting to prevent others from discovering evidence. Suppressing evidence of a situation or action may include not disseminating information about the situation or action, disseminating false or misleading information about the situation or action, disseminating false or mislead information at other times to obscure the dissemination of information about the situation or action, and/or any other desired actions.

Facilitating execution of a trade should be understood to include performing any actions that help to bring about the execution of a trade. The actions may include, for example, actually executing the trade, transmitting a request for the execution of the trade, transmitting any information that helps to bring about the trade, and/or any other actions.

A marketplace should be understood to include a platform through which at least the following actions are performed: order execution is facilitated, indications of orders are accepted, and matches for the orders are sought.

Applying a filter to a set of things should be understood to include generating a subset of the set of things in which each thing in the subset has one or more desired properties.

A trade should be understood to fulfill part of an order for one or more things if the trade includes transfers of ownership of at least a portion of the one of more thing in accordance with the order. Fulfilling may include bringing a trade into effect.

A participant system should be understood to include any system that allows an order management system to interface with a marketplace.

II. DETERMINING

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. FORMS OF SENTENCES

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. DISCLOSED EXAMPLES AND TERMINOLOGY ARE NOT LIMITING

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. COMPUTING

It will be readily apparent to one of ordinary skill in the art that the various processes described herein may be implemented by, e.g., appropriately programmed general purpose computers, special purpose computers and computing devices. One or more such computers or computing devices may be referred to as a computer system. FIG. 1 illustrates an example computer system. The computer system comprises a plurality of server computers 101 and client computers 103. Typically a processor 105 (e.g., one or more microprocessors, one or more microcontrollers, one or more digital signal processors) will receive instructions (e.g., from a memory 107 or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks 109 and other persistent memory. Volatile media include dynamic random access memory (DRAM) 111, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

A computer system may also include one or more input/output devices 113. Such input/output devices may include monitors, keyboards, mice, and r any other desired devices.

Some computer systems may include transmission medium 115, which may be referred to as a communication network, that couples various internal components of the computer system. Such a communication network may also be referred to in some implementations as a computer bus. Some computer systems may include a specialized input/output device 117 configured to connect to an external communication network. Such a device may be referred to as a network interface. The external communication network may include a LAN 119 and/or the Internet 121. In some implementations, an edge routing device 123 may operate between a LAN and another network like the Internet 121. Such a device may include a firewall and/or any other desired security mechanism.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium®, Core, or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. CONTINUING APPLICATIONS

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, PARAGRAPH 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. DISCLAIMER

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. INCORPORATION BY REFERENCE

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. PROSECUTION HISTORY

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. SAMPLE EMBODIMENTS

Information about orders for good or service may be tracked by an order management system (OMS). An order management system may include data regarding desired, contemplated, open, completed, considered, ongoing and/or other order. One typical order management system used in securities trading includes the Fidessa Order Management System. Although this order management system and embodiments below focus largely on the trading of securities (e.g., stocks, bonds, futures, options, derivatives, etc.), it should be recognized that other embodiments may be used in connection with the trading of any goods and/or services whether tangible (e.g., food, oil, collectibles, etc.) or intangible (intellectual property rights, contract performance, etc.).

Information that is stored by an OMS may identify a specific security that is desired (e.g., by a user of the OMS, by a client of the user of the OMS, etc.), a type or class of security that is desired, an amount or range of amounts of a security that is desired, a desired price, price range, and/or pricing method to be used to buy the security, a limit on a desired price associated with a limit order for the security, a security to be sold, a price, price range, and/or pricing method to be used to sell a security, a security desired or available to be sold (e.g., long and/or short sale), an amount of a security to be sold, contingent buying and/or selling information (e.g., information identifying a purchase to be made if some contingent event occurs, information setting amounts based on a contingent price, etc.), and/or any other information.

Pricing policies may include any desired pricing policy supported by a trading system. In some embodiments, such a pricing policy may include, for example, midpoint pricing in which prices are based on a midpoint between a national best offer and national best bid, limit pricing in which a maximum or minimum price level cannot be passed, midpoint pricing subject to such a limit, volume weighted average pricing in which the weighted average price over a trading period is the bases of the price. Any other methods or combinations of pricing policies may be used.

Market liquidity, a measure a securities ability to be bought and/or sold readily through a market, is recognized as a factor that may affect prices at which securities are traded. For example, one may have a more difficult time selling an illiquid security because potential buyers may fear they will be unable to resell the security after purchase. Such fear may artificially lower the price of the sale of the security from the true market value of the security to help alleviate the fears of such potential buyers. Accordingly, a more liquid market may facilitate trading of securities at their fair market values or closer to their fair market values than they would be traded at in a less liquid market.

In some markets, information identifying orders (e.g., bids, offers, etc.) that is stored by order management systems, or otherwise stored internally by a trading organization or trader, have not traditionally been thought of as liquidity available to the market. Rather, such orders typically add to the liquidity of those markets only when they are made public to the market so other traders in the market may act against those orders. Such secret orders may be referred to as "dark pools" or "dark books" of liquidity because they remain unseen by such markets.

It is recognized that enabling trading to take place using such orders may improve the liquidity of a market and thereby allow more trades to occur through a market and/or allow trades to occur at a price closer to or at a fair market value.

It is recognized that one problem that may be associated with using such orders in a market includes a potential that information associated with the existence of otherwise secret orders may be used to influence a market and/or to diminish an advantage attributable to the originator of the information (e.g., some insight, knowledge, trading algorithm, etc.). In typical markets, when bids and offers match, a negotiation may take place between a buyer and a seller before any transaction is finalized. Such negotiations typically include revealing the existence of a matching party, information about a matching order associated with the matching party, and/or the identity of the matching party to both parties involved in the negotiation. By revealing this information, the potential to "game the market" (e.g., artificially affect a market using knowledge of the existence of orders of other people) is increased and the possibly secret knowledge embodied by the orders may be made public. For example, a trader may end a negotiation by refusing an order in a negotiation. The trader may subsequently use the knowledge that the matching party is interested in a transaction related to the security to increase or decrease the price of the security by entering one or more other orders at higher or lower prices and/or use the knowledge embodied by the order to adjust otherwise adjust a trading strategy.

It is recognized that as the size of orders increases, the chances that a trader associated with such orders is trying to game the market may decrease. Accordingly, it is recognized that trading large blocks of liquidity may decrease the probability that gaming is occurring. It is also recognized that if a trader agrees to have an order executed without a negotiation, without receiving notification before the execution, and/or otherwise automatically, the chance that the trader is trying to game the market is also decrease. Furthermore, it is recognized that if anonymity of trading partners is maintained for part or all of a trading exchange, the chances of gaming the market are also reduced. Accordingly, participants in securities markets, such as buy and/or sell side participants) may be more willing to participate in markets with one or more such characteristics. Further, such participants may be more willing to allow orders present in OMS to add liquidity to such markets. Markets with such characteristics may, for example, allow large blocks of securities to be moved relatively quietly compared to traditional trading mechanisms.

It is recognized that in some markets, such as typical securities markets, participants exist in an asymmetrical relationship. For example, participants known as sell side firms in securities markets generally act as retail brokers and researchers for investors. Participants known as buy side firms in securities markets generally include investment institutions that tend to buy and/or sell large amounts of securities for money-management purposes and keep information about their trading intentions secret. Accordingly, the desires of these participants may not be identical. Some embodiments may be configured to treat differently participants with different characteristics in an attempt to balance desires of the different participants.

Some embodiments of a trading system may allow access to what might be traditionally untapped pools of liquidity (e.g., orders in OMS systems). Such systems may provide asymmetric access rules to such information to accommodate desires and/or preferences of market participants. Such systems may include anonymity policies, order size restrictions, incentives, filtering policies, and/or automatic execution of types of orders to encourage participation.

Some embodiments may read information from an OMS or other source of orders associated with a buy side market participant. Information regarding such orders may be used to match information from other market participants with one or more element of anonymity, automatic order execution, and/or order size policy implementations. In some embodiments, the information may be narrowcast to potential counter parties for matching with orders associated with the OMS of those parties. Accordingly, market participants, such as sell side participants and buy side participants can submit orders, both firm orders and OMS orders that add liquidity to a market, with a degree of privacy and/or a security that the market is not being gamed by other participants. A participant may include a person and/or machine that interfaces in some way with a marketplace to engage in trading. A participant may include an OMS, a computer that interfaces with an OMS, and/or any other type of computer or trading-related apparatus.

In some embodiments, firm orders (i.e., orders for which participants agree to automatic order execution with matching orders) may be viewed anonymously by those unlikely to abuse the information, and/or by nobody at all. In some implementations, such participants may include buy side participants who may view information about firm orders if a matching order exists in an OMS associated with a respective buy side participant. In some implementations, such participants may include participants for which matching firm orders exist (e.g., have been submitted to a trading system). By limiting the viewing of such information, trading of high quality block liquidity using pools of liquidity currently not available may be encouraged.

In some embodiments, control over one or more aspects of disclosing information about orders in an OMS may reside with buy side originators of the orders. In some embodiments, sell side participants or other buy side participants that enter a firm order matching an order in a buy side participant's OMS may only be notified of the existence of such a matching order if the buy side participant with the order in its OMS agrees to such notification, and/or agrees to an execution of a trade. In some embodiments, the sell side participants or other buy side participants may not be notified of the identity of the buy side participant at all, but rather only be notified that some matching order was found and/or executed.

Example Structures

Figure 2:
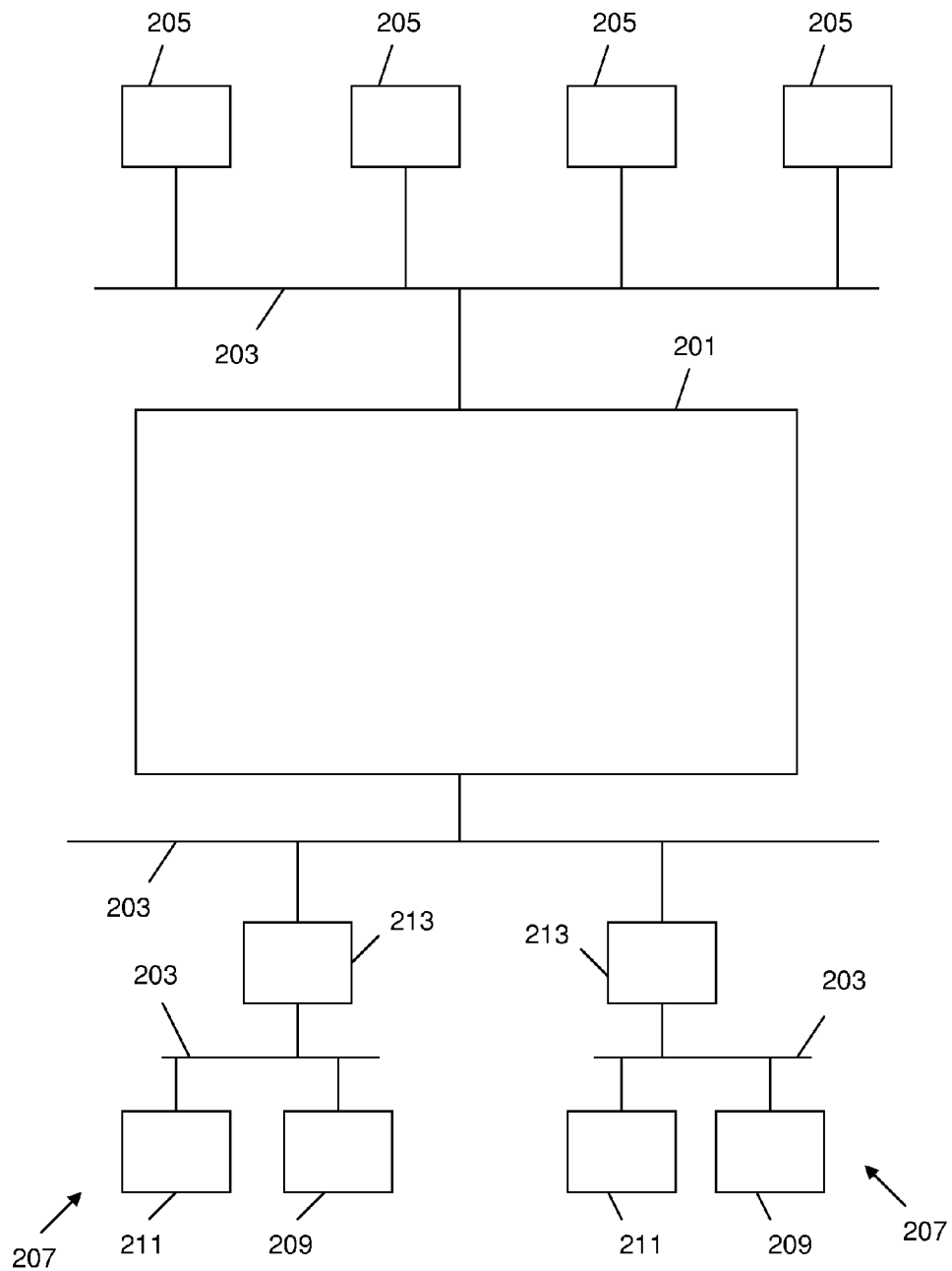
FIG. 2 illustrates an example trading system configured to perform one or more trades.

FIG. 2 illustrates one example trading system configured to perform one or more trades. As illustrated, the trading system may include a plurality of computer systems at one or more locations. The illustrated embodiment includes a central system along with a plurality of remote computer systems. Other embodiments may include different numbers, arrangements and/or types of computer systems. For example, some embodiments may include fewer or no remote computer systems. Some other embodiments may include a more distributed or fully distributed system such as one without any central system or with a limited central system.

The central system 201 or a place at which orders are executed may be called a "marketplace". In some embodiments, various actions, such as firm order querying, firm order matching, providing indications of firm orders/firm order matches, receipt of indications that firm order queries/firm order matches exist and/or any other desired actions may occur, for example, upstream from such a marketplace.

As illustrated, the trading system may include a central system 201. The central system 201 may include one or more computer systems, each configured to perform one or more processes. Such computer systems may receive, transmit, and/or process information as desired. In some implementations, the central system 201 may be configured to perform actions including receiving information relating to orders (e.g., firm orders), matching firm orders, executing trades, facilitating the execution of trades, clearing orders, facilitating the clearing of orders, communicating with remote systems, settling orders, reporting trades, querying remote systems to determine if matching order exist, querying processes or databases to determine if matching orders exist, and/or any other desired actions.

In some embodiments, the central system 201 may be distributed among a plurality of regional hubs. Such distribution may allow a trading system to span a very large geographic area through which a very large number of trades may be routed. Such regional hubs may include duplication and/or distribution of functionality.

In some embodiments, the central system 201 may be responsible for facilitating one or more functions typically referred to as "back office" functions. For example, the central system 201 may facilitate clearing of trades, settling of trades, reporting of trades, credit checking of participants, other functions required for compliance with rules and regulations, and/or any other desired functions.

In some embodiments, the central system 201 may include a firm order matching system. Such a system may be configured to determine if firm orders match other firm orders and/or perform other functions related to such firm order matching. In some embodiments, the central system may include an order router matching module. Such a module may be configured to route order queries to one or more participants and/or perform any desired actions associated with OMS orders. In some embodiments, the central system may include a regulation NMS system. Such a system may interface with one or more other securities markets to find better pricing options for an order. Such action may be required in some embodiments because of securities regulations.

In some embodiments, the central system may be coupled to one or more remote systems by a communication network 203. The communication network 203 may include the Internet, one or more local area networks, and/or any other desired communication medium. The communication network 203 may allow the central system to transmit and/or receive information to and/or from remote systems, such as computer systems associated with market participants. In some embodiments, communication between systems, modules, processes, and/or programs may include the use of Financial Information eXchange messaging. Such messaging may be encrypted or not as desired. In some embodiments, one or more firewalls or other security device may be included in the communication network 203.

In some embodiments, system 200 may include one or more sell side computer systems, each indicated by 205. The sell side systems 205 may include one or more trading computers configured to accept information regarding security offers (e.g., firm orders to buy and/or sell securities). The sell side systems 205 may be configured to receive, send, and/or processes information. In some embodiments, the sell side systems 205 may be configured to transmit one or more indications of such orders to the central system 201 over the communication network 203. In some distributed embodiments, the sell side systems 205 may be configure to transfer information to one or more other sell side systems 205 and/or buy side systems 207. In some embodiments, the sell side systems 205 may be configured to receive information identifying a completed order execution (e.g., from the central system 201) and may provide an indication of such an indication to a user (e.g., through a trading interface). In some embodiments, the sell side systems 205 may be configured to interact with the central system 201 or an otherwise distributed system. In some embodiments, a separate computer system may act as an interface between the central system 201 or otherwise distributed system and the rest of the sell side system 205. Although the sell side systems 205 are shown as a single system, it should be recognized that any number of computers may be used to perform any desired functions of a sell side system.

Some embodiments may include one or more buy side systems, each indicated at 207. In some embodiments, all or part of the buy side systems 207 may be located with a buy side market participant. In some embodiments, all or part of the buy side systems 207 may be distributed or located at a central location, such as with central system 201.

In some embodiments, the buy side systems 207 may include one or more trader systems, each indicated at block 209. The trader systems 209 may provide an interface to one or more traders through which information may be obtained or provided. Traders, for example, may enter order information and/or receive indications associated with orders through a trader systems 209.

In some embodiments, the buy side systems 207 may include one or more OMS systems 211. The OMS systems 211 may perform one or more functions typically performed by an OMS. Such functions may include storing order information, providing order information to trader computers, and/or any other desired functions. As mentioned above, one example OMS system includes the Fidessa OMS system.

In some embodiments, the buy side systems 207 may include one or more participant systems 213. In some embodiments, the participant systems 213 may act as an interface between the central system 201 or an otherwise distributed system and the rest of the buy side system 207. In some embodiments, the participant system may perform function related to trading, such as storing order information, receiving firm order queries, executing orders, facilitating execution of orders, clearing orders, facilitating clearing of orders, transmitting order information, determining if matching orders exist, providing indication regarding order queries, searching existing orders, determining if an order is a firm order or a OMS order, and/or any other desired functions. Participant systems may enhance the functionality of traditional OMS systems by allowing otherwise unavailable pools of liquidity to become available to a market. In various embodiments, participant systems may query an OMS for updated information (pull information from the OMS), may receive updates from the OMS as information in the OMS changes (information may be pushed from the OMS), and/or synchronize with an OMS in any desired way.

In some embodiments, participant systems 213 may query (e.g., periodically, randomly, etc.) OMS systems 211 to generate a copy of an OMS database. In some embodiments, the OMS systems 211 may send information to the participant systems 213 in response to such queries and/or without any querying taking place. Such information may include indications of orders in the OMS database (e.g., updates of prior orders, changes to orders, deletions of orders, new orders, complete database copies, etc.) In some embodiments, a participant system 213 may directly access the OMS database (e.g., without the need to make a copy) of the OMS system 211, such as by querying the database. In still other embodiments, the OMs system and participant system may be a single system, and such distinctions may not be relevant.

In some embodiments, buy side order information may be maintained in confidence on buy side systems, which may be located on respective buy side participants' premises. By so maintaining the information, buy side participants may feel more secure about the use of such information for trading and be less worried about potential information leakage.

In some embodiments, one or more software modules may act as part of an OMS system 211 to provide some or all buy side functionality. Such modules may exist in addition to and/or as an alternative to the participant system 213. For example, the module may include an update to an OMS software or a companion program to an OMS software program.

Although FIG. 2 shows OMS systems, participant systems and trading systems as separate systems, it should be understood that any configuration of systems may be used. For example a single system may operate as all or part of any other systems (e.g., a single system may act as an OMS system and a participant system, etc.) Furthermore, various systems may share information and/or distribute the performance of functions. For example, an OMS system may maintain an order database that may be read by one or more or a trading system, a participant system, and/or any other desired system.

In some embodiments, one or more of the buy side or sell side systems may include mobile devices. Such mobile devices may include laptop computers, PDAs, cellular telephones, and/or any other desired mobile device.

In some embodiments one or more software modules may act as companions and/or replacements to trading interface software and/or OMS software. Such companion or replacement software may include additional and/or different options from traditional interface and/or OMS software.

Although FIG. 2 shows buy side systems 207 and sell side systems 205 as connected to separate parts of communication network 203, it should be understood that such systems may be connected to a same network such as the Internet or any other communication network.

In some embodiments, one or more participants may use a virtual OMS rather than a traditional OMS. It should be understood that reference to an OMS includes reference to such a virtual OMS. A virtual OMS may include a system that acts as a dedicated OMS for a plurality of participants, but in reality is a shared system. For example, in some implementations, a virtual OMs may include a system that is remote from a participant and accessed over the Internet. The system may include a separate database for each such participant for tracking typical OMS information. It should be understood that some systems may include a single database with a participant identifier, and/or any other method of storing information that may be used in providing virtual OMS services to participants. The use of a virtual OMS may provide a participant with OMS services without the need to maintain and/or purchase a dedicated OMS system.

Example System Processes

Figure 3:
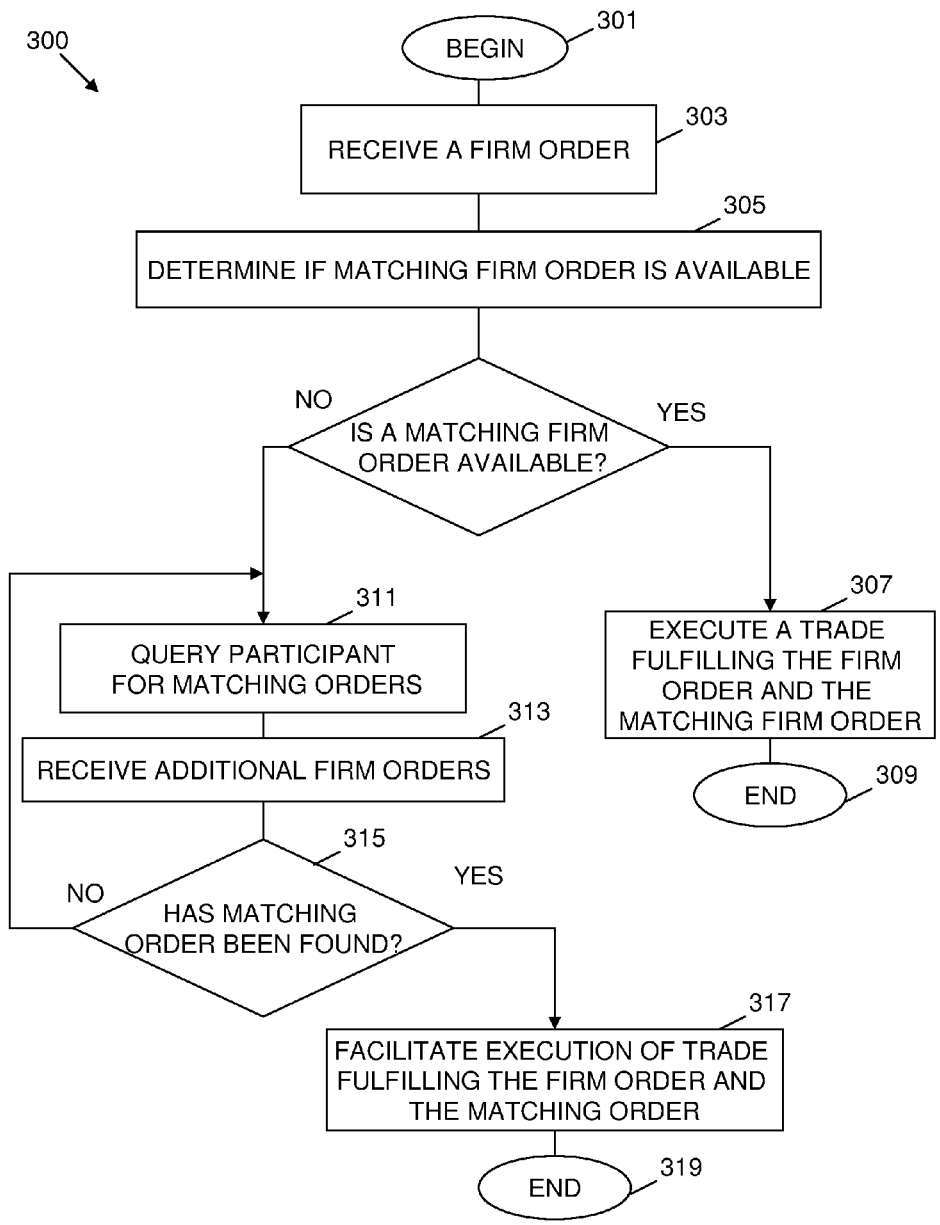
FIG. 3 illustrates an example process that may be performed by one or more trading systems.

FIG. 3 illustrates an example process 300 that may begin at block 301. In some embodiments, process 300 may be performed by the central system 201. In other embodiments, process 300 may be performed by one or more distributed computer systems.

As indicated at block 303, process 300 may include receiving an indication of an order. In some implementations, the order may be a firm order. In some embodiments, such an indication may be considered a binding indication on the part of the firm order submitter. For example, central system 201 may receive an indication of such an order from a buy side system (e.g., 207) and/or a sell side system (e.g., 205). Such orders may be entered, for example by a trader using a trading interface at a buy or sell side firm. The indication of the firm order may identify that an originator of the order is committed to a transaction (e.g., a bid, offer, etc.). In some embodiments, an indication of an order may indicate an amount of a security to buy or sell, a time for a firm order to remain open, a price at or around which to buy the security, a limit price, a pricing method, an order identifier, and/or any other information. The order may define a side of a trade for a financial instrument. A side of a trade for a financial instrument may include one of a desire to buy a financial instrument and a desire to sell a financial instrument.

As indicated at block 305, process 300 may include determining if any matching firm orders are available. A matching order may include an order that includes complementary terms to the firm order. Such terms may include a security, an amount, a price, a time frame, and/or any other desired information. For example, the firm order may indicate that 10,000 shares of eSpeed stock should be purchased at an average price of $100.00 per share. A prior firm order may have been received that indicates 10,000 shares of eSpeed stock should be sold at an average price of $100.00 per share. The prior eSpeed order may be determined to match the later eSpeed order in such a situation. In some embodiments, orders within a price range, below a maximum price, above a minimum price, and/or matching in any other desired ways may also be determined to be matching. In some embodiments, orders for a larger number of smaller number of shares may be determined to be matching. In some embodiments, an indication of a firm order may identify a minimum and/or maximum order size/percentages for which other firm orders may be determined to be matching.

In some embodiments, multiple orders may be determined to be matching according to some priority mechanism so that a total number of shares of all matching orders sums to at least as much as a number indicated by the firm order indication. In some embodiments, in which multiple orders are determined to be matching, a priority may be assigned to some of the orders based one or more characteristics of the orders, an originator of the orders, and/or any other characteristic.

In some embodiments, a matching firm order may have been received from a buy or sell side system. Such a matching order may have been stored on a machine readable medium (e.g., a disk drive of the central system 201). Determining if a matching firm order has previously been received may include searching a database or other listing of previously received firm orders. Such a database may be keyed to allow quick lookup, such as by security identifier (e.g., stock symbol).

Some embodiments may include maintaining a listing of firm orders. Such a listing may include a database. Maintaining the listing may include adding newly received firm orders to the listing, deleting fulfilled firm orders from the listing, deleting expired firm orders from the listing, and/or any other desired actions.

As indicated at block 307, if one or more matching firm order is determined to exist, the execution of some or all of those matching firm orders may be facilitated to fulfill the received firm order. Each such matching orders may fully or partially fulfill the received firm order. Facilitating the execution may include performing an exchange of money for a security, clearing such an exchange, transmitting information to a remote execution and/or clearing service, notifying participants, and/or any other desired action. A trade may be facilitated at a price and/or with a quantity that may be identified from a query.

In some embodiments in which multiple matching orders exist, the matching orders may be matched to the received firm order based on any desired prioritizing mechanism. Such prioritizing mechanism may include prioritizing based on price of security, first come first serve, priority given to older and/or most active originators of orders, large orders may be matched first, priority given to closest match in price and/or size, a round robin system, and/or any other desired prioritizing method. In some embodiments, multiple orders may be combined together to fully fulfill as many existing offers as possible. In some embodiments, part of each matching order may be fulfilled. The part may correspond to some characteristic of the order or order originator, such as order size, loyalty of originator, activeness of originator, actual price compared to desired price, etc.

In some embodiments, process 300 may end at block 309 if a matching firm order is found. In some embodiments, if one or more matching firm orders exist but do not completely fulfill the received firm order, execution of the matching firm order may be facilitated, and a remaining balance of the firm order may be treated as if no matching firm order had been found (e.g., may continue as described below with a firm order that includes only the left over order amount).

In some embodiments, as indicated at block 311, process 300 may include querying one or more participants to find a matching order. In some embodiments, querying the participants may include transmitting one or more requests from a central system (e.g., 201) to a buy side system (e.g., 207). In other embodiments, querying the participants may include transmitting requests from a computer of a distributed system to another computer of the distributed system, such as from one buy side participant to another, or one sell side participant to a buy side participant, etc. In some embodiments, such querying may continue from one participant to another participant in a tree like fashion in which one or more participants queries one or more further participants which may themselves continue querying further participants and so on. Such action may be taken if no matching firm order was found or an incomplete set of matching firm orders was previously found as described above. In still other embodiments, querying may include transmitting requests to other processes, threads, memory locations, portion of a computer program, etc. executing by a single system, such as central system 201 or multiple systems, such as a distributed system.

Systems associated with market participants (e.g., buy side system 207, participant systems 205, 207) may be configured to accept requests and determine if matching OMS orders exist. In some situations, which are discussed in more detail below, some such systems may respond to a query indicating that a match exists. In some implementations such a response may include an indication that the trade has already been executed and/or cleared (e.g., by a remote system to which a request was transmitted, some other system, etc.).

In some embodiments, the act of querying and/or some or all response that may be received may be concealed and/or otherwise suppressed from an originator of the firm order and/or any other individual. For example, if a negative response is received, such a response may not be revealed to the originator of the firm order. In some embodiments, as discussed below, only a positive response may be revealed. In some embodiments, negative response may be eliminated or otherwise suppressed. By limiting responses, actions may be kept secret from originators of the order and the participants may be granted an additional level of anonymity, thereby encouraging them to participate in the trading system because the opportunity and/or chances to game the market may be reduced.

As indicated at block 313, process 300 may include receiving additional firm orders from various other firm order sources such as buy side and/or sell side participants. Such receipt of new firm orders may occur substantially simultaneously as the querying of participants. Such new firm orders may be compared with the received firm order from block 303 to determine if they are matching, similar to the description above with respect to block 305.

As indicated at block 315, process 300 may include determining if a matching order is found. Finding a matching order may include receiving a new firm order from another source and/or receiving a response from a participant that a matching order exists.

If no matching order is determined to exist, process 300 may loop back to block 311. In various embodiments, the participants may be queried periodically. The period may be any length, such as 30 seconds, 30 minutes, a random length, a length based on some characteristic of a trader and/or order, etc. In various embodiments, participants may be queried until either a match is found, a matching firm order is received, a time period associated with the firm order expires, the firm order is revoked, and/or any other desired length of time.

If one or more matching orders is determined to exist, process 300 may include facilitating execution of a trade fulfilling the firm order and the one or more matching orders as indicated at block 317. In some embodiments, facilitating may include executing a trade, clearing a trade, transmitting indications that execution or clearing of a trade should be performed by a remote system, and/or any other desired actions. In some embodiments, execution of the trade may occur at a remote server, such as one or more servers at which a firm order match is found (e.g., a buy side system, etc.), and/or a central system, such as central system 201.

In some embodiments, a matching order may not fulfill a whole firm order. In such situations, process 300 may continue to search for matching orders, e.g., by querying remote servers and awaiting new firm orders in a loop to block 311.

In some embodiments, multiple matching orders may be found within a relatively short period of time. For example, multiple firm orders may be received and/or multiple OMS orders may be found at participants within a relatively short period of time. Such a time period may be any amount of time desired, such as 1 second, 1 minute, etc.

In various embodiments, order execution with such matching orders found within such a short period of time may be based on some desired set of priorities. In such embodiments, matching orders found within the short period of time may be treated as if they were found simultaneously and executed based on some other priority mechanism. For example, firm orders may be executed first, or orders found through querying participants may be executed first, first entered orders may be executed first, larger orders may be executed first, smaller orders may be executed first, older orders may be executed first, newer orders may be executed first, best customers may have their orders executed first, highest ranked customers may have their orders executed first, customers willing to be charged a fee may have their orders executed first, and/or any other method may be used to determine execution order. In other embodiments, order execution may be based strictly on the order in which the matching order is found.

Process 300 may end at block 319 after facilitation of the execution of the orders is complete. In some embodiments, one or more participants, such as originators of the orders may be notified of execution. In some embodiments, the order of acts may not be the same is indicated in process 300. In some embodiments, process 300 may include additional actions, fewer actions, and/or different actions. Process 300 or a similar process may be performed by any computer system or systems in a centralized and/or distributed manner.

Example Participant Processes

Figure 4:
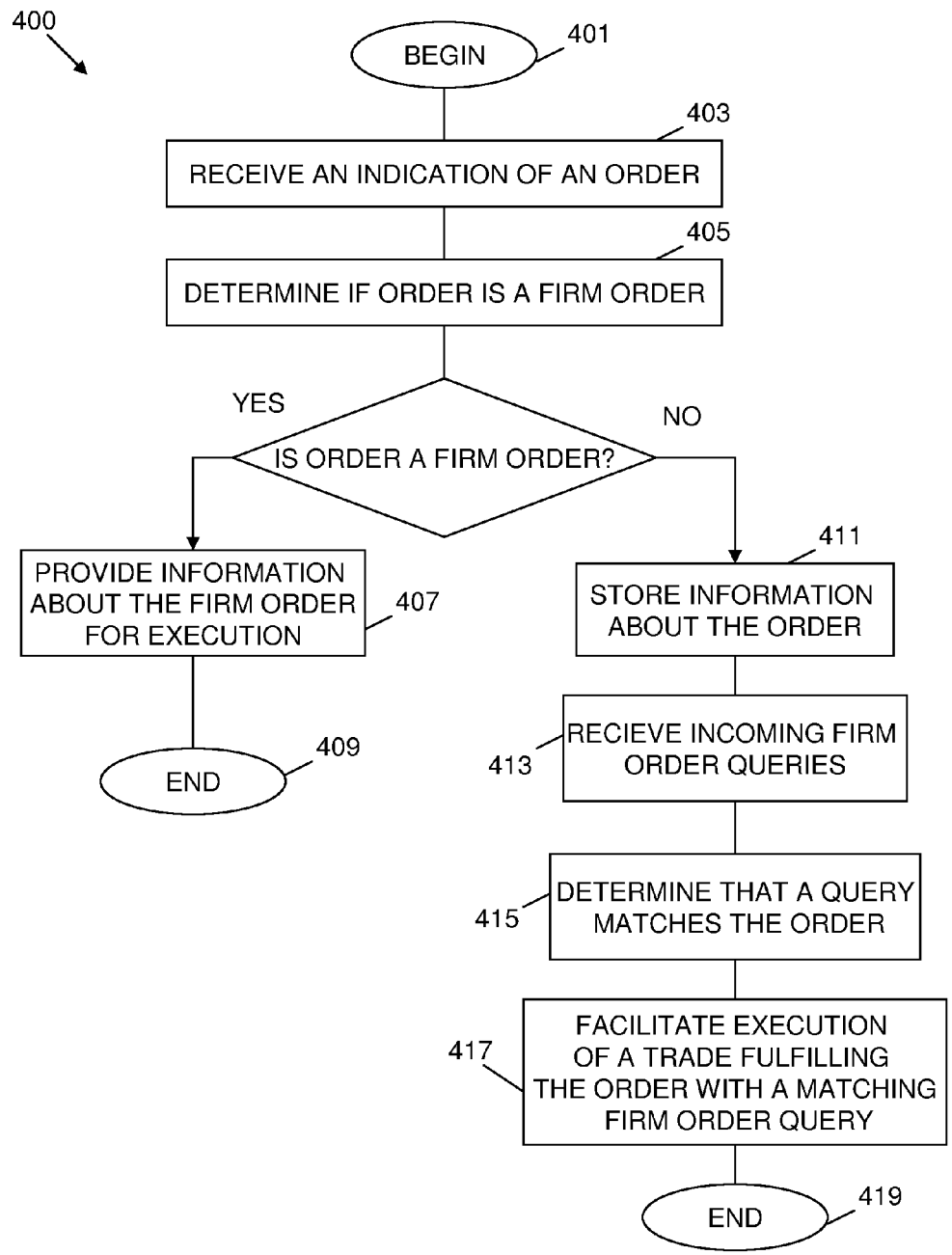
FIG. 4 illustrates an example process that may be performed by a participant of a trading system.

FIG. 4 illustrates an example process 400 that begins at block 401 and that may be performed by a participant (e.g., by buy side system 207). In other embodiments, some or all of process 400 may be performed at a centralized location, such as by central system 201, or a distributed location, such as by sell side systems or buy side systems. Process 400 may, in part, be performed to facilitate responses to queries and/or to provide indications of firm orders, as those described above with respect to process 300. In some embodiments, process 400 may be performed by an OMS system, a separate participant system, a buy side or sell side trader's computer, or any other computer system such as one configured to receive and process orders.

As indicated at block 403, process 400 may include receiving an indication of an order. Such an indication may be received, for example, from a trader entering information about desired trades through a trading interface. The indication may include an identification of a price, an amount of a security to buy or sell, a time for an order to remain open, a price at or around which to buy the security, a limit price, a pricing method, an order identifier, and/or any other information.

As indicated at block 405, process 400 may include determining if the order is a firm order. A firm order, as described above, may indicate that an order should be executed substantially automatically. A OMS order, may indicate that the information about the order is to remain secret from other market participants and/or should not be automatically executed against. Some embodiments may not include a separate act of determining a type of order. For example, in some embodiments, different processes, threads, and/or systems may receive the different types of orders, so that the act of receiving the order itself identifies the type of order. For example, a trader may use one interface to submit an OMS order (e.g., to an OMS system, to a participant system, etc.) and use a different interface to submit a firm order (e.g., to a central system, etc.). In some embodiments, a single program may be used to submit the different order types, and the program may make the determination (e.g., based on different buttons pressed, based on different checkboxes selected, etc.).

As indicated at block 407, if the order is a firm order, process 400 may include providing the indication of the order for firm order execution. Such providing may include transmitting information about the order to the central system 201, or a distributed system. Such an order may be received by such system, which may attempt to execute the order substantially automatically (e.g., using a process similar to process 300). In some embodiments, such providing may include providing the information to a processing thread or program executed by one or more computing devices. Process 400 may end at block 409 if the order is a firm order. In other embodiments process 400 may continue to provide updated information about the execution of the firm order, such as through an interface of a trading computer.

As indicated at block 411, if the order is not a firm order, process 400 may include an act of storing information about the order. Storing the information may include storing the information on a machine readable medium, such as in RAM, on a hard disk, etc. The medium may be part of/associated with one or more of an OMS system and/or a participant system. The information may be stored in one or more database tables configured to store information about orders. Such a database table may be arranged for easy searching of orders to determining if an incoming order request matches any of the ordered stored in the database. For example, in some embodiments, the database may be keyed by a name of a security.

Some embodiments may include maintaining stored information. Such information may be maintained similar to the maintenance of order information in a typical OMS system. In some embodiments, maintenance may include the actions of an OMS and/or a participant system. Maintenance may include updating orders executed in connection with matching firm order queries. For example, order information may be removed/updated when an order is fully or partially fulfilled, an order expires, an order is explicitly removed or updated by a trader, and/or for any other desired reason.

As indicated at block 413, process 400 may include receive incoming firm order queries. An incoming firm order query may indicate an identification of a price, an amount of a security to buy or sell, a time for an order to remain open, a price at or around which to buy the security, a limit price, a pricing method, an order identifier, and/or any other information. In some embodiments, such firm order queries may be received from one or more computer systems performing a process similar to that shown in process 300. In some embodiments, the firm order queries may include orders that would fulfill part or all of the OMS order. Such queries may be received at a participant system, an OMS system configured to perform some or all of the action of process 400, and/or any other desired location.

As indicated at block 415, process 400 may include determining that a firm order query matches the order. For example, a result from a database query that includes terms identified by the firm order query (e.g., security identifier, price, quantity, etc.) may return a positive result.

As indicated at block 417, process 400 may include attempting to facilitate execution of a trade with the matching firm order query. Facilitating execution of a trade may include, for example, displaying an indication of the firm order to a trader through one or more trading interfaces, as discussed in more detail below, raising an alarm or other audible alert for such a trader, and/or any other desired action. In some such embodiments, the trader may be asked to accept the matching order or reject the matching order. If the trader, in some embodiments, acceptance of the order, the system may execute a trade, forward information for the trade to be executed and/or cleared by another system, and/or perform any other desired action to further facilitate execution of the trade.

In some embodiments, by keeping the OMS orders secret from other trading participants, a trading system performing process 400 may encourage traders to allow pools of liquidity that would typically remain inaccessible, such as orders in OMS systems, to be used to match against firm orders. This encouragement may be particularly important to buy side participants who may typically be protective of their order information. Such use of OMS orders may increase liquidity in a market using such a process.

Process 400 may end at block 419, after facilitating execution of the trade. In some embodiments, one or more participants, such as originators of the orders may be notified of execution. In some embodiments, stored information regarding the orders may be updated to reflect the order execution. In some embodiments, in which only part of the OMS order is fulfilled by the matching firm order, process 400 may include receiving additional firm order queries and facilitating execution of those orders.

In some embodiments, the order of acts in process 400 may not be the same is indicated in FIG. 4. In some embodiments, process 400 may include additional actions, fewer actions, and/or different actions. Process 400 or a similar process may be performed by any computer system or systems in a centralized and/or distributed manner. For example, process 400 may be performed by the participant systems 205, 207, by an OMS system configured to perform one or more parts of process 400, and/or by any other system. In some embodiments, process 400 may be performed only in connection with a buy side participant.

Example Querying Processes

Figure 5:
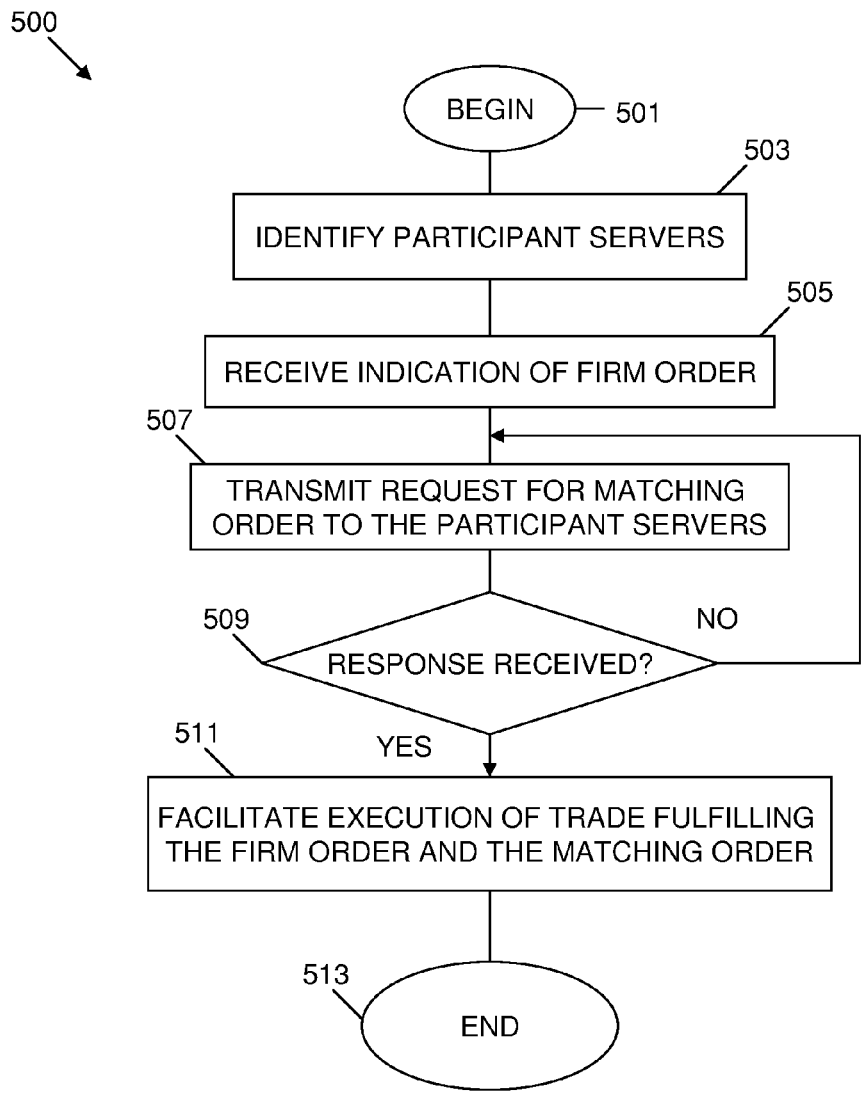
FIG. 5 illustrates an example process that may be used to query a participant.

FIG. 5 illustrates an example process 500 that begins at block 501 and may be used, in some embodiments, to perform, in part, querying of participants, as indicated by block 311 of process 300 above. Process 500 may be performed by a central computer system to query participants for matching orders, may be performed in a distributed fashion by a plurality of computer systems, and/or may be performed by any other computer systems. In some embodiments, such a process may be performed, in part or in whole, in a tree like distributed fashion in which some participants may query one or more child participants to search for matching orders.

As indicated at block 503, process 500 may include identifying one or more participants. Participants may include one or more remote servers, one or more computer processes, threads, or programs. For example, in some embodiments, participants may include buy side systems. In other embodiments, participants may include sell side systems, and/or other systems. Identifying participants may include querying potential participants in a list of participants, (e.g., pinging IP addresses, making function calls, etc.). In some embodiments, identifying participants may include placing one or more items in a predefined memory location, querying a predefined memory location for information about participants, accessing a database or other listing of participants, receiving an indication that a participant exists (e.g., from the participant, from an administrator, etc.) and/or any other actions desired. In some embodiments, the identified participants may include child participants of a tree-like participant structure.

As indicated at block 505, process 500 may include receiving an indication of a firm order. Such a firm order may be substantially similar to the firm order received at block 303 in process 300.

As indicated at block 507, process 500 may include transmitting requests to the identified servers. Such requests may be substantially similar to those discussed above with respect to block 311 in process 300. In some embodiments, as discussed above with respect to process 300, the received firm orders may be matched against other locally stored firm orders instead of or in addition to querying of participants as discussed with respect to process 300.

In some embodiments, participants may be arranged in a distributed fashion. For example in one embodiment, participants may be arranged in a tree-like fashion. In such an embodiment, a first participant may query one or more other participants. The other participants may determine if matches exist locally. If matches exist, the participants may return a positive indication (e.g., to the originating participant, the originator of the firm order, a marketplace, etc.). If no match is found locally, the further participants may query additional participants. The order of querying may be established based on any desired priority mechanism (e.g., largest customers are queried first, premium customers queried first, highest ranked customers queried first, etc.). In some embodiments, a participant may query additional participants regardless of whether a match is found locally.

As indicated at block 509, process 500 may include determining if a response was received from a queried participant. In some embodiments, determining if a response was received may include querying a port or socket through which communication may be received from a communication network. In other embodiments, determining if a response is received may include querying a register, memory location, process, thread, program, function and/or any other action.

In some embodiments, if no responses is received, process 500 may loop back to block 507 to send one or more additional requests. Any number of requests may be sent any number of times. Any period of time may pass between transmission of requests (random, periodic, etc.). Process 500 may continue to loop until a response is received, a matching firm order is found otherwise, a time period expires, and/or any other event occurs.

In some embodiments, the participants queried at each loop may be the same or different. For example, in some embodiments, an initial group of participants may be queried first (e.g., a premium group of participants, a group of good customers, a group of high volume customers, etc), and then after some period of time a second group of participants may be queried. Any number of such subgroups may be queried in such order.

As indicated at block 511, process 500 may include facilitating execution of a trade fulfilling a matching order in the response. Facilitating may include executing a trade, clearing a trade, forwarding information requests and/or any other desired action. In other embodiments, a response may indicate that a trade has been or will be executed and/or cleared (e.g., by a remote system).

In some embodiments, a response may only be received if a match exists and/or a trader desires to execute a trade. Limiting response to positive responses may encourage participation because less information is revealed from the participants. This may incentivize participants to make orders available to a market to a great extent than in traditional markets, thereby increasing the liquidity of the market.

Other embodiments may include receiving negative response when no matching order exists and/or a trader does not desire to execute a trade.

In some embodiments, a response may be received for a trade that does not completely fulfill the firm order. In some implementations, after execution of such an order, process 500 may loop back to block 507 to query participants again. Future queries of participants may include an updated order with a requested amount decreased by the previous order. In other embodiments, such facilitation of order execution may be limited to complete orders (e.g., based on preferences indicated by an originator of the order, based on preferences of a trading system, etc.).

In some embodiments, multiple responses may be received at the same time or within a relatively short time period. Orders received as such may be treated as if they were received at the same time. A priority mechanism may be used to determine which of such orders is to be executed first. For example, an order associated with a high volume customer, a premium customer, a long term customer, or a customer with any other desired characteristic may be given higher or lower priority compared with other orders. In some embodiments, largest or smallest orders may be given priority. In other embodiments, any desired priority mechanism may be used.

In some embodiments, process 500 may end at block 513. In some embodiments, process 500 may include notifying one or more traders of the execution. In some embodiments, process 500 may include additional actions, fewer actions, and/or different actions. Process 500 or a similar process may be performed by any computer system or systems in a centralized and/or distributed manner.

Example Passive Order Processes

Figure 6:
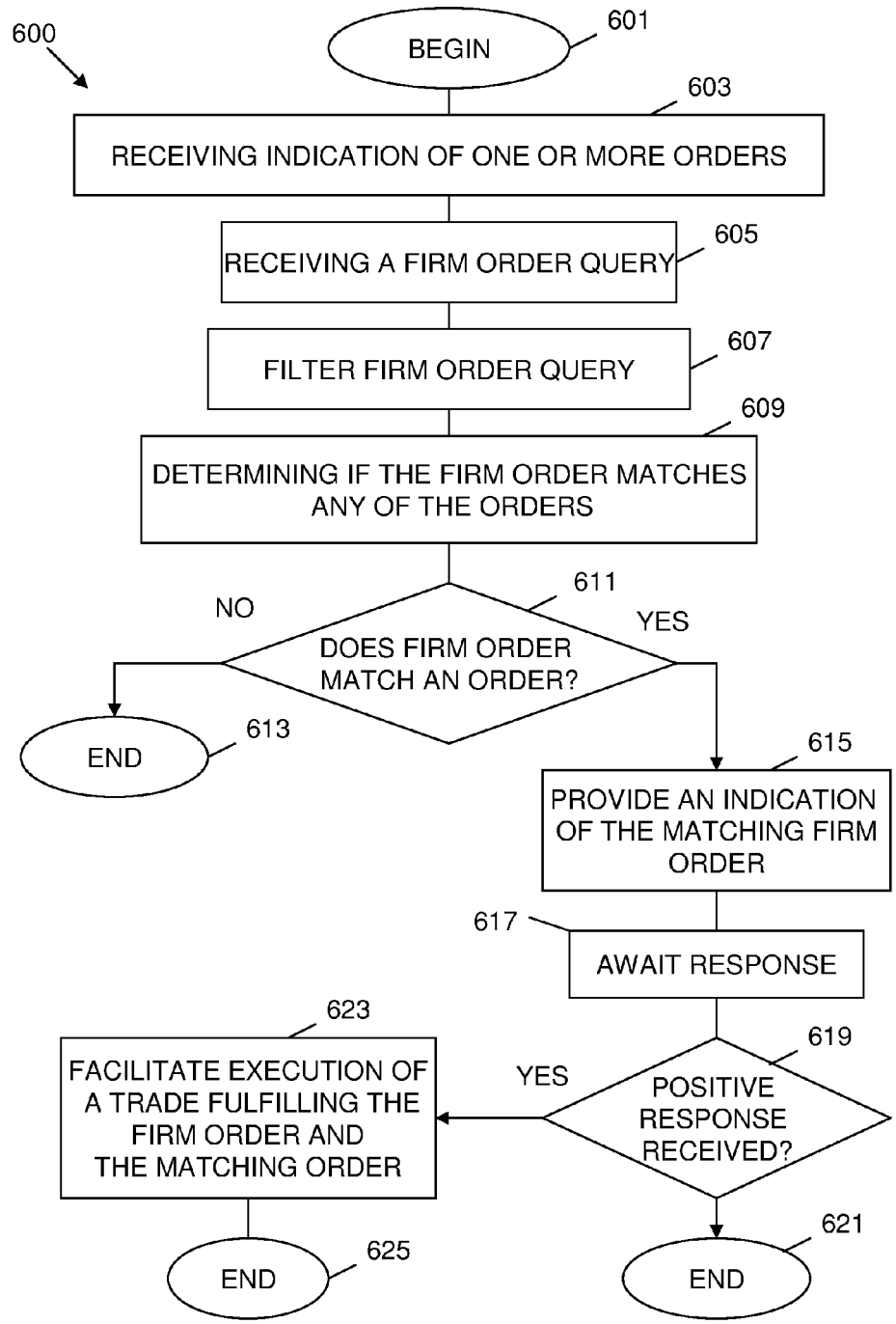
FIG. 6 illustrates an example process that may be used in responding to queries.

Process 600 of FIG. 6 which begins at block 601 illustrates an example process that may be performed by one or more participants. Process 600 may include actions similar to process 400 described above. In some embodiments, process 600 may be performed only by one or more buy side participants.

As indicated at block 603, process 600 may include receiving one or more indication of one or more orders. Such orders may include OMS orders as discussed above with respect to process 400. The orders may be stored accordingly, as discussed with respect to block 411 so that queries may be matched against them.

As indicated at block 605, process 600 may include receiving an indication of one or more firm order queries. Such firm order queries may be transmitted, for example, by an entity performing a process similar to process 500 and/or process 300 as discussed above.

As indicated at block 607, process 600 may include filtering firm order queries. Firm order queries may be filtered based on characteristics of the order (e.g., price, security, amount (e.g., minimum amount, maximum amount), etc.), characteristics of the originator of the order (e.g., a rating of the originator, a type of the originator, specific originators, etc.), and/or orders queries may be filtered according to any other desired characteristics. In some embodiments, different filters may be applied to different types of securities. For example, large capitalization securities may have one set of filters applied and small capitalization securities may have a different set of filters applied. In some embodiments, specific securities (e.g., identified by stock symbol) may be filtered out or have a specific set of filters applied.

In some embodiments, filtering may allow a participant to filter queries received from or sent to other participants. Filtering may be performed based on any desired characteristics.

Such characteristics may include characteristics that make the order less likely to be an order associated with gaming of the market. For example, in one implementations, a filter may block firm orders that do not meet a minimum size requirement, a minimum total dollar amount requirement, and/or any other desired characteristics.

In some embodiments, as another example, a participant may only desire to consider orders associated with originators with certain characteristics. Such characteristics may include characteristics that make an order less likely to be an order associated with gaming of the market. For example, in one implementations, a filter may block orders that are from a particular class of traders (e.g., hedge funds, etc.), that are associated with a particular trader that has been identified by the participant as being involved with gaming the market, that are not from a particular trusted set of participants, a from a set of participants that were rated poorly by other participants, are from a participant without a history of trading, etc.

In some embodiments, a firm order submitter may desire to filter the participants that receive queries regarding their firm orders. Such a filter may filter the participants based on characteristics of the participants, behavior of the participants, and so on. For example, in some implementations, a filter may be established based on a response pattern of participants (e.g., how participants have responded to queries in the past). As an example, a firm order submitter may only desire their orders to be transmitted to participants that have a history of accepting firm order queries (e.g., all firm order queries, firm order queries from a type of trader, firm order queries for a particular financial instrument, firm order queries for a class of financial instruments, firm order queries for a quantity range of financial instruments, firm order queries from the submitter, and so on). Such filtering may prevent information about the firm order from being sent to participants that are unlikely to respond positively to the order. In one implementations, firm order submitters may choose from one or more ranges of response rates (i.e., number of queries accepted/number of queries received), which may be referred to as risk pools, with which participants must be associated to receive a query (e.g., choose from among participants with positive response rates of 1-50%, 51-70%, 71-90%, and/or 91-100%).

Some embodiments may include receiving an indication of desired filters. The indication may be received from one or more traders, participant systems, or any other desired source. The indication may identify any desired characteristics, combination of characteristics, exceptions to filters, and/or any other information related to the filters.

The filters may be applied in a centralized fashions and/or a distributed fashion. For example, in some implementations, filters may be applied before requests are transmitted (e.g., by a central system, by a distributed system, etc.). Applying the filters before transmitting requests may decrease the amount of traffic associated with performing process 600. Conversely, performing such filtering before transmitting may increase the amount of processing performed before transmitting and may involve a participant revealing filtering preference they may not desire to reveal to anyone, even a trading system administrator. In other embodiments, filtering may occur locally to a participant. By performing such filtering locally, more traffic may be generated by a trading system, more processing may take place at participants, and filtering options may remain private.

In some embodiments, participants may be filtered from receiving requests based on the desires of a firm order submitter (e.g., by a central system or other participant submitting queries, etc.). Such participants may be filtered by identity, order availability, and/or any other desired characteristic.

Such filtering may occur for example, by the participants themselves (e.g., by a participant system configured to perform such filtering in addition to, before, or otherwise in connection with other participant functions), by a central system, by a submitting system, and/or by any other desired system. In some embodiments, for example, a participant may not be provided with a query if they do not have a matching firm order to fulfill a minimum percentage of a firm order. In other embodiments, such information may not be known until after a query is sent, and in such embodiments, a match may only be determined to exist if the match meets the minimum percentage. Filtering before transmitting queries may decrease an amount of traffic (e.g., TCP/IP packets) transmitted which may be snooped to reveal trading information, however, a malicious user may snoop such queries in an attempt to determine a filter setting.

In some embodiments, participant systems may transmit filtering information to a central system. Such information may be used to perform the filtering at the central system. Such information may also be used to provide information to users entering firm orders, as described below.

A trading system that allows such filtering may enable a participant to open traditionally untapped pools of liquidity only to a certain subset of traders. By allowing such limitations, the participant opening that pool of liquidity (e.g., a set of orders in an OMS) may be more confident that the traders gaining access to those pools are not going to use the pools of liquidity for malicious purposes (e.g., gaming the market).

As indicated at block 609, process 600 may include determining if a matching order for the firm order query exists. Such determination may include searching one or more database or other listings of OMS orders. The determination may be made at a same or different location as the filtering. Determining may include searching a listing of orders in an OMS of a buy side participant. Such a listing may include all listed orders, a subset of listed orders identified as searchable by a trader, and/or any other orders.

As indicated at block 611, and 613, process 600 may end if it is determined that no matching order exists. Some embodiments may end without providing any indication that no order exists. By not providing specifically identifying that no order exists, others (e.g., other traders, participants, people snooping packets, etc.) may be unable to determine if no order exists or no such response was sent for some other reason (e.g., because a trader indicated that no trader should occur as discussed below, because a trade was filtered out, as discussed above, etc.). In some embodiments, no indication that the query was received may be presented to a trader or trading system associated with the participant that received the query. By keeping such information secret, receivers of queries may be prevented from using the information that the firm order exists to game the market.

As indicated at blocks 611 and 615, if a firm order is determined to exist, process 600 may include providing an indication that a firm order has been received. Providing such an indication may include transmitting information over one or more networks from one computer system to another computer system. Providing such an indication may include presenting a user (e.g., a buy side trader associated with the OMS order matched) with one or more interfaces or icon identifying the firm order. Such an interface may include options to accept a firm order, reject a firm order, ignore a firm order, ignore all firm orders (e.g., for a desire period of time), and/or any other desired options. Such an indication may be considered a non-binding indication from the point of view of the participant associated with the OMS in so much as a recipient (e.g., a participant associated with the matching OMS order)

is not bound to fulfill any order based on the indication. However, an originator of the firm order may still be bound to fulfill the order if the recipient of the indication chooses to accept the order.

In some embodiments, ignoring a firm order may result in a participant opting out of receiving/matching using firm order queries for a minimum amount of time. Such an opt out time may encourage participants to accept firm order queries. The time may vary based on characteristics of the order and/or participants.

In some embodiments, a user may select various options regarding ignoring future indications. For example, a user may select that indications should be ignored unless a price associated with the firm order is at a certain level, a firm order has some desired characteristic, ignore until a certain time, ignore for a certain amount of time, ignore until the end of the day, etc.

In some embodiments, evidence that a user has selected to ignore an indication may be suppressed. For example, the information may maintained in confidence at a participant system, may be kept in confidence at a central system, or may otherwise be kept secret. In implementations where different options for ignoring an indication may selected, evidence regarding some or all of the information regarding the options may also be suppressed.

As indicated at block 617, process 600 may include awaiting a response from such an indication. Some implementations may include receiving a response and determining if the response is a positive or negative response. In other implementations a response may not be received or may only be received if the response is a positive response. In some embodiments, the amount of time to be awaited may be indicated to a trader. In some embodiments, the amount of time may vary based on one or more desired characteristics of a security, a participant, an originator and/or other desired entity.

As indicated at block 619, process 600 may include determining if a positive response is received. Determining if a response is a positive response may include determining which if any mouse buttons were pressed, which if any keyboard buttons were pressed, which interface control if any was selected, and/or any other determination of a possible entry of intent, if any.

As indicated in block 621, process 600 may end if a positive response is not received. In some embodiments after a period of awaiting, a presumptive default response may be entered. In some implementations such a default response may include a negative response. In some embodiments, an operator of an interface (e.g., a trader, an administrator, etc.) may determine the appropriate amount of time and/or the appropriate default command.

As indicated at block 623, if a positive response is received, process 600 may include facilitating a trade fulfilling at least part of the matching order and at least part of the firm order. Facilitating the trade may include executing the trade, clear the trade, transmitting information so that the trade is executed and cleared remotely and/or any other desired actions. In some implementations, facilitating may include providing a positive response (e.g., to a central server, to a buy side and/or sell side participant, etc.). The recipient of the positive response may further facilitate the execution of the trade if a trade fulfilling the firm order has not already been executed. Transmission of a positive response may be considered a binding indication of a trade in so much as the participant associated with the OMs order may be bound to fulfill the matching firm order by the indication. In some embodiments, the binding may be conditioned on the firm order not having been fulfilled previously, not on actions of the participant.

In some implementations, process 600 may include receiving an update regarding the facilitation of the execution, such an update may include receiving an indication that the execution was completed or that the execution was not completed. In some implementations, a trade may be partially completed and an update may indicate that the trade was partially completed. For example, a trade may be partially completed if when the positive response is received, only part of the firm order is still awaiting execution, and the OMS order includes a larger volume for trade. In such a situation, a trade may be cancelled in some embodiments, in other embodiments, a the OMS order may be executed to the extent that the firm order remains, and in indication to that extent may be transmitted to the participants, in still other embodiments, an originator of the OMS order may be contacted with the updated firm order information, and/or any other action may be taken.

Process 600 may end at block 625. Process 600 may include notifying one or more participants of a result of the facilitation of the execution of the trade. In some embodiments, process 600 may include additional actions, fewer actions, and/or different actions. Process 600 or a similar process may be performed by any computer system or systems in a centralized and/or distributed manner. Process 600 may be performed by one or more computer systems in a centralized and/or distributed fashion.

It should be understood that the process of querying participants is given as one example process only. In various embodiments other methods of pulling order information from one or more OMS may be used. In still other embodiments, order information may be pushed from one or more OMS to a central system or other system through which order matching occurs rather than the pulling of order information described in process 600. In such implementations, an OMS and/or participant system may be configured to provide OMS order information and updates to a trusted system for order matching to take place without the need for querying.

Example Order Entry Processes

Figure 7:
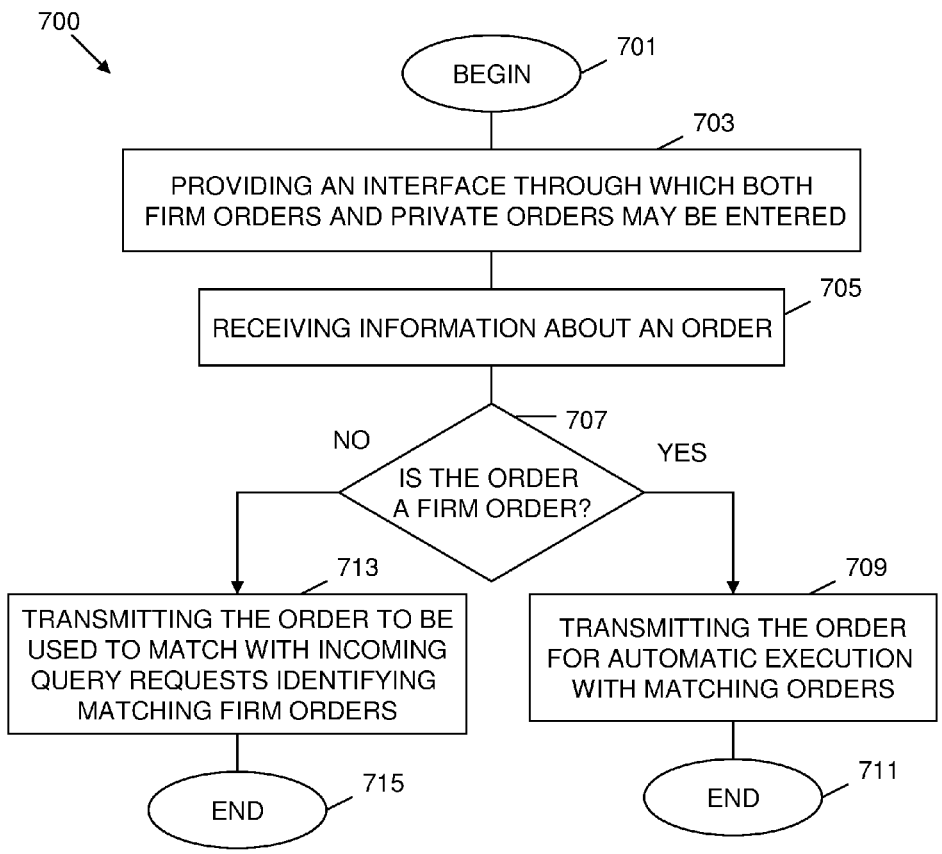
FIG. 7 illustrates an example process that may be used for order entry.

FIG. 7 illustrates an example process 700 that begins at block 701 and that may involve interfaces used in some embodiments. Process 700 may be performed in part, for example, by an OMS, a trading terminal, and/or any other computer system.

As indicated at block 703, process 700 may include providing an interface through which one or more of a firm order and/or a OMS order may be entered. Such an interface may allow a user to enter information identifying a security, a pricing policy, a price, an amount, and/or any other information about a desired trade.

FIG. 8 illustrate one example interface through which a user may enter order information. Through such an interface a user may be able to enter order types, a security desired, a pricing policy, a time in force, a limit, a minimum fill amount, a increment fill amount, an amount, and/or any other desired options. In some embodiments a same or similar interface may be used for entry of one or more of firm order and OMS order information.

Such a trading interface may illustrate information about a percentage/number of participants that may view a firm order query associated with an entered order as indicated at 801. This information may be based on filters established by the participants to filter out orders as described above. Such information may be collected by a central system (e.g., from participant systems). One characteristic that may be frequently used to filter orders includes size of the order. The percentage/number of participants may reflect the total number of participants willing to accept orders with all characteristics except size and the number willing to accept with the size characteristic. Accordingly, order originators may adjust their order size to increase or decrease the number of participants queried.

As indicated in block 705, process 700 may include receiving information about an entered order. The information may include information entered through the provided interface and/or any other information (e.g., default information, identification information, etc.).

As indicated at block 707 process 700 may include determining if the order is a firm order. Determining if the order is a firm order may include determining characteristics of an input signal, an interface control, and/or any other information. Some implementations may not include such a determination, but rather an interface, program, computer, etc. at which the indication is received or through which information related to the indication is entered may identify the type without a separate action being taken.

As indicated at block 709, if the order is a firm order, process 700 may include transmitting (e.g., to a central system, a distributed system, etc.) an indication of the firm order for automatic execution against matching orders (e.g., matching firm orders previously or later submitted, OMS orders, etc.). Process 700 may then end at block 711. In some implementation, process 700 may also include receiving information about a matching order and displaying that information through one or more interfaces.

As indicated at block 713, if the order is determined not to be a firm order, process 700 may include transmitting a representation of the order to be matched against incoming order queries e.g., by a process such as process 400. Transmitting may include providing to a different process, thread, memory location, etc. In other embodiments, a same program thread server may perform query matching, providing interfaces, receiving order information, and/or any other desired acts. As indicated at block 715, process 700 may then end.

In some embodiments, process 700 may include receiving information about the order, such as whether matching queries are received, etc. In some implementations, process 700 may be performed, for example by a trading computer, an OMS system, a central system, and/or a participant server. In some embodiments, process 700 may include additional actions, fewer actions, and/or different actions. Process 700 or a similar process may be performed by any computer system or systems in a centralized and/or distributed manner. Process 700 may be performed by one or more computer systems in a centralized and/or distributed fashion. In some embodiments, entering OMS orders in such a process may be limited to buy side participants of a market.

Example Passive Order Query Processes

Figure 9:
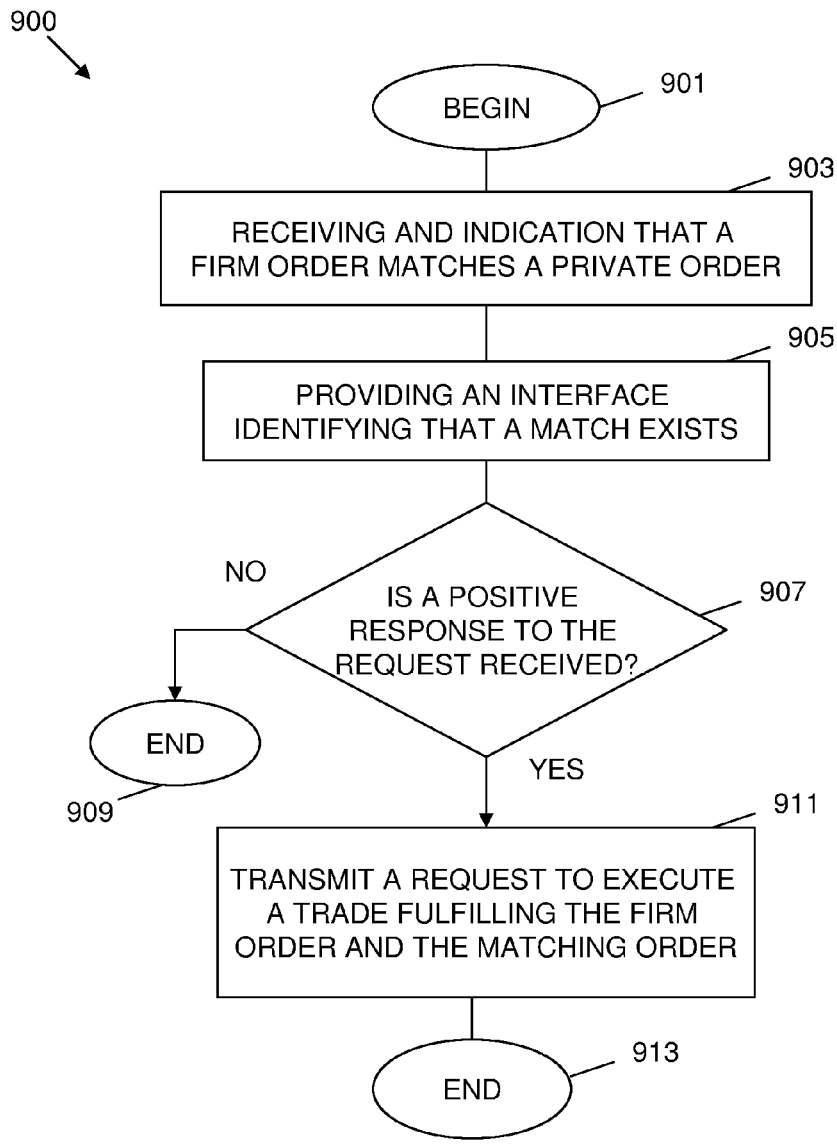
FIG. 9 illustrates an example process that may be used to present order query information.

FIG. 9 illustrates an example process 900 that begins at block 901. Process 900 may be performed, for example, by a buy side system, sell side system, and/or any other computer system. In some implementations, a participant server, a trader's computer, an OMS, and/or any other computer system may perform one or more actions associated with process 900 and/or a similar process.

As indicated at block 903, process 900 may include receiving an indication that a firm order matches a OMS order. Such an indication may be received from one or more OMS systems, participant servers, central servers, buy side systems, sell side systems, computer programs, computer processes, computer threads, memory locations, network interfaces, and/or other desired sources.

As indicated at block 905, process 900 may include providing an interface, icon and/or other indication that a matching order exists. FIG. 10 illustrates an example interface that may be used as such an indication in some embodiments. Such an interface, as illustrated, may display some details of a matching order. Such an interface may allow a trader to indicate a positive response to the order or a negative response to the order (e.g., by operating a control, such as a button).

Process 900 as indicated at block 907 may include determining if a positive response is received with some time period. In some embodiments, the period of time may include a default time period, an amount of time according to a user profile, an amount of time according to terms of the firm order, an amount of time determined in part by a size and/or dollar value of the order, and/or any other desired amount of time. In some implementations, receiving a positive response may include receiving an indication that a control was selected. If a positive response is not received, process 900 may end at block 909.

As indicated at block 911, if a positive response is received, process 900 may include transmitting a request to execute a trade fulfilling at least part of the firm order and at least part of the matching order. Other embodiments may include otherwise facilitating the execution of such a trade (e.g., executing the trade, clearing the trade, etc.)

Process 900 may end at block 913. Other embodiments of process 900 may include receiving information about the execution of the trade, displaying information about such execution, displaying terms associated with a trade, displaying information about an originator of a firm order, updating/maintaining stored order information and/or any other desired actions.

In some embodiments, multiple firm orders may match a OMS order. In such embodiments, an indication of each such matching order may be provided. In some embodiments, the indications may be ordered according to a preference mechanism. Such preference mechanism may include ordering based on preferences of an order originator, an indication receiver, a computer system administrator, and/or any other preferences of any individual regarding any characteristics of an order, computer system, trade, etc. In some implementations, rather than providing separate indications, indications may be pooled into a single indication. Such pooling may include combining multiple firm orders according to some preference mechanism so that the firm orders fulfill the matching order. If additional firm orders exist, some implementations may separately provide information about such firm orders. In some implementations, even if indications are pooled, an interface may be provided that allows a user to access information and enter information (e.g., acceptance of orders) about individual orders.

In some embodiments, process 900 may include additional actions, fewer actions, and/or different actions. Process 900 or a similar process may be performed by any computer system or systems in a centralized and/or distributed manner. Process 900 may be performed by one or more computer systems in a centralized and/or distributed fashion. In some embodiments, only buy side participants may receive firm order queries for matching against OMS orders.

Processes 300-700 and 900 are arranged to provide convenient illustration of concepts disclosed herein. It should be recognized that no such processes need be performed at all.

Encryption

In various embodiments, some or all communication may be encrypted. In various embodiments, some or all information stored in various media may be encrypted. In some embodiments, comparisons among information may be made in an encrypted form. In other embodiments, encrypted data may be unencrypted before a comparison occurs.

In some embodiments, an encryption algorithm such as the well-known PGP, RSA encryption method may be used for communication among participants, computer systems, etc. Advances in quantum computing may make such encryption less secure in the future. Some embodiments, therefore may include use of quantum key encryption algorithms designed to overcome such vulnerability and or other future proof encryption algorithms.

User Types

In some embodiments, different users of a system (e.g., central system, buy side system, sell side system, trader computer, etc.) may have access to different options. Because a market may be asymmetrical, providing asymmetrical options to such user types may best capture a dynamic of the market. For example, in a security trading market, participants may be divided into four example categories which may include hedge funds, investors, brokers, and verified naturals. It should be recognized that other embodiments may include different, additional, alternative, fewer, and/or no categories of users.

Referring to the example four category embodiment, investors may include traders that trade on behalf of their own accounts (e.g., individuals). Hedge funds may include organizations exempt from standard securities regulation that typically seek high returns for accredited investors. Brokers may include originations that may trade on behalf of others as regulated by standard securities laws. Verified naturals may include brokers that are not acting one behalf of their own proprietary accounts. To become a verified natural, a broker may be required to provide proof that they are not trading on behalf of their own proprietary accounts. In some implementations, a single user may act as more than one type of user at various times. For example, a broker may act as a broker in some situations and a verified natural in other situations. Options and treatment given to such different categories may reflect a likelihood that the participants may be gaming the market.

In some embodiments, information provided to users may depend upon a category or type of user. For example, users may be limited to receiving certain firm order queries, accepting certain firm order matches, etc. based on their category. In one implementation, for example, only buy side participants only may receive firm order queries. In such situations, information about possible trade executions with OMS orders may not be provided to sell side participants until and unless a trade is accepted by a buy side participant and/or executed.

In some embodiments, as discussed above, rebates and charges may be given. In some embodiments, such rebates and/or charges may depend on a category of participant. For example, in some implementations, investors may be given a rebate for submitting firm orders. In other implementations, anyone submitting a firm order may be given a rebate. In some implementations, brokers may be charged a fee for each time a OMS order matches a firm order query. In some implementations, brokers can opt out of having their firm orders matched against other brokers firm orders because of pricing rebate that allows brokers to be paid for submitting firm orders.

In some embodiments, size or other characteristics of a participant may affect a participants options. Some implementations, for example, may be limited to large participants, others to small participants, others may allow all sized participants.

Possible Negotiation

Although some embodiments described above execute trades without a negotiation between participants in the trade (e.g., with only a buy or reject/ignore option presented to participants with matching OMS orders), some embodiments may include a negotiation. Such negotiation may be limited in some embodiments to preserve anonymity, encourage entering of OMS orders, and/or limit the possibility of gaming the market.

In some embodiments, for example, where there are multiple matching orders, a negotiation to determine the counter party that is willing to adjust their offer the most may be performed.

In some embodiments, if user accepts a matching firm order found from a query, the user and/or the originator of the firm order may be presented with an option to trade more of the security. By selecting a control in an interface that activates such an option, a negotiation may begin between the two participants. Such a negotiation may include asking if the other party agrees to trade more, the terms of such a trade, etc. Such negotiation may limit the probability of gaming the market since the participants may already be aware of each other from the prior trade.

Rebate

Some embodiments may include providing rebates or charging fees to trade participants. Such fees and/or rebates may be arranged to incentivize participation in certain aspects of a trading system. For example, in some embodiments, when an order is executed based on a firm order matched with a OMS order, the participant that submitted the firm order may receive a rebate, and the participant associated with the OMS order may be charged a fee.

Types of Trades

Some embodiments may support various types of trades. Such trades may include buying securities, selling securities, short selling securities, and/or any other desired types of trades. In some embodiments in which a short sell of a security is performed, a location of a purchased/borrowed security may be required before a short sell order may be completed.

Tracking Users

Some embodiments may include tracking information about one or more participants. For example, a trade history, a number of trades, a type of trades, characteristics of trades, etc. may be tracked for buy and/or sell side participants. In some information, a participant may view some or all of such information about itself and/or about other participants. In some embodiments, such information may be used to generate a rating of a participant. Such a rating may be used, for example, as a filter of participants querying a participant server.

It should be recognized that while embodiments described herein generally included a computer-human interactions (e.g., through an interface), other embodiments may be performed completely though a computer (e.g., a computer may respond to firm order queries, etc.).

It should also be recognized that while embodiments described herein generally included various securities trading, other embodiments may be used to trade any desired goods or services.

Some Information Revealed

In some embodiments, one or more participants may be given some, but not all, information about pending orders. Such information may be provided, for example, as a way of incentivizing the participant to submit an order, and/or take some action. In some implementations, the pending orders may include firm orders, and the participants may include participants with orders in an OMS. In other implementations, the pending orders may include orders in an OMS and the participants may include any participant (e.g., a participant inquiring about present orders, a participant with OMS orders, a participant with firm orders, etc.). In some implementations, the participants that are told such information may include buy side participants. In such implementations, buy side participants may be given the information, for example, without having to submit orders of their own, after submitting OMS orders related to the pending orders, after submitting firm orders related to the pending orders, and/or after any other desired event.

In some implementations, the some information may include information about one or more pending orders that does not include all the information about the pending orders. For example, the information may include the fact that one or more orders for a financial instrument are pending. The information may, for example, withhold which side the orders are for, who the orders were submitted by, the quantity of the orders, the price of the orders, and/or any other information. In other implementations, some or all of such information may be provided and other information may be withheld. In some implementations, the information may be sufficient to entice a participant who may be interested in a trade involving the pending orders to perform one or more actions but may be limited so that an effect on behavior of other participants is limited to legitimate trading activity (e.g., limit gaming of the market).

In some implementations, if the participant that was shown the information takes one or more specific actions, additional information about the pending orders may be provided. For example, if an order is submitted for the financial instrument, if an OMS order is converted to a firm order, if a positive response to an OMS query is guaranteed, etc., then the remaining information about the pending orders may be provided. Such a method of providing some but not all information before an action is taken may be used to incentive a participant to take a particular action to obtain the remained of information (e.g., if the initial information was enticing). In some implementations, orders in an OMS, order histories, and/or any other information about a participant may be tracked and used to determine if providing some information may encourage the one or more actions. In some implementations, market conditions may be tracked to determine that the one or more actions may provide needed liquidity to a market (e.g., may encourage submission of firm orders when they are lacking).

Non-Firm Orders

Figure 11:
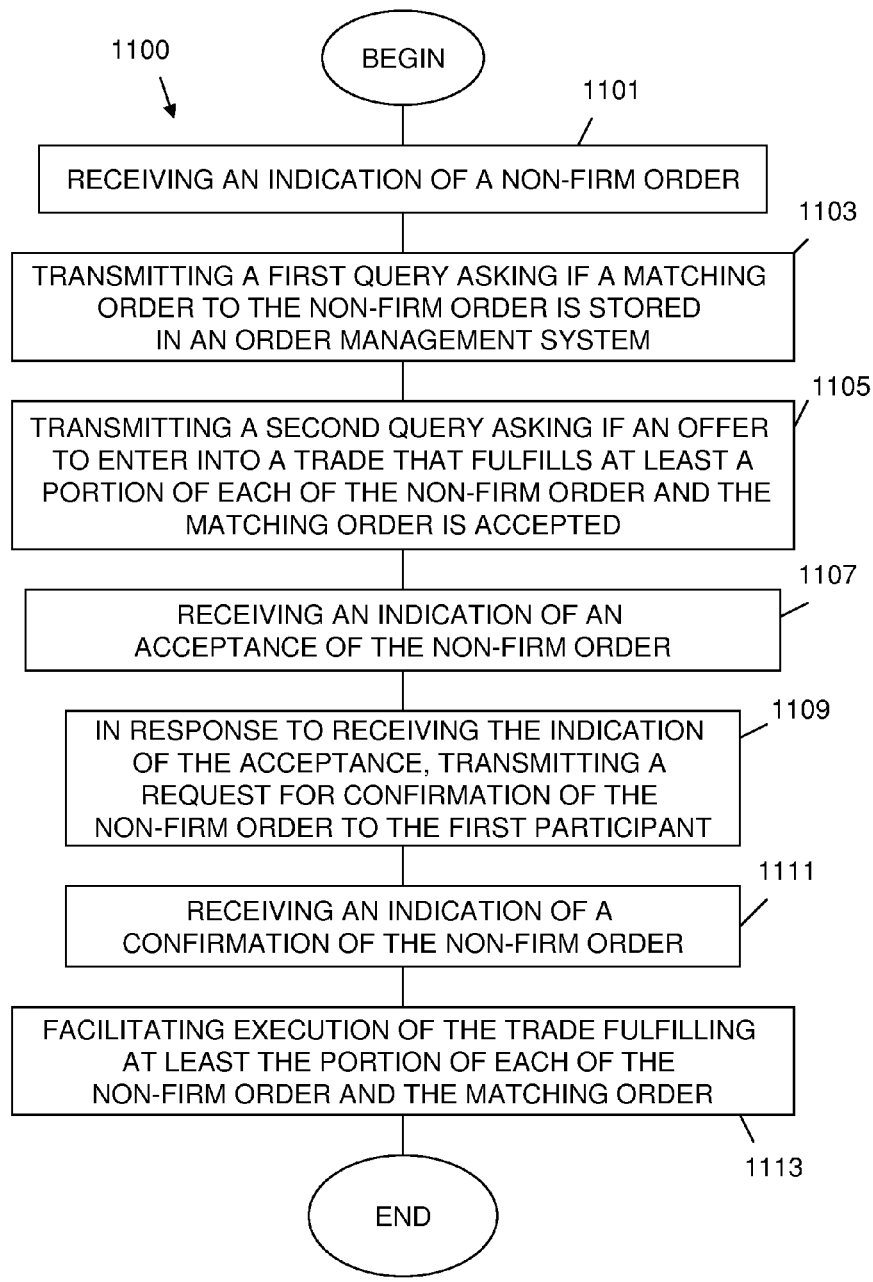
FIG. 11 illustrates an example process that may be used in some embodiments involving non-firm orders.

FIG. 11 illustrates another embodiment. In some embodiments, an indication of a non-firm order may be received (e.g., over a communication network, etc.) from a first participant as indicated at block 1101. The non-firm order may define a side of a trade (e.g., a desire to buy, a desire to sell). Such an indication may be received from an order submitter (e.g., a sell side trader, etc.). In some embodiments, the receipt of such an indication may be similar to the receipt of an order (e.g., as described with respect to process 300. In some embodiments, a non-firm order may be treated similar to a firm order, as described above with respect to process 300. In some embodiments, a process similar to process 300 may be performed with the addition of an act of confirming a trade with a submitter of the non-firm order before facilitating execution of the trade. In some embodiments, such a process may differ from process 300 in any number of ways. In some implementations, a non-firm order may include an order to buy or sell a financial instrument that is contingent on a confirmation before a trade fulfilling the order is facilitated.

In some embodiments, an indication of a non-firm order may be received and in response, a search for matching orders may be performed. If a matching order is found, instead of facilitating execution in response to finding the matching order the non-firm order may be confirmed before such facilitation is performed. If such confirmation is received, execution of the trade may be facilitated.

Some embodiments may include determining whether a matching order to the non-firm order is stored in an order management system and whether an offer to enter into a trade that fulfills at least a portion of each of the non-firm order and the matching order is accepted. As described below such determining may include, for example, transmitting one or more queries, receiving responses, and any other actions. In other implementations, such determining may include other actions, such as searching one or more databases, and so on.

In some embodiments, after the indication of the non-firm order is received, one or more queries may be transmitted (e.g., using a querying process such as those described above, if a matching firm order is not found, in parallel with a search for matching firm orders, etc.). The queries may ask if a matching order to the non-firm order is stored in an order management system (e.g., similar to process 500) as indicated at block 1103 and/or if an offer to enter into a trade that fulfills at least a portion of each of the non-firm order and the matching order is accepted as indicated at block 1105. In some implementations, a single query may be transmitted, for example, to a computer system configured to interpret the single query as asking if the matching order is stored in the order management system and, if the matching order is stored in the order management system, if the offer is accepted (e.g., by a trader associated with the order management system. In some implementations, transmitting a query may include transmitting a query to a system configured to determine if a matching order is stored in the order management system, determine if an offer to enter into a trade regarding that order is accepted, and respond to the query only if the matching order is stored in the order management system and the offer is accepted (e.g., a participant system as described above).

In some implementations, such querying may include identifying that the order is a non-firm order (e.g., by color coding an indication provided to a trader, by including a text description in an indication provided to a trader, by including an icon in an indication provided to a trader, by including a flag or other indicator in data transmitted, etc.). In other implementations, such querying may include treating a non-firm order as if it were a firm order (e.g., by not identifying that the non-firm order is not a firm order, by identifying that the non-firm order is a firm order, by not providing any distinction between firm orders and non-firm orders, etc).

In some implementations, an indication of an acceptance of the non-form order may be received (e.g., from a participant that was queried) as indicated at block 1107. The acceptance of the non-firm order may identify that a trader agrees to enter into a trade fulfilling at least part of the firm order and at least part of a matching order stored in an order management system. The acceptance may indicate that the trader agrees to enter into the trade (e.g., without any further negotiation, etc.).

In response to receiving the indication of the acceptance or otherwise making a determination, a request for confirmation of the non-firm order may be transmitted to a submitter of the non-firm order as indicated at block 1109. A request for confirmation may include a request to respond, a request to not respond, a request for information identifying whether the submitter is obligated to confirm, a request for information identifying circumstances that overcome an obligation to confirm, and so on. In some implementations, a request to confirm may be similar to a request to accept a firm order in which the firm order includes the matching order.

In some embodiments, an indication of a confirmation of the non-firm order may be received as indicated at block 1111. The indication may include for example, an indication that the trade should occur, an indication that the non-firm order is still available, an indication that the submitter of the non-firm order agrees to make the non-firm order firm, an indication that one or more events has or has not happened, an indication of an acceptance of the matching order, and/or any other indications. In some implementations, a confirmation may be similar to an acceptance of a firm order, in which the firm order includes the matching order. It should be recognized that in some implementations, a non-firm order may be considered confirmed if an indication to the opposite is not received. A confirmation may include an agreement to enter into a trade that relates to the non-firm order.

In some embodiments, if such confirmation is received, execution of the trade may be facilitated as indicated at block 1113. If such confirmation is not received, the participant may be notified that the trade will not be executed.

In some embodiments, those participants that are queried may not desire to respond to non-firm order queries because of a possibility that the submitter of the non-firm order may reject the trade and use the information about the acceptance by the participant to affect the market. In some embodiments, not all traders may be able to submit non-firm orders. For example, in some embodiments, non-firm orders may be submitted that meet one or more desired characteristics. Such characteristics may reflect the likelihood that the submitter will game the market and/or will confirm an accepted matching order. Some example characteristics may include that the submitter trades on behalf of others, that the submitter does not trade based for proprietary purposes, that the trader agrees to one or more restrictions, and so on. In some embodiments, all traders may be able to submit non-firm orders, and participants may be able to establish filters to block queries from some types of submitters of non-firm orders and/or only allow queries from some types of submitters of non-firm orders.

In some embodiments, a submitter of a non-firm order may be asked/required to agree to one or more restrictions regarding the non-firm orders. Such restrictions, for example, may affect the circumstances of when a submitter of a non-firm order may confirm and/or not-confirm a non-firm order and/or any other aspect of the confirmation process. In some implementations, a submitter of a non-firm order may be asked and/or required to agree to confirm an order unless the at least one of the order is cancelled and at least a part of the order is fulfilled so that the matching order (or a portion of it that is accepted in response to a query) is no longer available before at least one the transmission of and the receipt of the request for confirmation. Some implementations may include receiving an indication of such an agreement from a submitter of the non-firm order before the submitter is allowed to submit the non-firm order. In other implementations, other restrictions regarding when a non-firm order submitter may not confirm a non-firm order may be established. In some implementations, such restrictions may only apply for a limited time after submission and/or receipt of the non-firm order. For example, in some implementations, such restrictions may only apply for an initial 30 seconds. In some implementations, the time period may be similar to a time period for a shot clock, as described below. In other implementations, there may be no such time period limitation.

Some implementations may include determining whether one or more restrictions are met. Such determining may include receiving information identifying circumstances that meet such restrictions or identify that such restrictions are met. For example, in some implementations, a determination as to whether or not a non-firm order is cancelled may be made based, on information received about the cancellation of the non-firm order. A non-firm order may be cancelled for example if at least one of a request to cancel the non-firm order is received from an originator of the non-firm order by the submitter of the non-firm order, a request to cancel the non-firm order is processed by the submitter of the non-firm order, a time period during which the non-firm order is scheduled to remain active expires, and so on. As another example, a determination as to whether or not at least a part of the non-firm has been fulfilled. The part of the non-firm order may be fulfilled if at least one of an agreement to execute a trade fulfilling the at least the part of the non-firm order and another order has been entered into, a trade fulfilling the at least the part of the non-firm order has been executed, an act entering the submitter into a trade fulfilling the at least part of the non-firm order and another order has occurred, and so on.

In some implementations, a submitter of a firm order may be prevented from making a change to a price and or quantity related to a trade. In some implementations, a trade may be facilitated without a negotiation regarding the price and or quantity. In some implementations the price and/or quantity may be determined, at least in part, based on information in a non-firm order indication, a market, a machining order, a query, and/or any other information.

In some embodiments, a non-firm order submitter may be asked/required to respond to confirmation requests within a limited time period. Such a time period may include, for example 5 seconds, half a second, 50 milliseconds, etc. In some implementations, such a time period may be too small for a human to effectively confirm an order. In such implementations, the confirmation process may be computerized (e.g., a computer may determine if the order has been cancelled by an originator or was fulfilled otherwise, and if not may confirm the order). In some implementations the time period may begin when a request for confirmation is transmitted, received, and/or at any other time. In some implementations the time period may include between about 10 milliseconds and about 1 second. A time period may include a period of time having a beginning and an end point. In some implementations, a confirmation may be received within the time period, transmitted in the time period, and so on.

In some embodiments, a non-firm order submitter may be asked/required to abide by a set of procedures for treatment of non-firm order confirmation requests. For example, a confirmation requests transmitted to and/or received by non-firm order submitters may have privacy policies applied to it. For example, in some implementations, no humans may be allowed to view such confirmation, but rather the process of responding to confirmation requests may be computerized. Some implementations may include receiving an indication of an agreement to prevent humans from obtaining information regarding confirmation of non-firm orders unless the non-firm order is confirmed. In some implementations, restrictions on the storage of confirmation requests may be imposed. For example, in some implementations, computer systems that respond to confirmation requests and/or otherwise process portions of such requests may be restricted from storing information about the request, from displaying information about the request, from transmitting information about the request, and so on.

In some embodiments, information regarding rejections of confirmation requests may be provided by a non-firm order submitter. Such information, for example, may include documentary proof that one or more circumstances in which a rejection is allowed had occurred (e.g., a document showing that an order was cancelled at a certain time, a document showing that an order was fulfilled at a certain time, etc.). Such information may be used for auditing purposes to ensure that the non-firm order submitter is complying with restrictions established for the submission of non-firm orders in some implementations. In some implementations, if the non-firm order submitter violates such restrictions a number of times, a fine may be assessed, the non-firm order submitter may be restricted from submitting non-firm orders, and/or any other penalty may be provided. In some implementations, privacy policies may apply to such information. Such policies may include preventing humans from viewing the information, removing stored information from one or more computer systems, preventing information from being stored one or more computer systems and so on.

In some embodiments, when a query is made to a participant to determine if a matching order is available (e.g., stored in an OMS), the query may only present a portion of a quantity of a non-firm order. For example, because there may be a chance that part of the non-firm order may be fulfilled otherwise (e.g., through another exchange, etc.), the quantity associated by the firm order may be reduced to reflect a quantity that is likely not to be otherwise fulfilled within a desired period of time. Accordingly, an offer to enter into a trade represented by a query may include an offer to enter into a trade that fulfills only a portion of the non-firm order. Some implementations may include determining the portion to be presented. As a specific example, in one implementation, if a non-firm order for 100 shares of X stock is received, it may be determined that there is a 99% chance that the submitter of the order will still be looking for 90 shares of X stock in 30 seconds, so one or more queries may be transmitted to one or more participants for 90 shares of X stock. In various implementations, the percentage of confidence, the amount of time, and other characteristics may be altered. In some implementations, such a determination may be made based on historic data regarding the liquidity of a financial instrument, based on current market conditions, based on open orders on other exchanges, and so on. In some implementations, if the remaining portion of a non-firm order is left unfulfilled when a confirmation request is sent to the non-firm order submitter, one or more parties to the trade may be given an option to present the other party with an offer to trade the remaining portion. In some implementations, one or more algorithms that include any number of variable inputs, some of which are mentioned above, may be used to determine a portion to be presented. In some implementations, a portion presented may include a portion that is expected to be confirmed by a submitter of the non-firm order. The portion expected to be confirmed may include a portion that is likely to be available at a future time (e.g., based on an algorithm, based on historic information, based on a guess, and so on).

Some embodiments may include one or more systems interacting with a system configured to perform a method such as one described above. Some implementations may include, for example, transmitting an indication of a non-firm order (e.g., after entry into an interface, receipt from an originator, etc,). Some implementations may include receiving, an indication defining a matching firm order to the non-firm order. The indication may be received from a system configured to find matching orders in the content of a plurality of order management systems, as described above. Some implementations may include determining if the non-firm order is available for a tread involving the matching firm order (e.g., has not been canceled or otherwise fulfilled). If the order is available, some implementations may include transmitting a confirmation (e.g., within a time period, according to various restrictions that have been agreed to, etc.). The confirmation may include an indication that a trade should take place without a negotiation about a price and/or quantity. In some implementations, an interface or system may prevent a negotiation from taking place by blocking one or more communication medium, during the time period, for example.

Trading System Interaction

Figure 12:
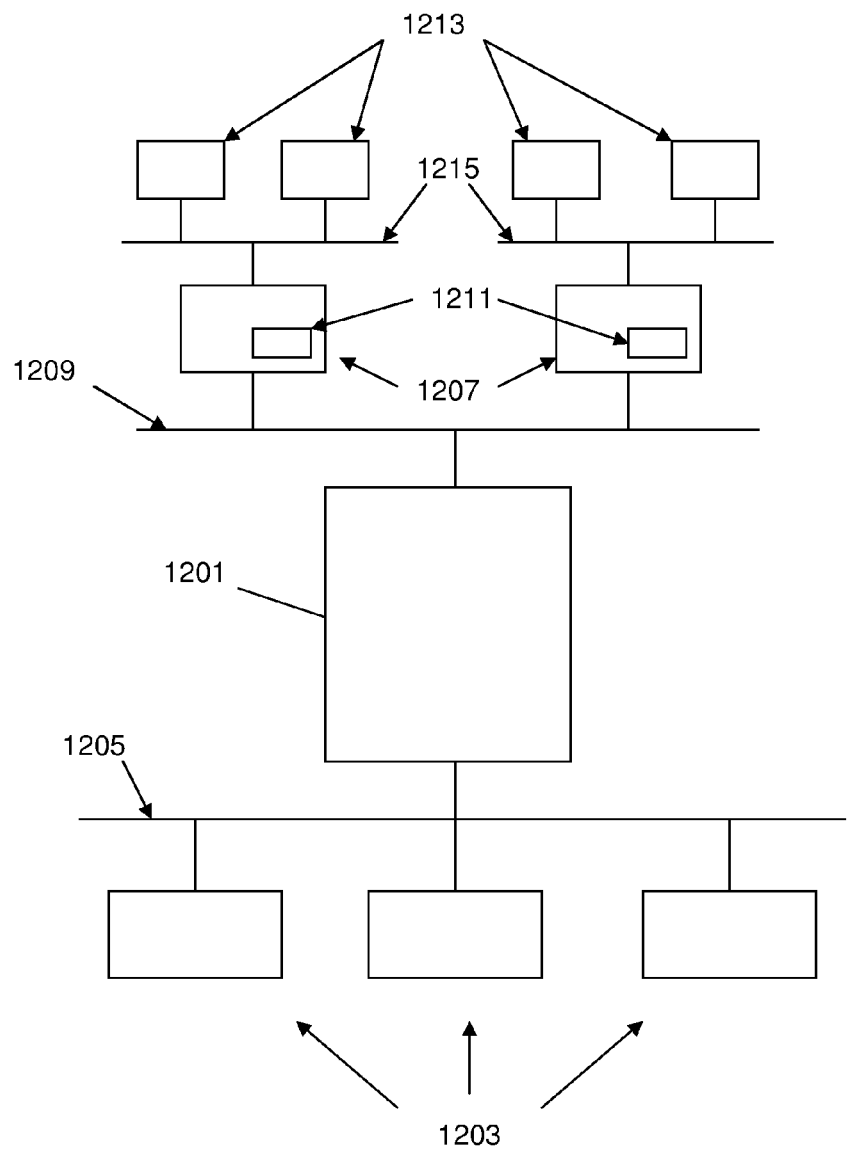
FIG. 12 illustrates an example system involving alternative trading systems.

Some embodiments may include interaction with one or more trading systems. In some implementations, such trading systems may include alternative trading systems. An alternative trading system may include a non-exchange trading venue. A non-exchange trading venue may include, for example, a trading venue in which only secondary trading of financial instruments occurs. An ATS may keep a book of orders, determine matches among orders in the book, and execute trades. In some embodiments, an ATS may include a system that operates in accordance with Securities and Exchange Commission regulation ATS and/or 242 Code of federal Regulations 300-303. FIG. 12 illustrates an example embodiment that may include interaction with one or more ATS. Although examples are described with respect to alternative trading systems, it should be recognized that other embodiments may include any trading system, including exchanges. An exchange may allow primary and secondary trading of financial instruments. Similar to an ATS, an exchange may keep any number of order books regarding any number of financial instruments and/or orders. As illustrated in FIG. 11, a trading system 1201 (e.g., an alternative trading system) may be coupled to one or more participants 1203 through one or more communication networks 1205. Such coupling is discussed above. Operation of example participants and example trading systems are also discussed above. In some embodiments, as illustrated, the trading system may be coupled to one or more alternative trading systems 1207 through one or more communication networks 1209. Each alternative trading system 1207 may store information about an order book 1211 associated with the alternative trading system 1207. An order book may include a collection of pending orders for one or more financial instruments. An order book may include a queue of orders ordered based on some priority, a database of orders keyed based on some priority, and/or any other collection of orders with any other ordering or lack of ordering. Each alternative trading system may be coupled to one or more customers 1213 through one or more communication networks 1215. The customers may submit information about orders and/or receive information about orders from the alternative trading systems 1207 related to orders that may be and/or are stored in an order book 1211. The customers may include computer systems, people, and/or any other entity that may participate in trading. Communication networks 1205, 1209, and/or 1215 may include the same or different communication networks. An order book includes at least one of a database, a queue, a list, and a collection.

Figure 13:
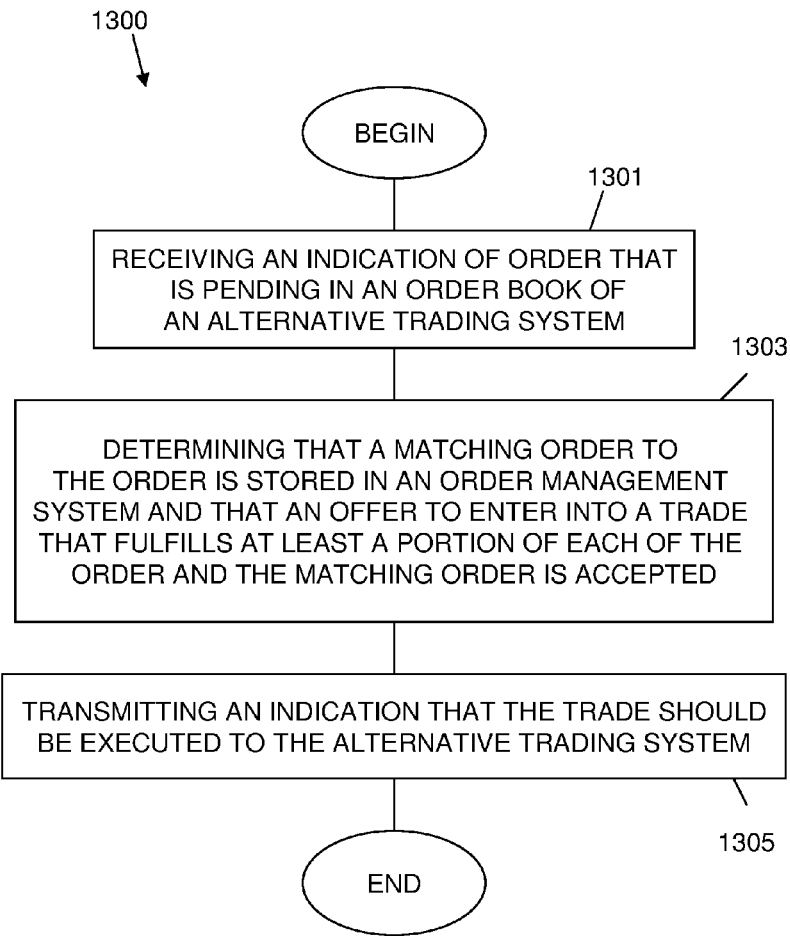
FIG. 13 illustrates an example process that involves orders from alternative trading systems.

FIG. 13 illustrates an example method 1300 that may be performed in some embodiments. Method 1300 may be performed by one or more computers, such as computers of trading system 1201.

As indicated at block 1301, method 1300 may include receiving an indication of order that is pending in an order book (e.g., 1211) of an alternative trading system (e.g., 1207). The indication may be received from the alternative trading system (e.g., 1207) through a communication network (e.g., 1209). The order may define a financial instrument, a side of a trade, a quantity, a price, and/or any other desired information. In some implementations, an order may be pending in an order book of an alternative trading system if the order is stored in the order book. In some implementations, an order may be pending in an order book of an alternative trading system if the order has not been cancelled or otherwise fulfilled after it has been received by the alternative trading system.

In some implementations, the indication of the order may include an indication that the order is pending in the order book of the alternative trading system. In some implementations, such an indication may be treated similarly to a non-firm order as described above. For example, in some implementations, the indication may be an indication that if the trading system identifies a matching order, the matching order may be fulfilled if the order has not been cancelled or otherwise fulfilled by another order. In other implementations, the indication may include an indication that the order is firm with respect to the trading system (e.g., 1201). For example, in such implementations, if a matching order is identified by the trading system, a trade fulfilling the order and the matching order may be facilitated without regard for matching orders pending on the alternative trading system.

As indicated at block 1303, method 1300 may include determining that a matching order to the order is stored in an order management system and that an offer to enter into a trade that fulfills at least a portion of each of the order and the matching order is accepted. The matching order may define an opposite side of the trade for the financial instrument. Such a determination may be similar to such determination discussed above (e.g., with respect to non-firm order).

In some embodiments, making such a determination may include transmitting a first query asking if a matching order to the order is stored in an order management system, and transmitting a second query asking if an offer to enter into a trade that fulfills at least a portion of each of the order and the matching order is accepted. Such querying may be similar to the querying discussed above with respect to non-firm orders. Such querying may include transmitting a single query as discussed above. In some implementations, such querying may include identifying that the order may not be executed by the trading system. In some implementations, such querying may include identifying that the order is associated with the alternative trading system. In some implementations, such querying may include identifying that the order is not a firm order. In some implementations, such querying may include treating the order as if it were a firm order received from a participant (e.g., not making any identification otherwise).

In some embodiments, making such a determination may include receiving an indication of an acceptance of the offer from a participant. Receiving such an indication may be similar to receiving an indication as discussed above with respect to non-firm orders.

In some embodiments, the indication of the order may identify a quantity of a financial instrument to be trading. Determination may include determining if a matching order with a smaller quantity is available. Similar to the non-firm orders discussed above, determining the availability of orders for only a portion of the quantity may result in fewer instances of an offer being accepted, but a trade not being executed. In some implementations, a determination of the portion may be made. Such a determination may be made based on a likelihood of a quantity of financial instruments related to the order being available, as discussed above with respect to non-firm orders. In some implementations, the portion may be based on an expected amount of time to communicate with the alternative trading system. For example, if the time is a long time, the opportunity that a cancellation or other fulfillment of the order occurs during transmission may be greater, so the portion may be smaller. If the time is a short time, the opportunity that a cancellation or other fulfillment of the order occurs during transmission may be less, so the portion may be larger. The time may be based on a speed of communication networks, a number of hops between source and destination of transmission, a protocol's requirements for confirmation, and/or any other information. Because alternative trading systems generally operate at a much faster rate and with much more bandwidth than typical computer systems, the portion may be larger than in some non-firm order embodiments discussed above. Other characteristics may be used to determine the portion and some implementations may include a full quantity.

As indicated at block 1305, method 1300 may include transmitting an indication that the trade should be executed to the alternative trading system. Such an indication may be transmitted through a communication network to the alternative trading system. Such an indication may identify that a trade that fulfills at least a part of the order pending in the order book and at least part of the matching order should be executed. In some implementations, such an indication may be transmitted in response to receiving the indication of the acceptance as discussed above.

In some implementations, the alternative trading system may execute the trade or otherwise facilitate execution of the trade if the order is still available (e.g., if the order has not been cancelled or otherwise fulfilled). In some implementations, the alternative trading system may provide a information about the execution of the trade to the trading system and/or to the participant taking part in the trade. Such information may identify whether the trade has been executed or not.

Some embodiments may include receiving orders from a plurality of different alternative trading systems. Some embodiments may include determining that respective matching orders are stored in respective order management systems and that offers to enter into respective trades for the orders are accepted. Some embodiments may include transmitting respective indications that respective trades should be executed to respective alternative trading systems for each order. Such transmission may occur in response to a determination regarding the respective matching order.

FIG. 13 illustrates an example method 1400 that may be performed by one or more alternative trading systems in some embodiments. Such a method, for example, may be performed by an alternative trading system that interacts with a trading system performing a method similar to method 1300 or any other desired method or system.

As indicated at block 1401, method 1400 may include receiving an indication of one or more orders. An order may define a side of a trade for a financial instrument. The indication may be received, for example, from a customer 1213 of the alternative trading system. Such a customer may include a sell side trader, any other person or system that desires to trade a financial instrument using the alternative trading system, and/or any other entity. The indication may be received through a communication network (e.g., 1215).

As indicated at block 1403, method 1400 may include storing information about the one or more orders in an order book of an alternative trading system. Storing such information may include placing the information in a database, a list, a queue, and/or any other structure in which order information may be stored. In some implementations, storing such information may include placing the information in a queue of orders for the financial instrument. In some implementations, if a matching order is received by the alternative trading system, the next order in the queue of orders may used to trade against the matching order. Such an order book may be associated with a matching engine that determines if matching orders are pending and facilitates the execution of such orders. A matching engine may include software and/or hardware that facilitates determinations of matches between orders for a financial instrument.

As indicated at block 1405, method 1400 may include transmitting an indication of an order to a trading system (e.g., 1201). Such an indication may be transmitted through a communication network (e.g., 1209). The indication may be similar to the indication received at block 1301 as discussed above.

As indicated at block 1407, method 1400 may include receiving an indication of an acceptance of an offer to enter into a trade that fulfills at least part of the order. The indication may be received from the trading system. Such an indication be similar to the indication transmitted at block 1305 discussed above. The indication may identify information about a matching order sufficient to allow the alternative trading system to execute a trade involving the order and the matching order. The indication may indicate that the trade should be executed. The indication may indicate that the trade should be executed if one or more conditions are met. In some implementations, such conditions may include that the order is available. In some implementations, such conditions may include that the order has not been cancelled and/or that the order has not been previously fulfilled. In some implementations, the matching order may fulfill only a portion of the order. In other implementations, the matching order may fulfill the entire order.

As indicated at block 1409, method 1400 may include determining if the order is available. In some implementations, determining if the order is available may include determining if the order is in the order book (e.g., by searching the order book). In some implementations, determining if the order is available may include determining if the order has been cancelled. In some implementations, determining if the order is available may include determining if the order has been otherwise fulfilled (e.g., by a previous order that was identified by the alternative trading system). An order may have been otherwise fulfilled, for example, if another matching order was previously submitted to the alternative trading system before the matching order was identified by the trading system.

Some embodiments may include determining if an acceptance is identified by the trading system before a matching order is identified by the alternative trading system. Some embodiments may include determining if an acceptance is identified by the alternative trading system before a matching order is identified by the trading system. Identifying an order or an acceptance may include ant action that makes the existence of the order or the acceptance consequential. For example, a matching order may be identified when an indication of the matching order is received by the first alternative trading system, the matching order is stored in the order book, a matching engine of the first alternative trading system identifies that the matching order and the first order match, the first order is removed from the order book, the matching order is processed by the first alternative trading system, and/or any other desired action occurs. As another example, an acceptance may be identified when an indication of the acceptance is received by the second alternative trading system, an indication of the acceptance is transmitted from the second alternative trading system to the first alternative trading system, an indication of the acceptance is received by the first alternative trading system, the indication of the acceptance is processed by the first alternative trading system, and/or any other desired action occurs.

In some embodiments, if an acceptance of an offer to enter into a trade that fulfills at least part of the order is identified by the trading system before a matching order to the order is identified by the alternative trading system, the trade may be executed. In some embodiments, if the matching order to the order is identified by the alternative trading system before the acceptance is identified by the trading system, a trade that fulfills at least part of the matching order and the order may be executed. In some embodiments, if a cancellation is identified before either the acceptance or the matching order, neither trade may be executed.

As indicated at block 1411, method 1400 may include facilitating execution of the trade that fulfills at least part of the order if it is determined that the order is available. Various examples of facilitating execution are discussed herein. In some implementations, the alternative trading system may execute the trade.

Some embodiments may include providing information about the execution to one or more customers, participants, the trading system, and/or any other entity.

Some embodiments of a trading system (e.g., 1201), may require and/or ask an operator of an alternative trading system to accept certain restrictions before participating in a method such as method 1300 and/or method 1400. In some such implementations, the restrictions may include, for example, that if an acceptance of a trade related to an order is identified through the trading system before either an order is cancelled or otherwise fulfilled, that the trade will be executed. The restriction may include that the alternative trading system is used for non-proprietary trading (e.g., at least some, primarily, to some degree, exclusively, etc.). Some implementations may be limited to alternative trading systems that meet some or all such requirements. Some implementations of an alternative trading system may include providing an indication of an agreement to such restrictions. Some implementations of a trading system may include receiving such an indication. Similar indications are discussed above with respect to non-firm orders.

In some embodiments, an alternative trading system may transmit information about all orders to a trading system, some orders to a trading system, orders that meet certain characteristics to the trading system and/or any other set or subset of orders associated with the alternative trading system to the trading system. For example, in some implementations, an alternative trading system may transmit indication about orders that are for financial instruments that are not traded frequently through the alternative trading system to the trading system. In other implementations, an alternative trading system may transmit indication about orders over a particular size to the trading system. In still other implementations, an alternative trading system may transmit indications about orders for financial instruments for which there are over a certain number of orders pending in the alternative trading system to the trading system. In other implementations, any set of characteristics may be used to determine if any, all, and/or which orders should be transmitted to a trading system. In some implementations, an operator of the alternative trading system may establish such characteristics and may control the alternative trading system to provide only such desired information.

In some implementations, a trading system may have direct and/or semi direct access to an order book of an alternative trading system. Such access may include for example access to a copy of the order book, access to a database or other representation of the order book, and/or any other access to the order book and/or a copy of the order book. The trading system may obtain information about orders in the order book using such access. In such implementations, the trading system may not wait for indications from the alternative trading system, but may proactively search the order book for order information. Such searching may be performed for example, by querying a database, querying a copy of an order book, transmitting a query to an alternative trading system, and/or performing any other actions. In some implementations, an alternative trading system may receive and process a query. Processing a query may be part of a process for responding to queries. In some implementations, an operator of an alternative trading system may establish characteristics related to order that may be obtained from the order book by the trading system, similar to the characteristics discussed above. The trading system may follow such characteristics in determining which orders in the order book to obtain.

In some implementations, access to an order book may be provide through an SSL link. In some implementations, access to an order book may involve authentication to a trading system that maintains the order book. Such authentication may include authentication using a password, an IP address, a username, and/or any other information.

In some embodiments, trading system may be coupled to a plurality of other trading systems. The trading system may allow the other trading systems to access orders received by the trading system (e.g., accessing an order book, transmitting information about orders in an order book, etc.). In some implementations, such a trading system may determine which of the plurality of trading systems first identifies a matching order to an order (e.g., base don information received from one or more of the trading systems). Based on such a determination, the trading system may execute a trade that fulfills at least part of the order. The trade may also fulfill at least part of a matching order that was identified first by a trading system (e.g., one of the plurality and/or the trading system).

Figure 14:
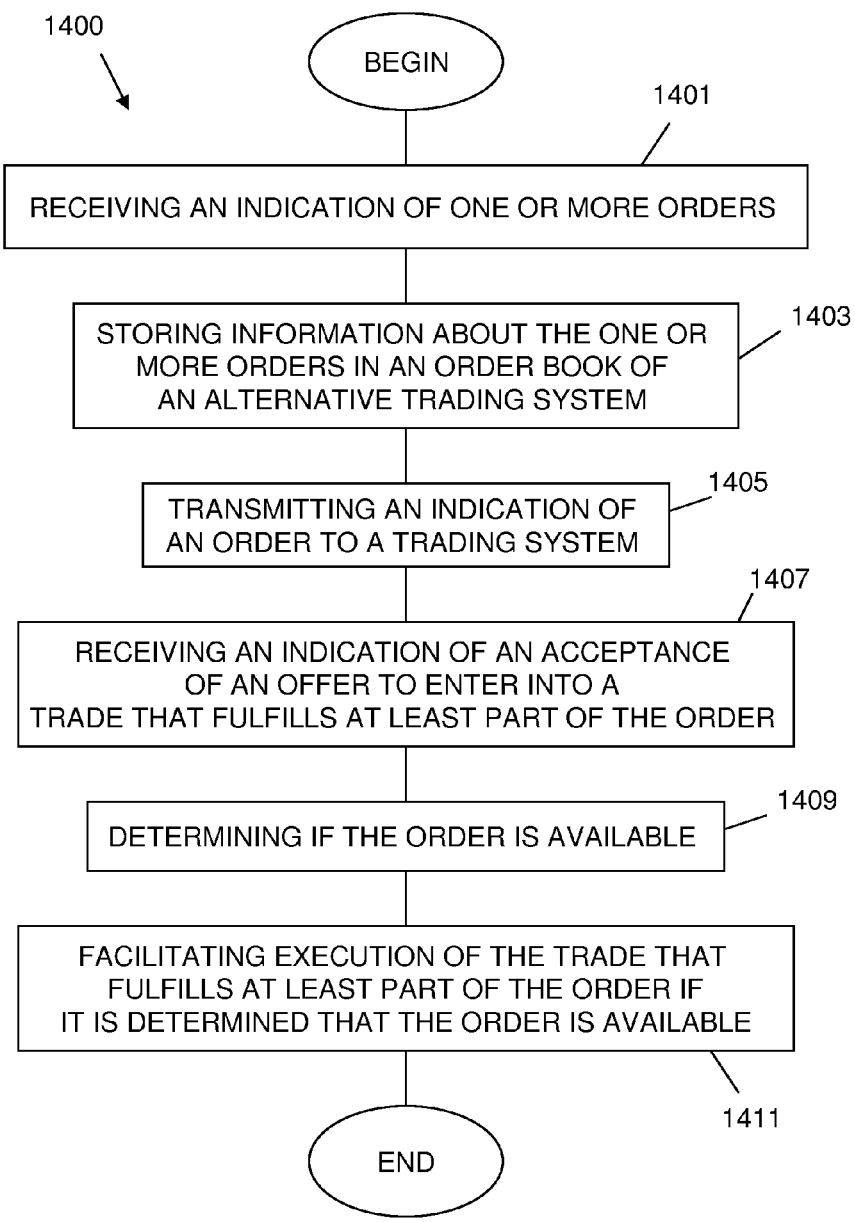
FIG. 14 illustrates an example process that may be performed by an alternative trading system.

It should be recognized that FIGS. 12, 13, and 14 are provided as examples only and that other embodiments may include different methods and/or systems.

Shot Clock

In some embodiments, a firm order submitter may have restrictions placed on their actions during a period of time after transmission and/or receipt of such orders. For example, for a period of time after an indication of a firm order defining a side of a trade is received, the submitter of the firm order may be constrained from cancelling the firm order for a first period of time. The amount of time may include an amount of time that may allow a participant to be queried and respond. In some implementations, such time may include, for example, between about 20 seconds and about 1 minute, about 5 seconds, and so on.

In some implementations, if the firm order, during that first time period, is accepted, a trade fulfilling at least a portion of the order may be facilitated, even if a request to cancel the order has been received before the acceptance. If queries are rejected during that time, the firm order may still not be cancelled until the time period ends.

In some embodiments, after the first time period, cancellation of the firm order may be allowed if a matching order is not determined to be stored in an order management system and/or if a participant is nor determined to accept the order before the first time period expired (i.e., ends).

In some implementations, constraining may include limiting the ability to perform an act of cancellation. For example, constraining may include not allowing an action to occur in a time period (e.g., preventing an action from occurring). Constraining may include imposing a penalty for taking an action. Some implementations, for example may fine a participant for cancelling in the first time period. Some implementations may prevent a cancellation in the first time period completely. Some implementations may place restrictions on cancellation in the first time period that are not placed after the first time period. In some implementations, if a request to cancel is received during the first time period, for example, it may be ignored. In some implementations if a request to cancel is received during the first time period, the request may be queued until the first time period ends and may be processed at the end of the first time period (e.g., the order may be cancelled if it was not accepted before the end of the first time period). In some implementations, cancellation may include cancelling an order, revoking an order, invalidating an order, and so on. In some implementations, allowing may include letting an act happen with a penalty or without a constraint.

In some implementations, by constraining cancellation of the firm order during the time period, information leakage about orders pending in an OMS may be prevented. For example, in other implementations, a firm order may be cancelled after either (a) it is determined that no matching orders are present with any participants or (b) all queries sent to participants with matching orders are negatively responded to or a time period passes. In some implementations, option (a) may take a short a mount of time (e.g., less than a second) and option (b) may take a variable amount of time depending on how quickly the participants respond to queries. Accordingly, if option (a) occurs, then the firm order submitter will be able to cancel orders quickly, but if option (b) occurs then the firm order submitter will not be able to cancel orders until some time longer amount of time passes. By tracking such time, the firm order submitter may be able to tell whether there were matching orders pending or not based on how long the wait to cancel was. By requiring a standard level (e.g., 20 seconds, 1 minute, etc.) before cancellation is allowed, firm order submitters may not be able to tell the difference between these different situations and therefore less information about the contents of OMS may be leaked to firm order submitters. An indication of a remainder of the time period may be shown to a submitter (e.g., though an interface). An indication of the end of the time period may be shown to a submitter (e.g., through an interface). In some implementations, a standard time period determined before an indication of an order is received may be used as the first time period.

In some embodiments, a time period during which cancellation is constrained may be randomly determined for one or more firm orders. Such random time period may simulate a time period for reply of a participant. In some implementations, the time period may be randomly determined between a minimum and maximum period of time (e.g., between 5 seconds and 20 seconds, 1 minute, etc.). In some implementations, such time period may be shown to the submitter of the firm order (e.g., through an interface, as a counting down clock, etc.). In some implementations, an indication that the end of the period is reached may be sent to the submitter (e.g., in addition to the time period, instead of the time period, by changing a color, by playing a tone, through an interface, and so on).

In some embodiments, an indication of an amount of time remaining in the first time period and/or whether the first time period has passed may be transmitted to one or more participants. In some embodiments, the amount of time remaining in the time period before the order may be cancelled may be shown to a recipient of a query (e.g., a clock may be shown in an interface window, a query may include the indication, etc.). In some implementations, an indication that the time period has ended may be shown to the recipient of a query (e.g., a window may change colors, an icon may be shown, an amount of time remaining may be shown, etc.). In some implementations, an indication of the query may be removed from an interface after the end of the time period (e.g., a window may be closed or removed from an interface). In some implementations, the recipient may respond to the query after the time period, but the firm order may be cancelled before such response is processed. In some implementations, if the firm order is cancelled, an indication of the query may be removed (e.g., removed from an interface, a window may be closed, etc.).

In some embodiments, an indication of whether the first time period has passed may be provided to a submitter of the firm order. Such an indication may include an amount of time until the time period ends, an indication that the time period has not passed, an indication that a time period has changed, and so on.

Some implementations may include a system configured to interface with a system such as those describe above. In some implementations, for example, information about a firm order may be accepted (e.g., through an interface). In some implementations, an indication of the firm order may be transmitted (e.g., to a system configured to find matching orders to firm orders in the content of a plurality of order management systems). Some implementations may include providing an indication of a time period during which the firm order may not be cancelled (e.g., through an interface, to a trader that submitted information about the firm order, and so on). Some implementations may include receiving an indication of the time period (e.g., from a system to which the order was submitted, etc.). In some implementations the indication may include a color coding of an interface, an indication of an amount of time remaining in the first time period, and so on.

In some embodiments, a cancellation of an order may be constrained as discussed above and/or in any other way. When an order is submitted, some embodiments may determine whether cancellation should be constrained for that order. Determining whether cancellation should be constrained may include determining whether a number of orders has been submitted prior to the order. The number of orders ay include orders that meet certain criteria, some of which are discussed below. In other implementations, a determination about cancellation constraining may be randomly made. For example, each order may have a 10% chance of having cancellation constrained. A random number generator or other method of random selection may determine that the order should or should not have cancellation constrained. It should be recognized that any method of making such a determination may be used and that examples are non-limiting.

In some implementations that constrain cancellation of an order after a number of orders have been submitted may keep a count of orders submitted. For example, such embodiments may constrain cancellation of every $20^{th}$ order submitted. In some implementations, Cancellation of the other (e.g., non $20^{th}$ orders) orders may not be constrained. In some implementations, cancellation of the other orders may not be constrained unless a matching order to the other orders has been identified (e.g., in an order management system). Such constraining for the other orders may be for a period of time that gives the participant associated with the order management system a chance to accept or reject the order. Cancellation of the order (e.g., the $20^{th}$ order) may be constrained even if a matching order is not identified. Accordingly, a submitter of the order may not know whether a match is found based on whether cancellation is constrained.

In some implementations, a number of other orders may be submitted. The other orders may be treated as described elsewhere herein. In some implementations, the number may be any desired number. For example, the number may be 20 orders. In some implementations, the number may be a random number. The number may be determined periodically. The number may be determined randomly. The number may be determined to simulate random market actions.

In some implementations, the other orders may all be submitted from a same submitter (e.g., the same submitter as the order (e.g., the $20^{th}$ order)). Each submitter may be tracked to determine whether the number has been submitted by the submitter. In other implementations, the number may be submitted from different submitters.

In some implementations, the other orders may include all orders submitted (e.g., by one submitter, by many submitters). In other implementations, the other orders may include orders that meet one or more criteria. For example, in some implementations, the other orders may include only orders that have not been fulfilled (e.g., within a time period after submission). In some implementations, the other orders may include orders for which at least one of (i) no matching order has been found in an order management system and (ii) no offer to enter into a trade for the order was accepted.

Some embodiments may include determining that no matching order is stored in the order management system associated with any of the plurality of participants for one or more of the other orders. In such an implementation, each of such other orders may not have their cancellation constrained. In some such implementations, each of such other orders may have their cancellation constrained only until the determination is made but not past that point. Such a determination may take about 100 milliseconds or less.

In some implementations, a determination of whether a matching order is stored in an order management system may be made. In some implementations, a database of orders may be searched to make such a determination. In some implementation, such a determination may be made, for example, based on whether an indication that a matching order is stored in the order management system has been received. In some implementations, a participant may be queried as discussed elsewhere herein. In some implementations, the participant may be configured to transmit an indication that a matching order is stored in an order management system. Such an indication may be sent regardless of whether an offer has been accepted, unlike some embodiments discussed herein.

In some embodiments, all orders may have cancellation constrained for an initial determination to be made. The time to make the determination may be minimal (e.g., less than about 100 ms). In some implementations, to make the determination, participants may be queried. Each participant may respond with an indication that a matching order is or is not stored in an order management system associated with the respective participant. In some implementations, a lack of response may be an indication of a default value (e.g., no response before the end of some initial period means no matching order is stored). In some implementations, if a determination is made that any of the participants has a matching order stored in an order management system, cancellation of the order may be constrained for a period of tie to allow the participant to accept the order if desired. If a determination is made that no matching orders are stored, then cancellation ay be allowed after that determination is made. In some implementations, that cancellation may be constrained as if the determination that the matching order was stored was made in some circumstances (e.g., if such a constraining decision is made as described above, if a number of prior orders have been submitted, etc.). Such constraining may make it difficult for a submitter to determine whether a matching order was found or not.

As mentioned above, in some embodiments, if it is determined that an order is stored in an order management system of a participant, cancellation may be constrained for a time period so that the participants may respond to an offer. The time period may be about 5 seconds. In some embodiments, if it is determined that no such order is stored in the order management system, then cancellation may not be constrained except under certain circumstances, as discussed herein.

Some embodiments may include determining that none of the plurality of participants accepts an offer to enter into the respective first trade defined by one or more of the number of orders. Such a determination may be made based on whether an indication that such an acceptance to an offer has been received (e.g., from a participant as discussed above).

In some embodiments, the other orders may be limited to orders with one set of criteria or more than one set of criteria in any combination. For example, in some embodiments, the number may be accepted orders, order without matching orders, and orders with matching orders that are unaccepted. In other implementations, the orders may be any subset or other set of such orders. Orders that do not meet such criteria, in some implementations, may not be included in a count of orders to determine if a constraint should be made to cancellation of the order.

As discussed above, if cancellation is determined to be constrained, cancellation may be constrained during a first time period and allowed after the first time period. As discussed above, the time period may be a random time period. In other implementations, the time period may be a fixed time period (e.g., about 5 seconds).

In some implementations, a determination that no orders matching orders are stored in order management systems associated with a plurality of participants may be made before an end of the first time period. Such a determination may have no affect on the ending of the time period. Rather, in some implementations, the constraining may continue despite there being no matching orders available for the order.

It should be recognized that various examples above are non-limiting and other methods of constraining orders may be used. Such constraining may limit an order submitter's ability to determine whether a matching order exists based on his or her ability to cancel an order.

Fund Participants

In some embodiments, one or more funds (e.g., mutual funds, bond funds, stock funds, index funds, actively managed funds, commodities funds, exchange traded funds, etc.) may participate.

Some such funds may use OMS systems and may participate in a similar way as other participants with OMS systems, as described above (e.g., buy side participants). Other fund participants may not use such OMS systems and/or may not want to provide access to such OMS systems. In some embodiments, a publication of a fund composition may be used to determine what types of queries and/or other information to transmit to fund participant.

In some embodiments, an indication of a composition of a fund may be received (e.g., over a communication network, as a printed publication of a fund prospectus, and so on). The composition of the fund may include a plurality of financial instruments that are owned by a fund (e.g., a listing of stocks owned by a mutual fund, and so on). The composition may include an amount of each financial instrument owned or desired to be owned by the fund. The composition may include a target percentage of the fund made up of each financial instrument. The composition may include a snap shot view of the fund at a particular time, at a desired future time, and so on.

The indication of the composition may include any information from which at least a portion of a composition of a fund may be determined. For example, a composition of a fund may include a written statement of the desired composition of the target composition of the fund, such as may be found in a published prospectus. In some embodiments, an indication of a composition may be obtained directly from an operator of a fund, from a website that tracks fund information, from a third party, and so on. The indication may include information from a plurality of sources that taken together identify the composition.

An interest in trading related to a particular financial instrument may be approximated/determined based on the composition of the fund and/or any other information (e.g., price changes). For example, in some implementations, one or more orders to buy or sell a financial instrument may be received. For one or more such orders, a determination may be made if the financial instrument defined by the order is part of the composition of the fund. Such a determination may include comparing the financial instrument to the composition (e.g., searching the composition for the financial instrument, searching a database, and so on). If the financial instrument is part of the composition of the fund, a query may be transmitted asking if a fund operator (e.g., anything or one that has the capacity to enter into trades on behalf of the fund) desires to enter into a trade fulfilling the order and a matching order for the financial instrument. Transmitting the query may in some implementations include querying an order management system of the fund as described above, transmitting a query to a trader or machine operated by a trader, and/or soliciting an acceptance in any other way.

In some implementations, queries may only be sent to a fund if the composition indicates that the fund holds a certain amount of a financial instrument. For example, a query asking if the fund is interested in a trade to sell a financial instrument may only be sent to the fund if the composition indicates that the fund holds enough of the financial instrument to fulfill the order. In some implementations, a query may only be sent if the fund holds some other threshold amount of the financial instrument (e.g., a million shares), holds some minimum percentage of the threshold instrument (e.g., 10% of the makeup of the fund is the financial instrument), the financial instrument is one of the top number of financial instruments that make up the fund (e.g., 1 of the top 10 constituents of the fund), and/or any other set of filters may be used.

In some implementations, changes in price of one or more financial instruments in the composition of a fund may be used to determine whether to query a fund regarding a trade. For example, in some embodiments, a change to a price of a financial instrument defined by an order may be determined. Such a change in price may be based on the time when the composition was received, a time that the composition identifies and so on. Such a change may be determined based on historic and current information about a price of the financial instrument (e.g., such information may be received from a third party such as a stock tracker, a marketplace, and so on).

In some embodiments, based on a determined change in price, a determination of whether an operator of a fund is likely to be interested in a trade that matches the trade defined by a received order may be made. The operator may be likely to be interested if a current situation indicates that there is a heightened chance that an operator would accept an offer for a trade. Operators may attempt to keep a fund close to or at the composition levels based on value of the holding of each financial instrument in the composition, so when a price increases or decreases the relative value of the holdings of that financial instrument may be changed and a sale may be desired to return the composition to the target level. Determining if the operator is likely to be interested in the opposite side of the trade for the financial instrument includes determining if the price change includes an increase or a decrease in price. For example, if a price change includes an increase in price, then the operator may be determined to likely be interested if the order includes a sale of the financial instrument. If the price change includes a decrease in price, then the operator may be determined to be likely to be interested if the order includes a buy of the financial instrument. Some implementations may take into account changes in the prices of other financial instruments in the composition with respect to the financial instrument. Some implementations may take into account a relative change in price of the financial instrument with respect to changes in price of other financial instruments in the composition (e.g., to determine if a sale or purchase may be needed to return a composition to a target level).

If the operator of the fund accepts an order, an indication of an acceptance may be transmitted from the fund. The acceptance may be received by some embodiments. As described above, a trade may be facilitated in response to receiving the acceptance.

Risk Pools

Some embodiments may perform/allow filtering of participants based on the participants' prior actions. For example, in some embodiments, when a participant is queried regarding an order, the response of the participant may be tracked. Participants may be arranged into groups based on the frequency of positive responses to queries. For example, participants may be arranged into groups as follows: participants with 100% to 75% positive response rate, participants with 75% to 50% positive responses, and participants with less than 50% positive responses. It should be recognized that these groups are given as an example only, and that other embodiments may include any number of groups and any arrangement of groups. Such groups may be referred to as risk pools. Submitters of orders may indicate that queries regarding the orders should be sent to participants in one or more of the groups and/or not to participants in one or more of the groups. Because sending a query to a participant reveals information about an order, the submitter of the order may use the response rate to limit exposure of that information to participants that are historically likely to respond positively.

In some embodiments, a plurality of sets of queries may be transmitted to a plurality of participants. Each set of queries may ask the plurality of participants about a respective order. Each query of each set of queries may ask a respective participant if a respective matching order to the respective order is stored in a respective order management system associated with the respective participant and if the respective participant accepts a respective offer to enter into a respective trade that fulfills at least a portion of each of the order and the respective matching order. If the participant accepts the offer, a positive response/indication of the acceptance may be received. In some implementations, if the matching order is stored in the order management system, an indication of that storage may be received. Accordingly, in some implementations, it may be determined from this information if the matching order is stored in the order management system, and if it is stored, whether or not it was rejected or accepted. If the order is accepted, some implementations may include facilitating execution of the trade. In other embodiments, as described above, queries to order management systems may not be used, but rather databases may be searched or any other methods may be used.

In some embodiments, the plurality of participants may be assigned to one or more risk pools based on the results of the querying. Each risk pool may correspond to at least one rate of positive responses to offers to enter into trades. The rate of positive responses may, for example, include a comparison (e.g., a ratio, a percentage, etc.) between a number of positive responses and a number of offers (e.g., offers with a characteristic, offers associated with a submitter, and so on). Such a rate, for example, may correspond to offers made to participants if the matching order is stored in the order management system, to all queries sent to participants, and/or to queries/orders having one or more characteristics. In some implementations, a rate of positive responses includes a rate of positive responses to all offers to enter into a trade when a matching order is stored in an order management system. In some implementations, a rate of positive responses includes a rate of positive responses to offers to enter into a trade when a matching order is stored in an order management system and a query is associated with the submitter. In some implementations, a rate of positive responses includes a rate of positive responses to offers to enter into a trade when a matching order is stored in an order management system and associated with an order having at least one similar characteristic to the order. In some implementations, such a characteristic may include a financial instrument, a quantity range, a price range, a market capitalization, an industry, and a financial instrument type.

In some embodiments, a submitter of an order may be allowed to identify one or more risk pools to which queries regarding the order should and/or should not be transmitted. For example, a submitter may use an interface to identify such information, may transmit an electronic message identifying such information, may establish default risk pools that identify such information, and/or may identify such information in any other way. Some implementations may include providing an interface through which the one or more risk pools may be selected. Queries regarding the order may subsequently be made to participants in accordance with such information.

Some embodiments, may include submitting one or more orders and/or indications identifying risk pools. Some embodiments may include receiving an indication of a plurality of risk pools. Such an indication may be presented to a person though an interface to allow selection from among the plurality of risk pools. Some implementations may include receiving a selection of at least one risk pool (e.g., through an interface, through an electronic message, etc.). Some implementations may include transmitting an indication that participants associated with the at least one selected risk pool should be queried regarding an order (e.g., through an electronic message, etc.). Some implementations may include receiving an indication that execution of a trade fulfilling an order has been facilitated. Some implementations may include providing an indication of such a facilitation (e.g., as a display on an interface to a person, as an electronic message, etc.).

It should be recognized that risk pools may be combined with any other implementations and/or concepts described herein and that any methods and/or apparatus may be used in various embodiments.

Substitutability

In some embodiments, one financial instrument may be substitute for another financial instrument. A substitutable financial instrument may include an instrument that is replaceable for another instrument (e.g., fulfills a same reason for existence, has similar characteristics, and so on). For example, if an order is for a first financial instrument, a second financial instrument may be used to fulfill the order instead of the first financial instrument. The order may be an order pending in an order management system, an order submitted by a sell side participant, and/or any other type of order. For example, a participant that desires to buy stock in a soda company may enter an order for Coca-Cola; however, the order may be fulfilled with stock for PepsiCo that fulfills the desire to buy stock in a soda company, bonds in Coca-Cola, derivatives related to Coca-Cola, a futures contract for soda, and so on. Various criteria/tests may be used to establish if one financial instrument is substitutable for another financial instrument. Participants may identify which financial instruments are substitutable for each other. Exchange rates between financial instruments may be established based on prices and/or desires of the various participants.

As described above, some embodiments may include receiving an indication of an order. The order may define a side of a trade for a first financial instrument. The indication may include an identification of one or more other financial instruments that may be substituted for the first financial instrument to fulfill the order. The identification may include identification of characteristics of such other financial instruments (e.g., market cap, industry, type of instrument, etc.), a specific enumeration of the other financial instruments, and/or any other information from which such other financial instruments may be determined. In some implementations, such characteristics may include an industry, a type of financial instrument, and a market capitalization, a company, and/or any other characteristics.

As discussed above, some embodiments may include determining if a matching order is stored in an order management system associated with a participant. As described above, such determination may include transmitting one or more queries. The matching order may be for the first financial instrument or may be for another financial instrument. For example, in some implementations, the matching order may be for a different financial instrument that is substitutable for the first financial instrument. The order management system may identify what financial instruments are substitutable for the financial instrument for which the matching order is for. For example, the first financial instrument may be stock in Coca-Cola and the matching order may be for stock in PepsiCo. The order management system may identify that Coca-Cola is substitutable for PepsiCo. Such identification may be made directly through a list of substitutable instruments, may be made through asset of characteristics that identify substitutable instruments, and/or in any other way.

In some implementations, if an order is for a quantity of a first financial instrument, and a trade fulfilling the order is for a substitutable financial instrument, the quantity of instruments traded and/or the price at which the instruments are traded may not be the same as those identified by the order for the first financial instrument. For example, an order for 100 shares of Coca-Cola may be fulfilled by a trade for 50 shares of PepsiCo. The quantity and/or price at which a trade takes place may be identified by an order management system (e.g., the OMs may identify a set of exchange rates between the financial instruments). The quantity and/or price at which the trade takes place may be identified from a market price (e.g., the market price of the two financial instruments may be used to determine an exchange rate between them, the most recent trade price, a current bid and/or offer, a midpoint price, etc.). The price and/or quantity may be determined in any other way.

As discussed above, a trader may be presented with an offer to enter into a trade. The trade may include a trade for the first financial instrument even if the matching order is for a different financial instrument. In other implementations, the trade may include the other financial instrument even if the order is for the first financial instrument. The trader may accept or reject such an offer.

In some embodiments, an acceptance of the order may be received (e.g., if the trader accepts the offer). The acceptance may indicate that a trade fulfilling an order should be executed. In response to receiving the acceptance, execution of a trade fulfilling an order may be facilitated.

From the point of view of a participant with an order in an order management system, an indication may be received for an order for a first financial instrument. A determination may be made that a matching order for a second financial instrument that is substitutable for the first financial instrument is stored in the order management system. A trader may be solicited for a binding acceptance to enter into a trade that fulfills the order and the matching order. Some implementations may include providing an interface through which the binding acceptance may be requested, transmitting a request for the binding acceptance (e.g., through an electronic message, and/or any other method of soliciting a binding acceptance. The trade may be for the first financial instrument even though the matching order is for a different financial instrument. In other implementations, the trade may be for the other financial instrument even though the order is for the first financial instrument. Only if an acceptance is received (e.g., though an interface, from the trader, etc.) execution of the trade may be It should be recognized that substitutability may be combined with any other implementations and/or concepts described herein and that any methods and/or apparatus may be used in various embodiments.

XII. MISCELLANEOUS INFORMATION 1

Numbering of elements in the below section may not match to numbering of elements in the previous sections. This section provides additional disclosure of relevant material, and should not be interpreted to limit any prior disclosures. For example, no definitions below should be applied to disclosure above unless explicitly stated otherwise and descriptions of preference do not apply to above disclosed embodiments.

Although computers are heavily used to facilitate trading of securities, manual intervention may still be required at certain steps in the trading process. For example, most traders at institutional investment management firms record their orders to purchase or sell securities in computerized order management systems (OMS's). However, one or more traders at each firm may manually review the orders in the OMS and attempt to fill the orders by contacting one or more market intermediaries. Typically, the traders transmit the orders in the OMS by telephone or separate data entry links to registered broker-dealers for the securities, to electronic marketplaces that trade the securities, or to other market intermediaries. Accordingly, manual effort is often required to actually execute the orders in the OMS.

One problem arising from this manual effort is that institutional traders may be unable to execute trades involving large quantities of securities without adversely affecting the market price of the securities. For example, institutional traders often need to trade large quantities of securities due to the continuing need of investment managers to respond to changes in market conditions by altering the contents of their investment portfolios. As these portfolios increase in size due to increased investor activity, the corresponding quantity of securities to be traded in order to achieve a similar portfolio balance also increases. Market impact costs, or adverse costs resulting from the institutional traders' activities, rise in such circumstances because locating parties with whom to trade such large quantities of securities becomes more difficult for the market intermediaries.

Moreover, if the market intermediaries become aware that an institutional firm wants to, say, sell a large block of a particular equity security, this awareness is likely to lower the sale price that the institutional firm can obtain due to the normal processes of supply and demand. The effect is also likely to be exacerbated by speculation from others with knowledge of the order as to why the particular investor wishes to sell such a large quantity of the security. Similarly, if market intermediaries become aware of the fact than an institutional firm wants to buy a large block of a particular equity security, this awareness will likely increase the purchase price that the institutional firm will have to pay. This adverse effect on price is further exacerbated by the fact that traditional market intermediaries trade for their own accounts.

One strategy commonly employed by institutional traders to offset market impact costs is to spread out trade orders for a large quantity of a security into small orders each handled by a different market intermediary, sometimes over several trading days. Of course, this strategy brings about its own problems in that the market price can change significantly during this extended trading period due to the unforeseeable activities of others.

Another strategy that may be employed is to spread the orders for the security among one or more electronic marketplaces. However, the traders may need to manually transmit each order to the electronic marketplaces using a telephone or a separate data entry link. The fact that the traders may need to perform these extra steps, which include duplicate entry of basic order data already recorded in the OMS, causes many traders to use these electronic marketplaces infrequently, and to supply the marketplaces with only a small subset of the total orders. As a result, these electronic marketplaces often lack the liquidity required by a trader to timely execute orders.

The lack of integration between the OMS and the electronic marketplaces also poses problems when an institutional trader wishes to trade a particular security simultaneously within an electronic marketplace and, for example, over the telephone with a traditional broker. For example, some electronic marketplaces attempt to find matches at only specific time intervals. If a trader wishes to buy 100,000 shares of IBM, and has placed an order for half that amount in an electronic marketplace, the trader will not know how much, if any, IBM stock was purchased until after the next scheduled match attempt. In the meantime, the trader potentially could have purchased more than 50,000 shares from a broker over the phone at a better price.

Therefore, there is a need in the art for an electronic trading marketplace that does not require a significant amount of manual intervention by traders or other parties, offers anonymity, and offers a high amount of liquidity.

Some embodiments address the above need by providing for the automated transmission of orders (i.e., without manual trader intervention) from the various order management systems (OMS's) used by investment management firms or other entities having trading systems to an electronic trading marketplace (ETM). A firm with a trading system stores information about orders in an OMS to manage its order flow, to monitor the initiation, placement, and execution of orders, and for related purposes. Software providing the functionality of an OMS is well known in the art.

OMS interfacing modules (OIMs) at the firms may automatically transmit orders from the OMS's to the ETM and preferably update the OMS's in response to orders executed at the ETM. Traders can communicate with the ETM to anonymously negotiate trades of securities. As used herein, a "security" is an ownership or creditorship interest, such as a stock certificate, bond, or any other financial instrument, contract or transaction, such as a forward, futures, option, put, call, collar, swap, or currency contract on any security. This description uses the term "security" for convenience but it should be understood that the term covers financial instruments generally. It should also be understood that other embodiments may be used for trading of other goods and/or services.

The ETM may include an OMS data integration module (ODIM) for receiving and processing data representative of orders received from the OIMs. In a preferred embodiment, the data from the OIMs are provided to the ETM in a standardized format that requires little processing by the ODIM. The orders processed by the ODIM may be stored in an ETM database.

A negotiation module in the ETM may support negotiations between traders. In one embodiment, an indications module transmits orders received by the ETM among the traders based upon filtering criteria established by the traders and/or the ETM. These orders are transmitted among the traders in the form of non-binding indications. Based upon these indications, traders at one institution can enter into negotiations with traders at other institutions, through the negotiation module of the ETM. In one embodiment, at least parts of the negotiations are conducted anonymously.

A trader authentication module may authorize and/or authenticate traders who log into the ETM in order to perform trading negotiations and/or other functions. A transaction history module may record transactions performed by the ETM in the ETM database. The transaction history module also preferably records other data processed by the ETM including, for example, the orders received from and sent to the trading systems and the conducted negotiations.

A typical trading system at an investment management firm or other entity at which trading is performed includes a number of workstations coupled to an OMS server via a network, with a trader at each workstation. Each workstation preferably executes a trader OMS interaction module (TOIM) for facilitating interactions between the trader's workstation and the OMS server. In one embodiment of the present invention, the TOIM allows a trader to add, delete, or modify open or contemplated orders stored in the OMS database. The OMS, which includes the OMS server, OMS database, and TOIM, is typically provided by an OMS vendor, though some firms have developed their own OMS's.

In connection with the present invention, each workstation also preferably executes an ETM interaction module (EIM) for facilitating interactions with the ETM. The EIM allows a trader to send information to the ETM and view and respond to information received from the ETM. Typically, this information includes information about the trader's indications, information about other traders' indications, and orders transmitted to and received by a trader during a negotiation.

The OMS database holds data representative of open, contemplated, and/or completed orders to buy and/or sell securities by traders using the trading system. The OIM is in communication with the OMS database and the ETM. An OMS database integration module in the OIM may read data records stored in the OMS database and, in a preferred embodiment, also creates and modifies data records stored in the OMS database upon execution of a trade through the ETM. In one embodiment, the OMS database interaction module directly accesses the OMS database and in another embodiment it sends commands to an application programming interface (API) in the OMS for accessing the database.

The OIM may include an ETM communication module for communicating with the ETM. In one embodiment, the ETM communication module provides selected data records in the OMS database to the ETM and, in a preferred embodiment, receives data and/or instructions from the ETM regarding changes to make to the OMS database. In addition, the OIM preferably includes a data record conversion module for modifying the format of data records sent to the ETM and/or received from the ETM. The OIM also preferably includes a filtering module for filtering out specified orders by security type, security name, order type, order price, order quantity, or other category, so that those orders are not transmitted to the ETM.

In some embodiments, the OIM or some other component may include a reasoning module. Such a reasoning module may determine why a particular order is present in an OMS database (e.g., by asking a trader entering the order, by receiving such information from a trader, by searching strategy information that also may be stored by an OMS, by analyzing trading behavior, by receiving information from a risk model associated with a trader, etc.). In some embodiments, the reasoning module may be used to suggest and/or enter orders for securities that fulfill reasons for other orders being present. Such functionality may be useful if an order would otherwise go unfulfilled and a reasonable alternative security is available.

Preferably, the OIM transmits to the ETM data records in the OMS database relating to a trader's orders when the trader logs on to the ETM. Once the OIM determines that the trader has logged on to the ETM, the OIM retrieves data records about that trader's orders suitable for transmission to the ETM from the OMS database. In one embodiment, the OIM converts the data records retrieved from the OMS database into a standardized format understood by the ETM. In another embodiment, this functionality is part of the ETM.

After a trader has logged on to the ETM, the OIM determines whether the contents of the OMS database have changed. If the OMS database has changed, the OIM determines whether the change should be transmitted to the ETM. In one embodiment, the OIM continues to determine whether the contents of the OMS database have changed between the time that a trader logs on to the ETM and the time that the ETM commences trading. In another embodiment, the OIM does not commence making this determination until the time that the ETM commences trading.

Because typical OMS's are complex and multi-featured, and because securities of types not handled by the ETM may be traded using the OMS, some changes to the OMS database do not necessitate a transmission of updated data to the ETM. The OIM preferably transmits changes to the database to the ETM if the changes represent new or modified orders.

The OIM preferably updates the database in response to information received from the ETM indicating executed trades or other information. In a preferred embodiment, if an execution occurred in the ETM involving an order in the OMS associated with the OIM, the OIM receives information from the ETM describing the execution. This information includes, for example, the type, amount, and price of securities traded, the time of execution, and/or information identifying the original order in the OMS database on which the execution was based. The OIM converts the received information about the execution into the format used by the OMS and updates the OMS database accordingly. As a result of these steps, the OMS is updated automatically and transparently to reflect executions performed at the ETM. The executions appear to the OMS as typical trades conducted at another broker, so no special functionality needs to be added to the OMS in order to interact with the ETM beyond that functionality described herein.

Although several embodiments may be described as involving "traders" it should be recognized that other embodiments may not involve traders in all the same ways as described or at all. Rather than involving traders in negotiations, entering of trades in an OMS, and/or other actions, some embodiments may be automated through a trading algorithm. Such a trading algorithm may control the entry of traders, the negotiation of deals, and/or any other actions that would traditionally be controlled by one or more traders at a trading institution.

Figure 15:
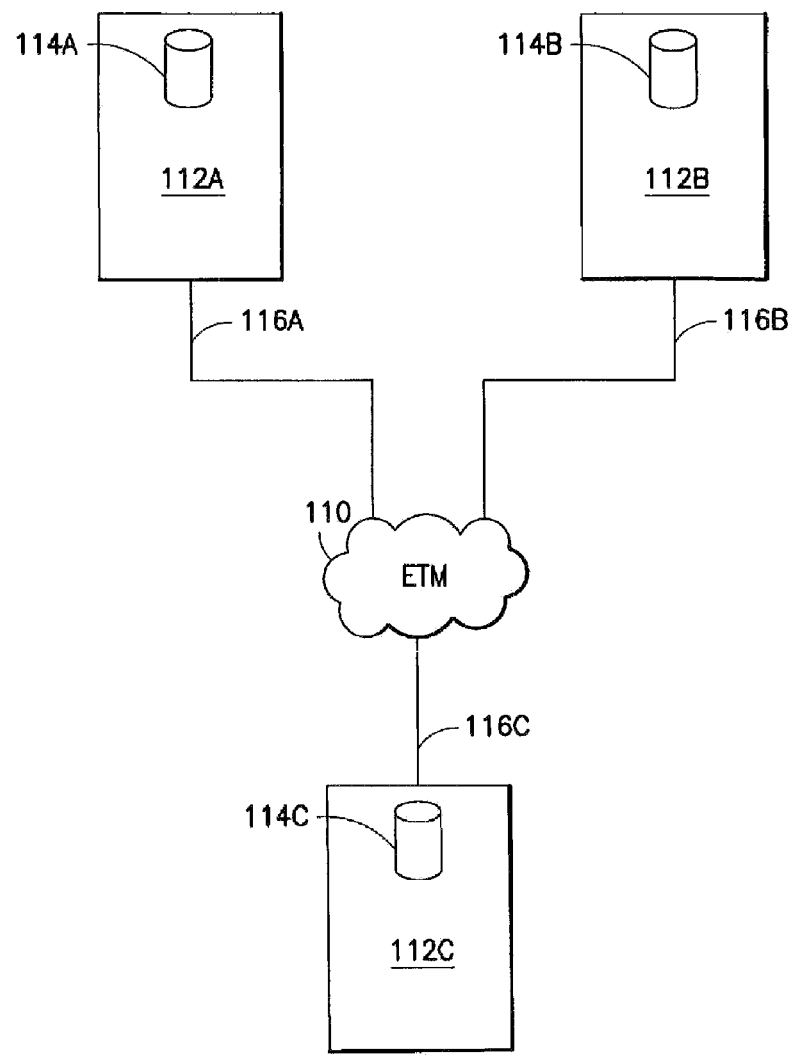
Figure 16:
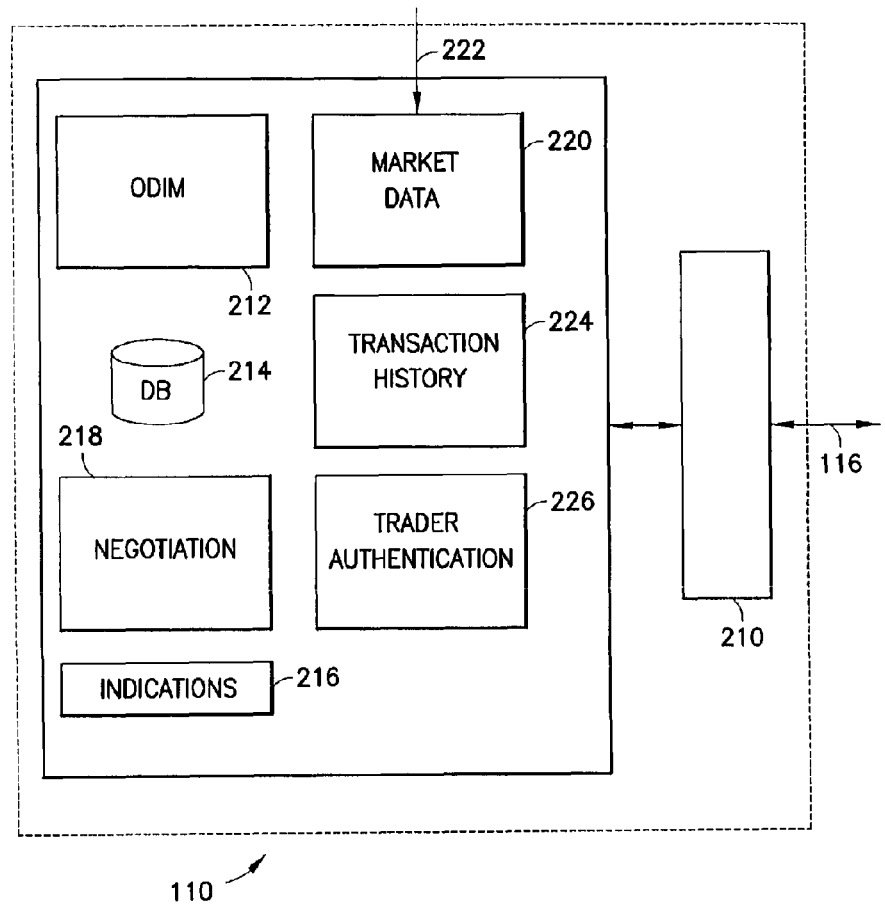
Figure 17:
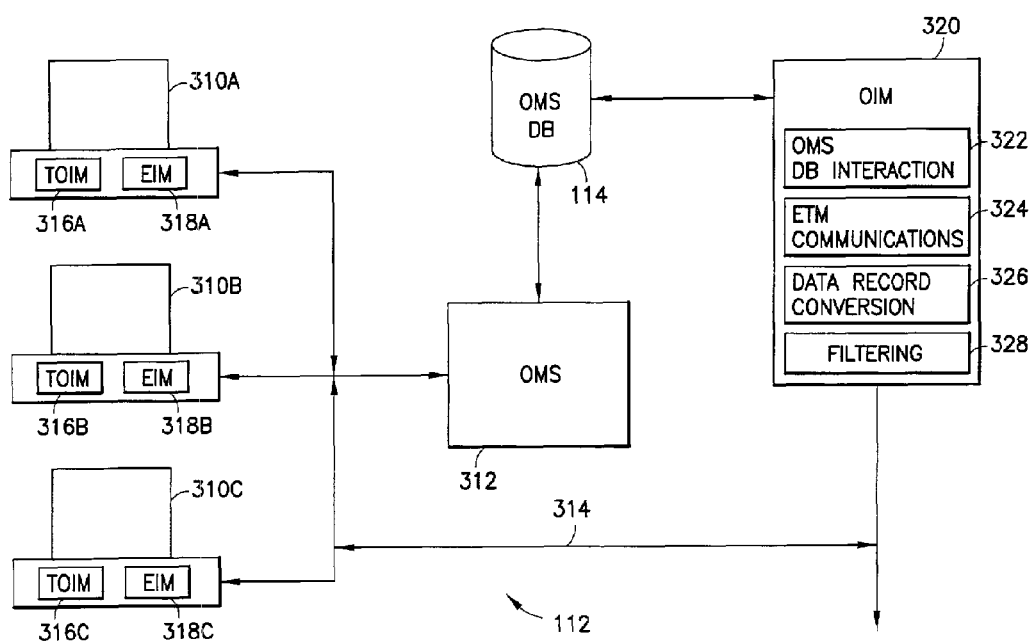
Figure 19:
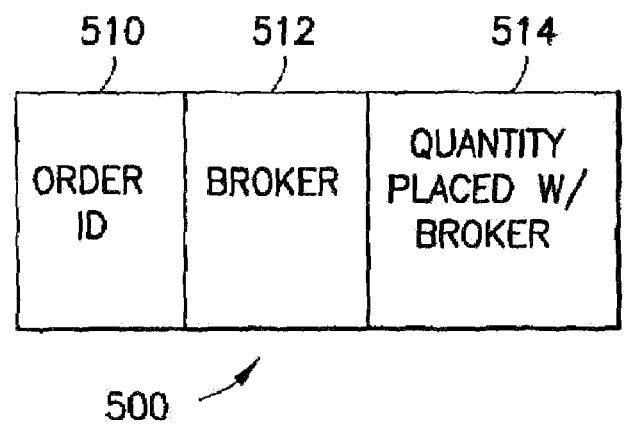
Figure 20:
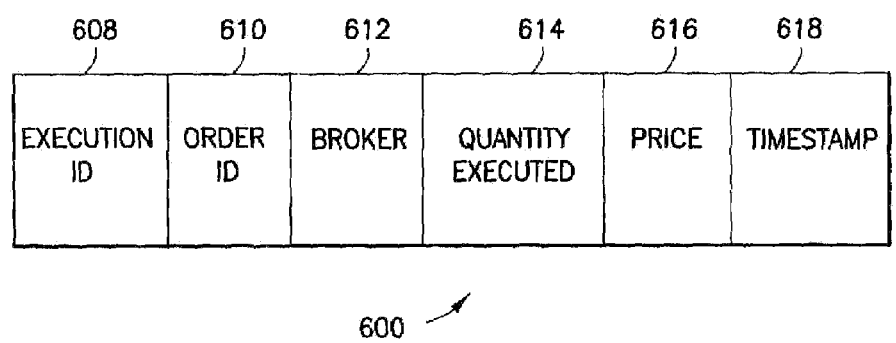
Figure 21:
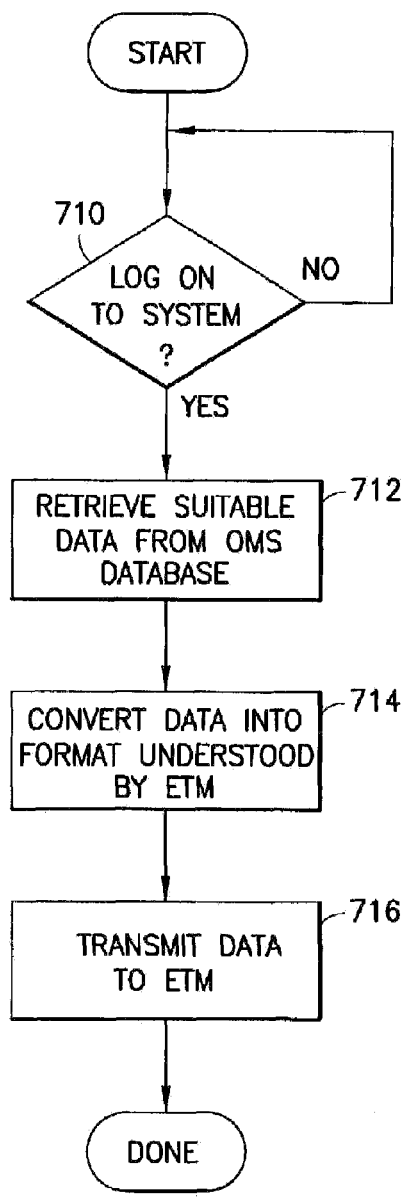
Figure 22:
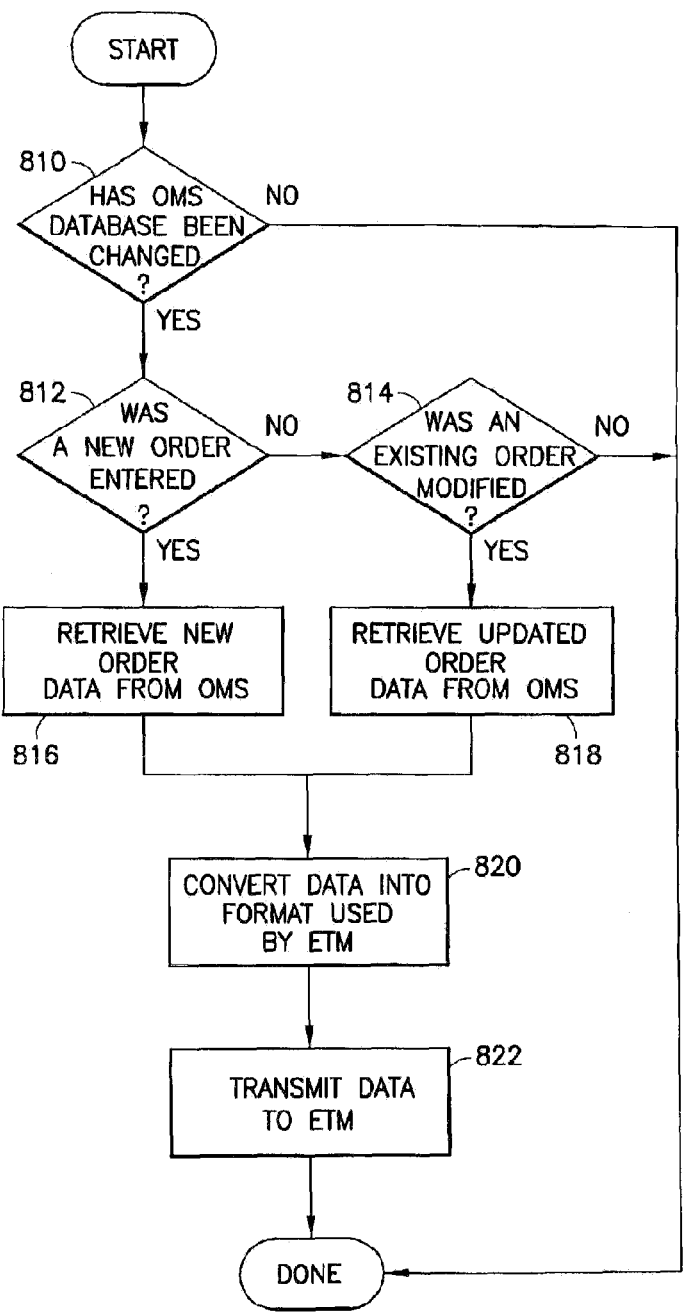
Figure 23:
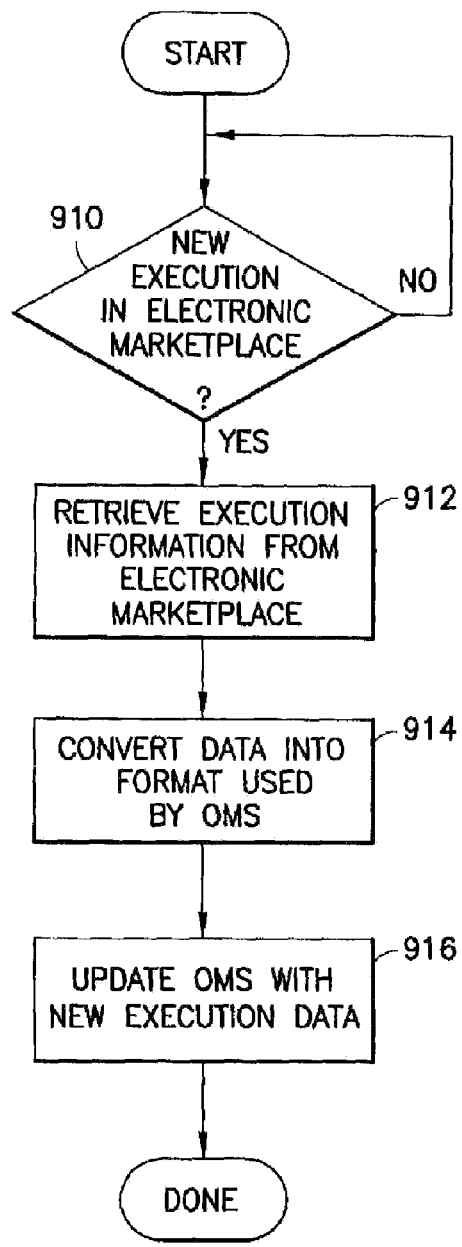

FIG. 15 is a high-level block diagram illustrating an electronic trading marketplace (ETM) environment according to an embodiment of the present invention;

FIG. 16 is a high-level block diagram illustrating more details of the ETM;

FIG. 17 is a lower-level block diagram illustrating a trading system like those illustrated in FIG. 15;

FIG. 18 is a diagram illustrating a data record stored in the order management system (OMS) database to identify an order according to one embodiment of the present invention;

FIG. 19 is a diagram illustrating a placement record preferably stored in the OMS database to indicate a placement of an order at a particular venue;

FIG. 20 is a diagram illustrating an execution record preferably stored in the OMS database to indicate the execution of an order;

FIG. 21 is a flow diagram illustrating actions performed by an embodiment of the present invention when a trader logs on to the ETM;

FIG. 22 is a flow diagram illustrating actions performed by an embodiment of the present invention after a trader has logged on to the ETM; and FIG. 23 is a flow diagram illustrating actions performed by a preferred embodiment of the present invention when the OMS database is updated in response to a trade executed by the ETM.

U.S. Pat. No. 7,136,834 to Merrin (hereinafter, "Merrin"), et al. is hereby incorporated herein by reference in its entirety, including, the specification of Merrin, the prosecution file history of Merrin, and any other material that provides meaning to any portion of the patent. Accordingly, terms that have a meaning in Merrin (e.g., based on the specification, based on the prosecution file history, based on other material that provides a meaning to the any portion of the patent, etc.) are intended to have the same meaning herein. Thus, the person of ordinary skill in the art would understand terms used in Merrin and used herein to have the same meaning.

FIG. 15 is a high-level block diagram illustrating an electronic trading marketplace (ETM) environment according to an embodiment of the present invention. An ETM 110 is in communication with three trading systems 112A, 112B, 112C. Although only three trading systems 112 are illustrated, embodiments of the present invention can have many more (or fewer) trading systems 112 in communication with the ETM 110. FIG. 15 illustrates only three trading systems 112 in order to enhance the clarity of this description.

In some embodiments, an ETM may be configured to couple to other ETMs and/or other marketplaces. For example, one particular ETM may be configured to facilitate trades between traders coupled to the particular ETM. That particular ETM may, in some circumstances (e.g., if no counter parties for a particular order is available at the particular ETM) may transmit information about orders to another ETM to try to find counter parties through that other ETM. Accordingly, one ETM may be able to avail itself of orders/traders associated with other ETMs. Transmitting order information to other ETMs may be performed after asking a trader associated with a particular order if such transmission is acceptable and/or according to a previously established trading preference of a particular trader. In some embodiments, different ETMs may be configured to trade different things. For example, one ETM may be configured to trade stocks, and another ETM may be configured to trade derivatives. The coupling of such ETMs configured to trade different things may be particularly useful in embodiments configured to offer additional products and/or services to traders based on knowledge regarding orders submitted by traders, as discussed in more detail below.

The trading systems 112A, 112B, 112C are used by investment management firms or other entities that have established a relationship with the ETM 110. The trading systems 112 communicate with the ETM 110 to facilitate the trading of securities. As used herein, a "security" is any ownership or creditorship interest, such as a stock certificate or bond, or any other financial instrument, contract, or transaction, such as a forward, futures, option, put, call, collar, swap, or currency contract. This definition includes, for example, any note, stock, bond, debenture, certificate of interest or participation in any profit-sharing agreement or in any oil, gas, or other mineral royalty or lease, any collateral trust certificate, investment contract, voting-trust certificate, certificate of deposit, any put, call, straddle, option, or privilege on any of the foregoing, or group or index of securities (including any interest therein or based on the value thereof). This list is not all-inclusive. For purposes of clarity, this description will describe the trading of stock.

Within each trading system 112 is a database 114A, 114B, 114C associated with an order management system (OMS). Each OMS database 114 holds data representative of open, contemplated, and/or completed orders to buy and/or sell securities (collectively referred to herein as "orders for securities") by traders using the trading system 112. For example, assume that the database 114A of trading system 112A contains orders to sell 50,000 shares of DELL and 75,000 shares of MSFT and orders to buy 25,000 shares of CPQ and 100,000 shares of IBM. Also assume that the database 114B of trading system 112B contains orders to sell 30,000 shares of CPQ and buy 62,000 shares of T.

The orders in the OMS databases 114 may be automatically transmitted to the ETM 110. Likewise, any changes in the orders, such as modifications and/or withdrawals, may be automatically transmitted to the ETM 110. As used herein, the term "automatically" means that the associated action is performed without any human or manual intervention. Thus, there is no need for traders to specifically request that individual orders in the OMS databases 114 are transmitted to the ETM 110; orders in the databases are sent to the ETM 110 without the traders' input (subject to filtering criteria).

In some embodiments, orders in OMS databases may not be automatically transmitted to the ETM 110. Rather, traders may individually select orders from an OMS database to be transmitted to the ETM 110. Because some trading firms may fear that information about some of the orders stored within their OMS databases may be used maliciously if that information is revealed, using such selective transmission rather than automatic transmission may enable trading firms to keep particularly sensitive order information from being transmitted while allowing less sensitive order information to be transmitted.

Preferably, the ETM 110 anonymously transmits information about a trader's orders to other traders using the ETM, subject to filtering in accordance with filtering criteria established by the traders and/or the ETM. Moreover, the ETM 110 preferably manages anonymous negotiations between traders using the trading systems 112 for the purpose of executing the orders and sends data about the completed trades to the OMS's of the traders involved in the transaction.

Thus, one embodiment of the present invention selectively broadcasts information about the orders received by the ETM 110 from the database 114A of trading system 112A to the other trading systems 112B, 112C. Likewise, the ETM 110 selectively broadcasts information about the orders received from the database 114B of trading system 112B to the other trading systems 112A, 112C. If the traders desire such a trade, the ETM 110 will facilitate the anonymous negotiation and sale of 25,000 shares of CPQ from a trader using trading system 112B to a trader using trading system 112A.

In some embodiments, an order from a first trader may be narrowcast to potential counter parties. To determine which other traders are potential counter parties, the ETM may match the order from the first trader with orders received from other traders (e.g., by security name, type, order size, price, etc.). If matching orders are available from other traders, those traders may be identified as potential counter parties and information about the order from the first trader may be transmitted to those traders.

Data may be communicated between the trading systems 112 and the ETM 110 using interfacing links 116A, 116B, 116C. Any known interfacing technologies can be used to effectuate these links, including, but not limited to, transmission control protocol/Internet protocol (TCP/IP), satellite, cellular, and/or radio frequency (RF) links, or some combination thereof. The links may pass through one or more intermediate data processing systems, such as telephone switches or Internet servers, before reaching the ETM 110 or a trading system 112. In embodiments where data travels over shared links, such as embodiments where data travels over the public Internet, the data is preferably encrypted using a secure protocol, such as the secure sockets layer (SSL).

FIG. 16 is a high-level block diagram illustrating more details of the ETM 110. Those of skill in the art will recognize that FIG. 16 illustrates only one possible embodiment of the ETM 110. Obviously, different combinations of hardware and software can be used to provide the functionality of the ETM 110 described herein.

Data received by the ETM 110 from the trading systems 112 over the interfacing links 116 may be received by a firewall 210. As is known in the art, the firewall 210 preferably prevents unauthorized users from gaining access to the rest of the ETM 110 and monitors transfers of data to and from the network.

Data that pass through the firewall 210 may be received by one or more modules that perform the functionality of the ETM 110. As used herein, the term "module" refers to machine-executable code and/or data, but may also include associated circuitry, such as processing circuitry, as well as data storage areas, and/or any other software or hardware. Thus, it will be appreciated that one or a combination of hardware and software, such as a computer system executing software for performing the functionality of the modules, may implement each of the modules shown in FIG. 16. It will also be appreciated by those skilled in the art that the ETM 110 may comprise one or more other types of modules, circuitry, etc., not shown in FIG. 16 in order to avoid unnecessarily obscuring understanding of the invention. For instance, the ETM 110 may include one or more microprocessors, network connection circuitry, and/or data storage areas, such as read-only memory (ROM), random-access memory (RAM), CDROM, DVD, tape drive, hard disk (HD), and/or other types of storage areas. It will also be appreciated that the functionality of multiple modules described herein can be combined into a single module and the functionality of a single module can be split or shared among multiple modules. Moreover, alternative embodiments of the present invention can lack one or more of the modules described herein and/or have modules not described herein.

The ETM 110 preferably includes an OMS data integration module (ODIM) 212. The ODIM 212 receives and processes data representative of orders received from the OMS databases 114 in the trading systems 112. In a preferred embodiment, the data from the OMS databases 114 are provided to the ETM 110 in a standardized format that requires little processing by the ODIM 212. In an alternative embodiment, the data from the OMS databases 114 are provided to the ETM 110 in one or more different formats depending upon factors such as the type of OMS used by the trading systems 112, the types of interfacing links supplying the data to the ETM, the type of security or orders to which the data pertains, and the like. In this latter embodiment, the ODIM 212 preferably converts the data into a standardized format for use by other modules in the ETM 110.

The orders processed by the ODIM 212 may be stored in an ETM database 214. Data in the database 214 are preferably accessible to the other modules in the ETM 110. In addition, the other modules in the ETM 110 can store other data in the illustrated database 214 or other databases as may be required during normal operation.

In a preferred embodiment, an indications module 216 transmits information about orders received by the ETM 110 among the various traders based upon filtering criteria established by the traders and/or the ETM. This information is transmitted among the traders in the form of non-binding indications.

Based upon these indications, traders may be able to enter into negotiations with other traders through a negotiation module 218. The negotiation module 218 may facilitate negotiations between traders using trading systems and having contra interests. In one embodiment, at least parts of the negotiations are conducted anonymously, in order to limit the spread of information about the traders' activities.

A market data module 220 may receive real-time and/or other market data from an input 222. The market data module 220 may provide the market data to the negotiation module 218 and/or to the traders. The traders preferably use the market data during the negotiations to determining market prices for the securities.

A transaction history module 224 may record transactions performed by the ETM 110 in the database 214. The transaction history module 224 also preferably records other data processed by the ETM 110 including, for example, information about orders received from and sent to the trading systems 112 and the negotiations conducted (successful or not). This module 224 is preferably used to audit the transactions conducted on the ETM 110.

In some embodiments, the transaction history module may record transaction information as well as information about orders that were placed but unfulfilled. Such information may be used to provide products, and/or services to traders. For example, information about a frequency of orders placed for a particular security may be recorded and used to inform traders about how liquid a market for the security has been historically and/or how long an order may take to be fulfilled based on historic trades. As another example, information about fulfilled transactions for a particular trader may be used to provide information about other goods or services that the trader may desire, such as hedging opportunities related to the trades (e.g., available futures trades on a same or different ETM that may be used to hedge an equity purchase, etc.). As yet another example, some embodiments may use recorded information to determine that major changes in a trading pattern of a security (e.g., a major price drop, a major change in liquidity, etc.) has occurred, and use such information to adjust performance (e.g., prepare for a major increase in trading activity, offload orders to a different market, pause acceptance of orders temporarily until trading has stabilized, etc.) trade on a security (e.g., for an account/fund associated with an ETM operator) and/or provide such information to traders.

A trader authentication module 226 may authorize and/or authenticate traders who log into the ETM 110 in order to perform trading negotiations and/or other functions. In one embodiment, the trader authentication module 226 stores authentication information, such as a login ID/password pair in the database 214. The trader authentication module 226 also preferably stores profiles for the registered traders.

Other modules that may be present in the ETM 110 include load monitoring modules for monitoring the load on various servers comprising the ETM, fault tolerance modules for providing fault tolerance to the ETM, security modules for preventing and detecting security violations on the ETM, and back office modules for providing back office functionality. These modules are not shown in FIG. 16 in order to avoid unnecessarily complicating the figure.

FIG. 17 is a lower-level block diagram illustrating a trading system 112 like those illustrated in FIG. 15. Those of ordinary skill in the art will recognize that FIG. 17 illustrates only one possible embodiment of a trading system 112 and alternative embodiments of the trading system exist. FIG. 17 illustrates three workstations 310A, 310B, 310C coupled to an OMS server 312 via a network 314. The workstations 310 are preferably general- or specific-purpose computer systems executing specialized software for facilitating trading of securities. Although only three workstations 310 are illustrated, a trading system 112 can have any practical number of workstations.

In a typical trading system that interacts with the ETM 110, each workstation 310 executes a trader OMS interaction module 316 (TOIM) for facilitating interactions with the OMS server 312. In this typical trading system, the TOIM 316 allows a trader to add, delete, or modify open or contemplated orders stored in the OMS database 114. Contemplated orders may be stored in the OMS database 114, for example, because the trader intends to execute certain transactions in stages, or because the contemplated transactions are desirable only if the market prices of the securities to be traded are within a certain range (e.g., limit orders). Therefore, such orders serve as placeholders indicating the total quantity of a security that a trader wishes to transact and conditions for transacting other orders; other data in the database 114 indicate the quantity of the security that has been transacted to date.

Each workstation 310 may execute an ETM interaction module 318 (EIM) for facilitating interactions with the ETM 110. In alternative embodiments of the present invention, the EIM 318 is incorporated into the TOIM 316 or other modules on the workstation 310. The EIM 318 allows a trader to send information to the ETM 110 and view and respond to information received from the ETM 110. Typically, the received information includes information about orders (through the indications module 216) and orders (through the negotiation module 218) that the ETM 110 receives from other traders or trading institutions. The trader uses the EIM 318 to enter into and transact negotiations to buy and/or sell securities through the ETM 110.

The network 314 connects the workstations 310 to the OMS 312 and to external networks such as the network in communication with the ETM 110. The network 314 can utilize any networking technology that supports bi-directional transfer of data among the OMS 312, workstations 310, and external networks. In a typical embodiment, the network 314 is a private local area network (LAN) installed at a financial institution and interfacing with one or more external gateways. In alternate embodiments, the network may be wireless, connect devices over a wide area, and/or at least partially carry data over a public network (such as the Internet). Other network components, such as a firewall, may also be present. Those of ordinary skill in the art will recognize that many different types of networks can perform the functionality described herein.

The OMS 312 is preferably comprised of one or more computer systems for executing and maintaining an order management system. The OMS 312 receives instructions from the workstations to create, modify, and/or delete orders and updates the database 114 accordingly. Software providing the functionality of the OMS 312 is well known in the art. Commercial OMS software packages are available from The MacGregor Group, Eze Castle Software, Advent Software, and Decalog, to name but a few. In addition, some trading institutions utilize custom OMS software.

As described above, the database 114 may hold data representative of open, contemplated, and/or completed orders to buy and/or sell securities. FIG. 18 is a diagram illustrating a data record 400 stored in the database 114 to identify an order according to one embodiment of the present invention. Different OMS systems utilize different order data records and, therefore, it should be understood that FIG. 18 illustrates only one possible data record. However, many OMS systems store the same general information and the illustrated order data record 400 is intended to represent a typical order data record for an OMS system.

The order data record 400 has multiple fields, each field holding different information about an order. The Order ID field 410 preferably holds a value uniquely identifying the order associated with the data record 400. Similarly, the Trader ID field 412 preferably holds a value uniquely identifying the trader or other person who placed the order. The Order Status field 414 identifies whether the order is open, contemplated, completed, canceled, or any other possible status. The next field, Order Last Update Time 416, preferably holds a timestamp that identifies the last time that the data record 400 was modified in any way. This field 416 is useful for determining whether the most recent version of the data record 400 has been considered.

The Transaction Type field 418 preferably indicates whether the data record 400 corresponds to an order to buy or sell a security. The Security Symbol field 420 preferably uniquely identifies the security to be transacted. The Security Symbol field 420 can hold, for example, a Committee on Uniform Securities Identification Procedures (CUSIP) number, a ticker symbol, or any other identifier of the security. The Security Type field 422 is preferably used to interpret the other data in the data record 400 according to the given security type. For example, treasury bills are priced in terms of a discount to face value; inherent in the pricing formula is the yield that would be obtained if the bill were held to maturity. In contrast, equity securities are priced in actual per-share values. The information in the Security Type field 422 can also be used to filter out certain types of securities.

The Order Type field 424 preferably indicates whether the order is a market or a limit order, although the field can also indicate other order types. If the order is a limit order, the Limit Price Field 426 preferably identifies the price set by the trader.

The Total Order Size field 428 preferably identifies the actual number of shares that the trader desires to transact. The Quantity Placed Elsewhere field 430 is a value either equal to or less than the value in the Total Order Size field 428. In an embodiment of the present invention, the ETM 110 uses the values of these two fields 428, 430 to determine a quantity of a security, if any, that are available to be transacted by the ETM.

Preferably, the OMS 312 allows for the possibility that trading a large quantity of a given security may occur over several days at several different venues. For example, to fill an order to buy 1,000,000 shares of IBM, a trader may need to place an order for 300,000 shares with one broker, and record numerous executions of portions thereof until the full 300,000 shares placed with that broker are purchased. If the broker cannot provide additional shares at a suitable price, the trader may then place an additional quantity, up to the 700,000 shares remaining to be purchased, via another broker, electronic marketplace, or other venue. Preferably, the broker enters a placement record into the OMS database 114 to indicate that the trader anticipates executing a portion of the order through the second venue. This second venue may also fill the quantity it was asked to provide in several executions. Thus, an order can have one or more placements and each placement can have one or more executions associated with it.

FIG. 19 is a diagram illustrating a placement record 500 preferably stored in the OMS database 114 to indicate a placement of an order at a particular venue. The Order ID field 510 preferably holds a value that uniquely identifies the order associated with the placement. The Order ID field 510 ties the placement information to the overall order. Thus, all placements for the same order preferably have the same value in this field 510. The Broker field 512 preferably contains an alphanumeric value identifying the venue associated with the placement record. Lastly, the Quantity Placed with Broker field 514 preferably lists the portion of the total order size that is placed for fulfillment through the venue.

When a transaction is executed in a specified venue, such as the ETM 110, a corresponding execution record is preferably stored in the OMS database 114. FIG. 20 is a diagram illustrating an execution record 600 according to an embodiment of the present invention. An execution ID field 608 preferably holds a value identifying the particular execution. As before, the Order ID field 610 preferably holds a value that uniquely identifies the order associated with the execution and all executions for the same order preferably have the same value in this field 610. The Broker field 612 preferably contains an alphanumeric value identifying the venue that performed the execution. The Quantity Executed field 614 preferably specifies the number of securities transacted in this execution while the Price field 616 specifies the price at which the securities were executed. The Timestamp field 618 preferably records the time at which the execution took place.

The OMS interfacing module (OIM) 320 may be in communication with the OMS database 114 via the network 314 or a direct connection. In alternative embodiments, the OIM 320 is in communication with the OMS 312 and/or the workstations 310. The OIM 320 may also be in communication with the ETM 110 via an external gateway or some other form of network connection. In another alternative embodiment, the OIM 320 is integrated into the ETM 110 and is remote from the OMS 312, although some functionality is present at the OMS in order to provide OMS data to the OIM.

In a preferred embodiment, the OIM 320 includes a computer system storing and executing software for performing the functionality described herein. In an alternative embodiment, the OIM 320 executes on the same computer system as the OMS 312. In one embodiment, the OIM 320 includes an OMS database interaction module 322 for interacting with the OMS database 114. The OMS database interaction module 322 reads records stored in the OMS database 114 and, in a preferred embodiment, creates and modifies data records stored in the OMS database 114. In one embodiment, the OMS database interaction module 322 directly accesses the OMS database 114 and in another embodiment it sends commands to an applications programming interface (API) in the OMS 312 for accessing the database.

The OIM 320 also preferably includes an ETM communication module 324 for communicating with the ETM 110. In one embodiment, the ETM communication module 324 automatically provides selected data records in the OMS database 114 to the ETM 110 and, in a preferred embodiment, receives data and/or instructions from the ETM. In addition, the OIM 320 also preferably includes a data record conversion module 326 for modifying the format of the data records sent to and/or received from the ETM 110 and a filtering module 238 for filtering out specified orders by security type, security name, order type, order quantity, order price, or some other factor or category, so that filtered orders are not transmitted to the ETM.

FIG. 21 is a flow diagram illustrating actions performed by an embodiment of the present invention when a trader logs on to the ETM 110. Although the actions of FIG. 21 and subsequent figures are attributed herein to the OIM 320, one of ordinary skill in the art will recognize that all or some of the actions can be carried out by other entities.

Preferably, the OIM 320 waits 710 until a trader logs on to the OMS 312 before transmitting data records for that trader to the ETM 110. In one embodiment, the ETM 110 sends a message to the OIM 320 when a trader at the institution in which the OIM 320 resides logs into the ETM. The OIM 320 interprets this message as a sign to commence receiving orders. In other embodiments of the present invention, the OIM 320 uses other techniques, such as querying the OMS database 114 for specific entries, listening for an inter-process message sent by the OMS 312, polling individual trader workstations 310, or implementing a timer-based algorithm, to determine that a trader has logged on to the OMS 312.

Once a determination 710 is made that a trader has logged on to the OMS 312 the OIM 320 may retrieve 712 data records about orders suitable for transmission to the ETM from the OMS database 114. In one embodiment of the present invention, all open orders are suitable for transmission to the ETM 110. In other embodiments of the present invention, the OIM 320, through the filtering module 328, makes the determination of suitable orders based on other criteria, such as the security type (e.g., stock or bond), security name (e.g., IBM or T), order type (e.g., market or limit order), order quantity, and/or order price. In still other embodiments, only orders selected by a trading firm (e.g., by the trader) associated with the OMS may be suitable for transmission.

If necessary, the data record conversion module 326 within the OIM 320 preferably converts 714 the data records retrieved from the OMS database 114 into a standardized format understood by the ETM 110. As described above, the functionality of the data record conversion module 326 can also be performed by the ODIM 212 in the ETM 110. Alternative embodiments of the present invention may send the data records individually or in multiple batches. The data transmitted to the ETM 110 depend on factors such as the types of securities being traded, and/or the fields required in order to accurately trade such securities.

FIG. 22 is a flow diagram illustrating the actions performed by an embodiment of the present invention after a trader has logged on to the OMS during the trading day. The actions of FIG. 22 are preferably automatically performed multiple times during the trading day. Initially, the OIM 320 may determine 810 whether the contents of the OMS database 114 have changed. The OIM 320 can perform this step by, for example, polling the database 114 at regular, near-real-time intervals, querying the database for contents of specified fields such as timestamps, and/or listening for network or specific interprocess communication message traffic.

If the database has changed, the OIM 320 preferably determines whether the change should be transmitted to the ETM 110. Because typical OMS's are complex and multi-featured, and because securities of types not handled by the ETM 110 may be traded using the OMS 312, some changes to the OMS database 114 may not necessitate a transmission of updated data to the ETM 110. Thus, the OIM 320 may determine 812 whether the change to the database 114 reflects a new order of a type that is traded in the ETM 110 (and in some embodiments, other ETMs and/or marketplaces coupled to the ETM 110). If so, then the OIM 320 may retrieve 816 the pertinent data for the order from the database 114. If the change does not reflect a new order, then the OIM 320 preferably determines 814 whether the database change pertains to a modification of an existing order that has already been sent to the ETM 110. If so, the OIM 320 may retrieve 818 the data records corresponding to the modified order from the database 114. Once the appropriate data records, if any, are retrieved from the database, the OIM 320 preferably converts 820 the data records into the appropriate format and transmits the records to the ETM 110 as described above with respect to FIG. 21.

FIG. 23 is a flow diagram illustrating the actions performed by an embodiment of the present invention when the OMS database 114 is updated in response to a trade executed by the ETM 110. The illustrated steps can be performed each time a trade is executed, or in batch. However, the steps are preferably performed frequently enough so that the OMS database 114 is updated in substantially real-time.

The OIM 320 initially may determine 910 whether an execution occurred in the ETM 110 involving an order in the OMS 312 associated with the OIM. The step may be performed, for example, by receiving a message from the ETM 110 identifying a particular execution that occurred at the ETM, by filtering a list of all executions or other data from the ETM for executions listed in the OMS 312, or by periodically polling the ETM for performed executions.

If an execution occurred in the ETM 110 involving an order in the OMS 312 associated with the OIM 320, the OIM receives 912 information from the ETM describing the execution. This information includes, for example, the type, amount, and price of securities traded, the time of execution, and/or information identifying the original order in the OMS database 114 on which the execution was based. The OIM 320 may convert 914 the received information about the execution into the format used by the OMS 312. Then, the OIM 320 may update 916 the OMS database 114 with the converted execution data. As a result of these steps, the OMS 312 may be updated automatically and transparently to reflect executions performed at the ETM 110. The executions appear to the OMS 312 as typical trades conducted at another broker.

In some embodiments information about orders in an OMS database and/or any other information about a trading institution may be used to provide additional (e.g., complimentary, alternative) products and/or services to traders. The information about the orders may include the existence of the orders, the existence of counter orders, the lack of counter orders, historical data about similar orders, historical data about counter orders, knowledge that an order was unfulfilled (e.g., for some time period, was removed from the system in an unfulfilled state, etc.), knowledge about a broader trading plan that may be embodied by specific orders (e.g., knowledge that a particular order is present because of a desire to trade in a particular industry, market capitalization, etc.), knowledge that an order was fulfilled, knowledge that an order is now inactive (e.g., was fulfilled, expired, was unfulfilled, etc.) information about a risk model, and/or any other information. In some embodiments, such features may be available to premium users of an ETM (e.g., users willing to pay a fee). The additional products and/or service may be available through a single ETM and/or additional ETMs.

In some embodiments, an ETM, OIM, OMS, and/or other component may track (e.g., determine when an order becomes inactive and store information about it) unfulfilled orders (e.g., expired orders and/or orders that were removed (e.g., removed from an OMS, removed from consideration by the ETM, etc.)). The knowledge that an order was once placed and was not fulfilled may reveal that a trader associated with the order may desire a trade in a security associated with the order in the future. When new orders are received, there may be no available counter parties currently trading in a security identified by the order. The existence of counter parties may be determined by searching (e.g., through a listing maintained in a database of the ETM) for matching offers received from a plurality of other traders using an ETM. In some implementations, if no such parties are available, unfulfilled orders may be used to find such parties. Such use of unfulfilled orders may occur after a new order has been active (e.g., near an expiration time of the order, after an indication that the order is being otherwise removed from the system is received, etc.).

The use of such unfulfilled orders may include querying a party associated with the unfilled order (or any other inactive order). Such query may ask if the party is still interested in a trade related to the security and/or identify that a matching counter order is now available. The party may then reenter an order, enter into negotiations with the party associated with the new order, ignore the request, and/or take any other desired actions.

In some embodiments, before such unfulfilled orders are used, a party associated with the new order may be asked if such use is desired. To encourage the use of such orders for matching, the party associated with the new order may be provided with statistics related to the usefulness of such orders. The statistics may be gathered by a transactional history module of an ETM and may include, for example, a percentage of times when such orders have successfully fulfilled an order, and/or any other desired information. The information may be selected at a degree of abstraction that is most convincing (e.g., overall securities, securities in a related industry, a specific security, a specific counter party, etc.).

In some embodiments in which multiple unfulfilled orders exist, priority may be given according to any desired priority mechanism. For example, possible counter parties associated with larger orders may be queried first, possible counter parties associated with most recently expired orders may be queried first, etc.

In some embodiments, counter party identities may be kept anonymous during part or all of a querying process associated with the use of unfulfilled orders. Also, size of orders, and/or any other information related to new and/or inactive unfulfilled orders may be kept confidential during the process until the counterparties choose to reveal such information.

Any number of unfulfilled orders may be tracked for any desired time period. For example, in some embodiments some number of the most recently expired orders may be tracked. In some embodiments, all unfulfilled orders may be tracked for some desired period. In some embodiments, the tracking may relate to characteristics of the security. For example, orders associated with a less liquid security may be tracked for a longer time than orders associated with a more liquid security.

Fulfilled orders, may be tracked for use in fulfilling future orders, in a substantially similar method to tracking unfulfilled orders described above. This may be useful because a trader that has previously traded in a security may be more likely to trade in that security again. The fulfilled orders may be fulfilled through the ETM and/or through some other method (e.g., a different marketplace).

In some embodiments, if it is determined that no matching counter parties (e.g., counter parties with orders matching the order in their OMS's) are available (e.g., a counter party is not found for an order (e.g., after some time period, near an expiration time for an order, etc.)) alternative products and/or services may be offered to a trader. The alternative products and/or services may be based, at least in part, on a characteristic of an order entered by the trader. The desired characteristics may include, for example, market capitalization, geographic area, industry, risk level, profit to loss ratio, volume of trades, profit level, sales level, cash on hand amount, analyst recommendation, and/or any other information. For example, derivatives based on the security may be offered (e.g., from other orders available to the ETM, from another market, etc.), other securities may be offered (e.g., securities with similar profiles such as capitalization, industry, etc., securities that were purchased by other traders who also placed similar orders (e.g., after a similar order went unfulfilled), securities that fulfill a desire associated with the order (e.g., a desire to adjust a portfolio to include a particular industry, etc.)). In some embodiments, information about how long an order may take to be fulfilled based on historical trading trends may be provided. Such information may encourage a trader to take an alternative to the order if the time is too long or wait for order fulfillment if the time is short.

In some embodiments, an alternative product and/or service may include a trade that is based on a reason for the order in the trader's OMS database. For example, an ETM may receive information about the reason that the order is present in the OMS (e.g., a desire to own a security in a particular industry), and based on that reason may determine that an alternative available order may fulfill the same reason and offer that order as an alternative. In some embodiments a reason may be part of a broader trading strategy and/or risk model that may be shared with the ETM, so that the ETM may offer alternatives that more closely fulfill reasons embodied by the order and that fits into the broader trading strategy and/or risk model.

In some embodiments, if a matching order is found for an order, additional (e.g., complementary) products and/or services may be offered. For example, the fact that an order has been, at least partly, fulfilled may be determined, and in response, an additional product and/or service may be offered. The order may be fulfilled through the ETM and/or through some other method and identified as fulfilled to the ETM (e.g., through a status change in an OMS). The product and/or service may be offered from a marketplace operator, a participant of a marketplace, and/or any other source. For example, a trader may be offered a hedging opportunity after an order for a security is fulfilled. Such a hedging opportunity may include a future related to the security. The hedging opportunity may be available through a different counter party on the same ETM (e.g., may be found in similar fashion to finding an original counter party) and/or through another marketplace.

In some embodiments, historical data about previous orders may be used to recommend additional products and/or services. For example, if a trader has a trade go unfulfilled, the trader may be presented with an available order that was often entered by traders that also had similar orders go unfulfilled.

In some embodiments, historical information may be used to adjust treatment of new orders. For example, if an order is entered for a historically illiquid security, additional avenues may be used to find a matching order, such as prior traders who had entered orders for the security, other marketplaces, etc. In some embodiments, other traders may be information of the existence of an order for an illiquid security. Traders may be encouraged to enter counter orders for illiquid securities through any desired incentivizing method. For example, traders may be offered priority in liquid orders if they enter an order for an illiquid security, traders may be offered rebates for entering such orders, and/or traders may be offered any desired incentive for entering such orders.

In various embodiments, trades may be related to any desired currency or country (e.g., stocks of U.S. companies, stocks of Chinese companies, British savings bonds, etc.). In some embodiments, a trader in one country may enter into a trade involving another country and/or the currency of another country (e.g., a U.S. trader may purchase debt of a Japanese company).

In some such embodiments, additional products or services may be offered based on the knowledge of a currency associated with a trade. For example, one or more currency trade contracts may be offered to a trader involved in such trading. A currency trade contract may act as a hedging instrument against volatility in currency markets. Such a contract may allow a trader to exchange the contract for some cash value if the currency associated with the trade changes in value compared to the trader's native currency. In some embodiments, the availability of such contracts may be included as a negotiation option between traders when negotiating a trade. In some embodiments, traders may trade in such contracts among each other independently of any other trade (e.g., through the ETM and/or some other marketplace). In some embodiments, a trader may be offered such a contract as a service from a marketplace (e.g., the operator of the ETM may offer such contracts for a fee as a service to users of the ETM).

Some embodiments may include participants from different time zones. Such participants may not always be active at the same time due, in part, to the differences in the time zones. Accordingly, one or more mechanisms may be used to address these time zone differences.

For example, in some embodiments, participants may be able to establish automatic trading profiles that can be used to automatically negotiate, accept, and/or reject trades during times when the participants are not active (e.g., at night, on holidays, etc.). Such profiles, for example may indicate that orders for securities in a certain price range should always be accepted, and/or any other desired actions should be taken.

In some embodiments, active trading times may be tied to a particular market (e.g., the New York Stock Exchange). By limiting trading to hours similar to a particular market, participants may be sure that they can participate in trades by being present during that period of time.

In some embodiments, a marketplace (e.g., the ETM) may determine if a participant is active and involve active participants in potential trades with some level of preference. Such determining may include monitoring a level of activity at a computer terminal, presenting a query through a computer interface, and/or any other desired action. In some embodiments, if a participant is not active (e.g., has gone home for the day), the participant may not be eligible to be part of a trade until the participant becomes active again. In other embodiments, active participants may be given preference over inactive participants, but inactive participants may still be offered an opportunity to be involved in trades.

In some embodiments, if a matching order involves an active trader and an inactive trader, a negotiation may be started between the two traders. The active trader may be informed that the inactive trader is inactive. The active trader may be given an estimate of when the inactive trader may be active (e.g., an indication of a time zone difference, historic data, etc.). While waiting for the inactive trader to become active to enter into a negotiation, the order associated with the active trader may still be used to search for other matches (e.g., with other active traders). When the inactive trader returns to active status, the previously inactive trader may enter into a negotiation about the trade with the previously active trader. The previously active trader may have gone inactive by the time the previously inactive trader becomes active. Because such a problems may occur due to time difference, a negotiation may take a long time to complete. In some embodiments, one or more sides of the negotiation may enter information to automate the negotiation (e.g., preferences, limit prices, etc.), so that the negotiation may complete in a shorter time.

Some embodiments may be limited to buy side trading participants (i.e., investing institutions that tend to buy large portions of securities for money-management purposes). Other embodiments may include buy side participants and sell side participants (e.g., brokers, retail analysts, etc.). Buy side participants are typically protective of revealing trading intentions because of a fear of malicious market manipulation and a fear of revealing proprietary trading strategies. Some embodiments which allow sell side participation may include mechanisms to address such fears of buy side participants.

For example, in some embodiments, buy side participants may be able to opt out of trading with sell side participants. In some embodiments, buy side participants may be able to establish filters that allow only some sell side participant orders to be traded with the buy side participants. For example, filters may allow sell side participant orders for a sufficient amount of a security, if the sell side agrees to a non-negotiated fulfillment of the order (e.g., according to a standard price such as the most recent traded price, etc.) and/or if the sell side and/or the sell side participant's order meets any other desired criteria of the buy side participant.

In some embodiments, indications of one or more criteria for use in filtering orders may be received. The criteria may be used to establish appropriate filters so that orders not meeting the criteria are filtered. If orders do meet the criteria, the orders may be presented to the market participant that established the criteria. In some embodiments, the criteria may include a time related criteria (e.g., when the order is received, when the order may be presented to the market participant (e.g., orders for XXX security may only be presented between noon and 2 pm, etc.), etc.). In some embodiments, the criteria may include quantity-related criteria, an identification criteria, a price-related criteria, a type-related criteria, an industry-related criteria, and/or any other criteria.

Some embodiments may limit options available to sell side participants. For example, sell side participants may only be able to enter binding orders. If a sell side participant's order finds a counter party in a buy side participant, the sell side participant may be bound to fulfill the order. In some embodiments, even though a sell side participant is bound to fulfill an order, a negotiation for price and/or quantity may still occur between a buy side participant and a sell side participant. In other embodiments, no negotiation may be started, but, rather, a trade may be facilitated without a negotiation (e.g., if the buy side accepts the offer, the trade may occur automatically, according to a standard pricing mechanism, for a quantity of securities identified in the sell side order, etc.).

In some embodiments, a request for acceptance of an order may be transmitted to one or more market participants (e.g., buy side participants). In some embodiments, such participants may receive the requests for acceptance of an order. In some embodiments, the market participants may be allowed to respond to the request for acceptance within a limited amount of time. If the participant responds affirmatively to the request for acceptance within the limited time, then an indication of acceptance may be transmitted and/or an execution of a trade fulfilling at least a portion of an order may be facilitated.

In some embodiments, a sell side participant may be required to enter a quantity of a security to be traded when entering an order. A sell side participant may be bound to that quantity if an order from a buy side participant matches the sell side order. In some embodiments, the sell side participant may negotiate to increase the quantity, but may be limited to the quantity as a minimum. In some embodiments, a sell side participant may only enter orders above a threshold minimum quantity.

In some embodiments, to avoid negotiations between sell side and buy side participants, sell side participants may be bound to have their orders fulfilled according to a standard pricing mechanism. Such a pricing mechanism may include fulfilling the order based on a well-known midpoint pricing policy and/or any other desired mechanism.

In some embodiments, when two sell side participants become counter parties to a trade, they may not be restricted in the same manner as when a sell side participant is a counter party to a buy side participant. For example, if two sell side participants enter a negotiation, both may enter negotiations for price and/or quantity even if such negotiations are limited or not allowed at all when a sell side participant and a buy side participant are counter parties.

In some embodiments, parties with matching orders may enter into a limited negotiation. For example, execution of a trade fulfilling matching orders may include a negotiation that does not include a negotiation about price and/or a negotiation about quantity. A price, for example, may be determined using a VWAP, midpoint, and/or any other desired pricing policy. A quantity may be determined based on quantities defined by the matching orders. If there are any other issues to be negotiated, some embodiments may allow a negotiation for those issues (e.g., time of execution, platform to use for execution, etc.).

In some embodiments, evidence of actions/things may be suppressed from one or more parties. For example, in some embodiments, when a determination is made that one order matches another order, any evidence of that determination may be suppressed from one or more parties associated with the orders and/or any other parties; when a criteria for a filter is established, any evidence of the criteria and/or the establishment of the filter may be suppressed; when a determination about whether an order meets criteria of a filter is made, evidence of that determination may be suppressed. Such suppression of evidence may occur until some action occurs and/or for some amount of time. For example, in one implementation, evidence that a first party's order matches a second party's order may be suppressed from the first party until and unless the second party decides to proceed with the order and/or until the execution of the order is facilitated.

In some embodiments, suppressing evidence of an event may include performing any action or not performing any action so that an observer is led to believe that the event did not occur. For example, suppressing evidence may include performing one or more actions that would occur if the event did not occur (e.g., transmitting requests, transmitting indications that the event did not occur, etc.), transmitting misleading information regarding the event (e.g., transmitting indications that the event did not occur, transmitting indications that another event occurred, transmitting information before the event and/or after the event that obscure the occurrence of the event (e.g., indications that the event happened earlier and/or later so that the actually occurrence of the vent is obscured)), not transmitting information that the event occurred, transmitting imitations information to mislead observers, encrypting information transmissions, using onion routing techniques, obscuring a source of transmissions, obscuring a destination of transmissions, obscuring the timing of events, and/or any other actions.

In some embodiments, an order may include an order to purchase or sell a quantity of a financial instrument. The side of the order may refer to whether the order is for a purchase or a sale of a financial instrument. Two orders may match if the orders are for the same financial instrument and are for opposite side of a trade for that financial instrument. Other criteria, such as quantity, price, etc., may also be sued to determine if orders match each other.

In some implementations, an order may indicate a price range in which a execution of a trade fulfilling at least part of the order is agreed. In such implementations, a first order may match a second order if the two orders are for opposite sides of a trade for a single financial instrument and the two orders have at least partially overlapping price ranges. In some implementations, an actual price of a trade may be determined according to a VWAP and/or midpoint pricing model.

In some embodiments, facilitating execution of a trade may include taking any actions which help to bring about the execution of a trade. In some implementations, facilitating execution may include, for example, executing the trade, beginning a negotiation between the first market participant and the second market participant that does not involve the price of the trade and does not involve the quantity of financial instruments in the trade, transmitting information about the trade to a third party to execute the trade, and/or any other actions. Such actions may include centralized actions and/or distributed actions.

In some embodiments, one or more market participants may be charged a fee for use of a trading system. For example, if matching orders are found and/or facilitation of order execution is performed, a fee may be charged to the parties related to the matching orders. In some embodiments, some parties may be incentivized to use a trading system by providing a financial incentive regarding such fees. For example, in some embodiments, some participants may not be charged a fee, orders meeting certain criteria may not be charged a fee, some participants may be given a payment to submit orders, and so on. Such incentivizing may help to increase liquidity in a market where certain participants may be otherwise unwilling to provide such liquidity.

In some implementations, for example, a portion of a fee charged to a first participant may be provided to a second participant. In some implementations, providing the portion of the fee to the second participant may include paying at least part of a second fee for the second participant (e.g., discounting the fee of the second participant by the portion). In some implementations, providing the portion may include crediting an account of the second participant (e.g., providing a payment to a financial account). In some implementations, buy side participants may be given a discount and/or a payment for use and sell side participants may be charged a fee. The fee charged to sell side participants may be sued to pay the discount or payment given to buy side participants. In some implementations when two buy side participants interact, no discount, no fee, and/or no payment may be made to either party. In some implementations, the first party to submit an order may be given a discount and/or payment.

In some embodiments, various actions taken by traders and/or information presented to traders may be taken/presented through one or more user interfaces of computing devices. For example, indications of orders, negotiations, etc. may be facilitated by user interfaces through which traders may interact. Traders may enter order information, accept order requests, establish criteria for filters, etc. through suitable user interfaces of computing devices. In other embodiments, such user interfaces may not be used and/or needed to perform all of some of such actions (e.g., computers may perform such actions without user interfaces, etc.).

In summary, the present invention includes an electronic trading marketplace that generates liquidity, at least in part, by receiving order information directly from the databases of OMS systems at trading institutions. Since orders are extracted from the OMS databases automatically, and information about executed orders is inserted into the databases automatically, the OMS databases "see" the marketplace as "just another market intermediary." Moreover, traders are able to conduct trades in the electronic marketplace without any duplicative manual efforts.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The following should be interpreted as embodiments, and not as claims:

A. A computer-implemented method comprising:
receiving a non-binding indication of an order in a database of an order management system;
determining if a currently matching counter party for the order exists by searching a listing of active orders of an electronic marketplace; and
if no currently matching counter party is determined to exist, determining if an previously matching counter party exists by querying at least one potential counter party who is associated with a matching inactive order.
A.1. The method of claim A, in which the matching inactive order includes an order that was previously fulfilled.
A.2. The method of claim A, in which the matching inactive order includes an order that was previously unfulfilled.
A.2.1. The method of claim A, in which the matching inactive order includes an expired order.
A.3. The method of claim A, in which the listing of active orders includes a plurality of orders received from a plurality of potential counter parties.
A.3.1. The method of claim A.3, in which the plurality of active orders includes active orders in respective databases of respective order management systems of the plurality of potential counter parties.
A.4. The method of claim A, further comprising: determining that an active order has become inactive; and storing information about the now inactive order that may be used to identify the at least one potential counter party.
B. A computer-implemented method comprising:
accessing, by an electronic marketplace, records of open orders in a database of an order management system;
determining that at least one of the open orders from the database of the order management system has been, at least partly, fulfilled;
in response to determining that the at least one of the open order has been, at least partly, fulfilled, providing an indication of at least one of a complementary service and a complementary product available through the marketplace.
B.1. The method of claim B, in which the at least one of the complementary service and the complementary product includes a hedging opportunity.
B.2. The method of claim B, in which the at least one of the complementary service and the complementary product includes a money contract.
B.2.1. the method of claim B.2, in which the money contract involves a first currency native to a trading institution associated with the at least one of the open orders and a second currency with which the at least one of the open orders is associated.
B.2.2. The method of claim B.2, in which the money contract is offered by an operator of the marketplace.
B.2.3. The method of claim B.2, in which the money contract is available from a participant of the marketplace.
B.3. The method of claim B, in which the at least one of the complementary service and the complementary product includes a futures contract related to the at least one of the open orders.
B.3.1. The method of claim B.3, in which the futures contract is offered by at least one of operator of the marketplace and a participant of the marketplace.
B.4. The method of claim B, in which the at least one of the complementary service and the complementary product is available through a second electronic marketplace.
B.5. The method of claim B, further comprising determining the at least one of the complementary service and the complementary product based on a history of previous orders.
C. A computer-implemented method comprising:
receiving by an electronic marketplace, an indication of a record of an order in a database of an order management system;
determining that the electronic marketplace includes no matching counter parties for the order; and
providing an indication of an alternative trade based, at least in part, on a characteristic of the order.
C.1. The method of claim C.1, in which the alternative trade involves an order with a desired characteristic in common with the order.
C.1.1. The method of claim C.1, in which the desired characteristic includes at least one of an industry, a market capitalization, a geographic region, a risk level, a profit to loss ratio, a volume of trades, a profit level, a sales level, a cash on hand amount, and an analyst recommendation.

C.2. The method of claim C, in which the alternative trade includes a trade of a derivative based at least in part on a security underlying the order.

C.3. The method of claim C, further comprising: receiving an indication of a trading strategy, and in which the alternative trade fulfills a part of the trading strategy embodied by the order in the trading strategy.

C.4. The method of claim C, further comprising: receiving an indication of a reason for the order being placed, and in which the alternative trade fulfills at least part of the reason.

C.5. The method of claim C, in which the alternative trade is available through a second electronic marketplace.

C.6. The method of claim C, further comprising determining the alternative trade based on a history of previous orders.

D. A computer system comprising:
a microprocessor operable to:
  receive a first order from a first market participant,
  receive a second order from a second market participant, in which the second order is received from an OMS module of the second market participant,
  determine that the first order matches the second order,
  transmit a request for acceptance of the first order to the second market participant, and
  only if the second market participant accepts the request, facilitate an execution of a trade fulfilling at least part of the first order and at least part of the second order, in which facilitating the execution includes facilitating the execution without a negotiation between the first market participant and the second market participant about a price of the trade and without a negotiation between the first market participant and the second market participant about a quantity of financial instruments in the trade.

D.1. The system of claim D, in which the OMS module includes at least one of an order management system, and a system configured to interface an order management system with a marketplace D.2. The system of claim D, in which the microprocessor is further operable to suppress, from the first market participant, evidence of the determination that the first order matches the second order, at least until the facilitation of the execution of the trade.

D.2.1. The system of claim D.2, in which suppressing evidence includes at least one of: performing at least some actions as if the determination were not made, transmitting misleading information regarding the determination, transmitting no information regarding the determination, and transmitting an imitation request for acceptance if the determination were not made.

D.3. The system of claim D, in which the first order includes an indication of a price range in which the first market participant agrees to execution of the trade.

D.4. The system of claim D, in which the execution of the trade includes an execution at a price determined by at least one of a midpoint pricing model and a volume weighted average pricing model.

D.5. The system of claim D, in which the request includes a request that is available for a limited amount of time, in which the second market participant may only accept the request during the limited amount of time.

D.6. The system of claim D, in which receiving the first order from the first market participant includes receiving the first order from an electronic device operated by the first market participant.

D.6.1. The system of claim D.6, in which the electronic device is configured to allow the first market participant to enter information defining the first order through a user interface.

D.7. The system of claim D, in which receiving the second order from the OMS module includes receiving the second order from the OMS module through a communication network.

D.8. The system of claim D, in which receiving the first order from the first market participant includes receiving the first order from an OMS module of the first market participant.

D.9. The system of claim D, in which the first order matches the second order if the first order and the second order are for opposite sides of a trade for the same financial instrument.

D.9.1. The system of claim D.9, in which the first order includes an order for at least one of a purchase and a sale of a first quantity of the financial instrument, and the second order includes an order for a respective at least one of a sale and a purchase of a second quantity of the financial instrument.

D.10. The system of claim D, in which the microprocessor is part of a marketplace.

D.11. The system of claim D, in which the first order identifies a financial instrument to be traded, a first quantity of the financial instrument to be traded, and a side of a trade of the financial instrument, and in which the second order identifies the financial instrument to be traded, a second quantity of the financial instrument to be traded, and an opposite side of the trade of the financial instrument.

D.12. The system of claim D, in which facilitating execution includes at least one of: executing the trade, beginning a negotiation between the first market participant and the second market participant that does not involve the price of the trade and does not involve the quantity of financial instruments in the trade, and transmitting information about the trade to a third party to execute the trade.

E. A computer system comprising:
a microprocessor operable to:
  accept an indication of one or more criteria to use for filtering orders directed to a first market participant, in which the first market participant is associated with a plurality of first orders in an OMS,
  accept a second order from a second market participant, in which the second order matches at least one first order of the plurality of first orders,
  determine if the second order meets the one or more criteria,
  only if the second order meets the one or more criteria, direct a request for acceptance of the second order to the first market participant, and
  only if the first market participant accepts the request, facilitate an execution of a trade fulfilling at least part of the at least one first order and at least part of the second order, in which facilitating the execution includes facilitating the execution without a negotiation between the first market participant and the second market participant about a price of the trade and without a negotiation between the first market participant and the second market participant about a quantity of financial instruments in the trade.

E.1. The system of claim E, in which the microprocessor is further operable to suppress, from the second market participant, evidence of the one or more criteria.

E.1.1. The system of claim E.1, in which suppressing evidence includes at least one of: performing at least some actions as if the indication of the one or more criteria were not received, transmitting misleading information regarding the one or more criteria, transmitting no information regarding the receipt of the indication of the one or more criteria, and transmitting an imitation request for acceptance if the second order does not match the criteria.

E.2. The system of claim E, in which the microprocessor is further operable to suppress, from the second market participant, evidence of the determination of whether the second order meets the one or more criteria.

E.2.1. The system of claim E.2, in which suppressing evidence includes at least one of: performing at least one action as if the determination was not made, transmitting misleading information regarding the determination, transmitting no information regarding the determination, and transmitting an imitation request if a third order does not match the criteria.

E.3. The system of claim E, in which the second order includes an indication of a price range in which the second market participant agrees to execution of the trade.

E.4. The system of claim E, in which the execution of the trade includes an execution at a price determined by at least one of a midpoint pricing model and a volume weighted average pricing model.

E.5. The system of claim E, in which the request includes a request that is available for a limited amount of time, in which the first market participant may only accept the request during the limited amount of time.

E.6. The system of claim E, in which the first order matches the second order if the at least one first order and the second order are for opposite sides of a trade for the same financial instrument.

E.6.1. The system of claim E.6, in which the first order includes an order for at least one of a purchase and a sale of a first quantity of the financial instrument, and the second order includes an order for a respective at least one of a sale and a purchase of a second quantity of the financial instrument.

E.7. The system of claim E, in which the one or more criteria includes a time-related criteria.

E.8. The system of claim E, in which the one or more criteria includes at least one of a quantity-related criteria, an identification criteria, a price-related criteria, a type-related criteria, and an industry-related criteria.

E.9. The system of claim E, in which the microprocessor is part of a marketplace.

E.10. The system of claim E, in which second order is submitted through a user interface of an electronic device.

E.11. The system of claim E, in which the first order identifies a financial instrument to be traded, a first quantity of the financial instrument to be traded, and a side of a trade of the financial instrument, and in which the second order identifies the financial instrument to be traded, a second quantity of the financial instrument to be traded, and an opposite side of the trade of the financial instrument.

E.12. The system of claim E, in which facilitating execution includes at least one of: executing the trade, beginning a negotiation between the first market participant and the second market participant that does not involve the price of the trade and does not involve the quantity of financial instruments in the trade, and transmitting information about the trade to a third party to execute the trade.

F. A computer system comprising:
a microprocessor operable to:
receive a first order from a first market participant,
receive a second order from a second market participant, in which the second order is received from an OMS module of the second market participant, and in which the second order matches the first order,
only if the second market participant accepts a request for acceptance of the first order, facilitate an execution of a trade fulfilling at least part of the first order and at least part of the second order, in which facilitating the execution includes facilitating the execution without a negotiation between the first market participant and the second market participant about a price of the trade and without a negotiation between the first market participant and the second market participant about a quantity of financial instruments in the trade,
charge a first fee to the first market participant, and
provide at least a portion of the first fee to the second market participant.

F.1. The system of claim F, in which the first market participant is a sell-side participant and the second market participant is a buy-side participant.

F.2. The system of claim F, in which the microprocessor is further operable to charge a second fee to the second market participant, and in which providing the at least the portion of the first fee to the second participant includes paying at least a portion of the second fee.

F.3. The system of claim F, in which providing the at least the portion of the first fee to the second market participant includes crediting an account of the second market participant.

F.4. The system of claim F, in which the first order matches the second order if the first order and the second order are for opposite sides of a trade for the same financial instrument.

F.4.1. The system of claim F.4, in which the first order includes an order for at least one of a purchase and a sale of a first quantity of the financial instrument, and the second order includes an order for a respective at least one of a sale and a purchase of a second quantity of the financial instrument.

F.5. The system of claim F, in which the first order includes an indication of a price range in which the first market participant agrees to execution of the trade.

F.6. The system of claim F, in which the execution of the trade includes an execution at a price determined by at least one of a midpoint pricing model and a volume weighted average pricing model.

F.7. The system of claim F, in which the request includes a request that is available for a limited amount of time, in which the second market participant may only accept the request during the limited amount of time.

F.8. The system of claim F, in which receiving the first order from the first market participant includes receiving the first order from an electronic device operated by the first market participant.

F.8.1. The system of claim F.8, in which the electronic device is configured to allow the first market participant to enter information defining the first order through a user interface.

F.9. The system of claim F, in which receiving the second order from the OMS module includes receiving the second order from the OMS module through a communication network.

F.10. The system of claim F, in which receiving the first order from the first market participant includes receiving the first order from an OMS module of the first market participant.

F.11. The system of claim F, in which the microprocessor is part of a marketplace.

F.12. The system of claim F, in which the first order identifies a financial instrument to be traded, a first quantity of the financial instrument to be traded, and a side of a trade of the financial instrument, and in which the second order identifies the financial instrument to be traded, a second quantity of the financial instrument to be traded, and an opposite side of the trade of the financial instrument.

F.13. The system of claim F, in which facilitating execution includes at least one of: executing the trade, beginning a negotiation between the first market participant and the second market participant that does not involve the price of the trade and does not involve the quantity of financial instruments in the trade, and transmitting information about the trade to a third party to execute the trade.

XXIII. MISCELLANEOUS INFORMATION 1

Numbering of elements in the below section may not match to numbering of elements in the previous sections. This section provides additional disclosure of relevant material, and should not be interpreted to limit any prior disclosures. For example, no definitions below should be applied to disclosure above unless explicitly stated otherwise and descriptions of preference do not apply to above disclosed embodiments.

Figure 24:
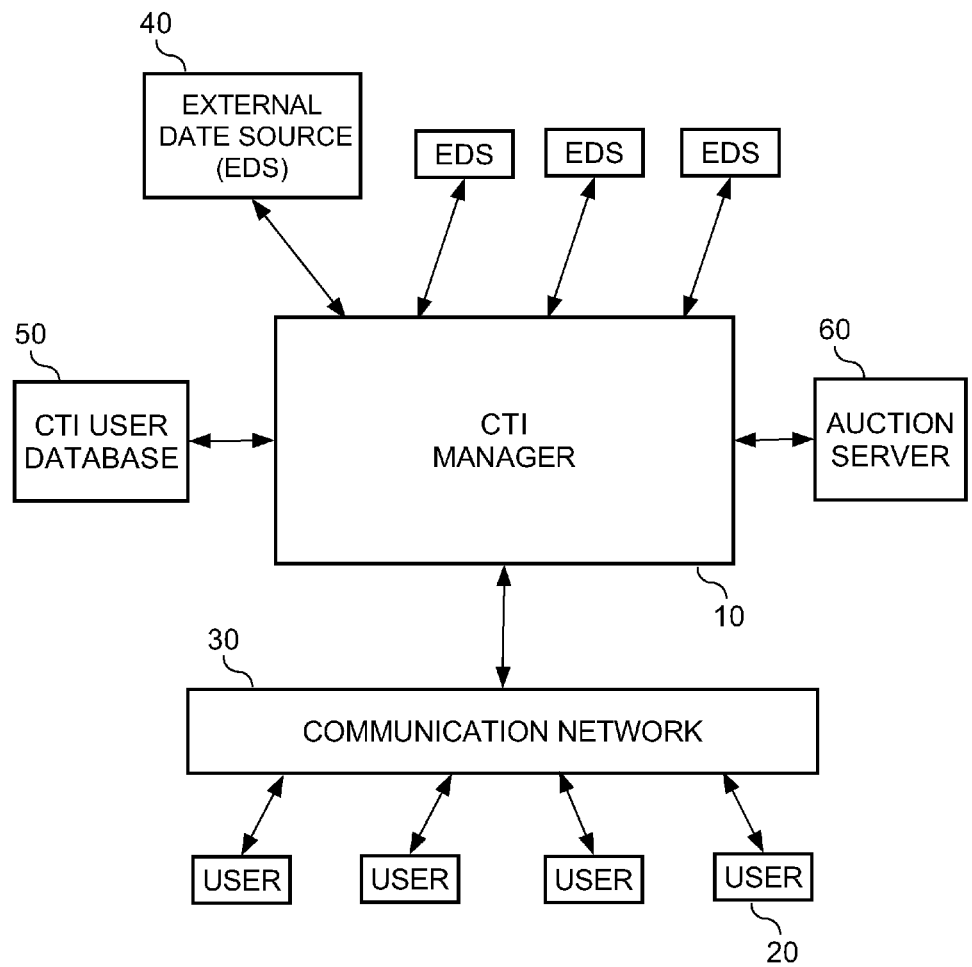

FIG. 24 is a schematic diagram depicting a preferred embodiment of the subject invention.

Figure 25:
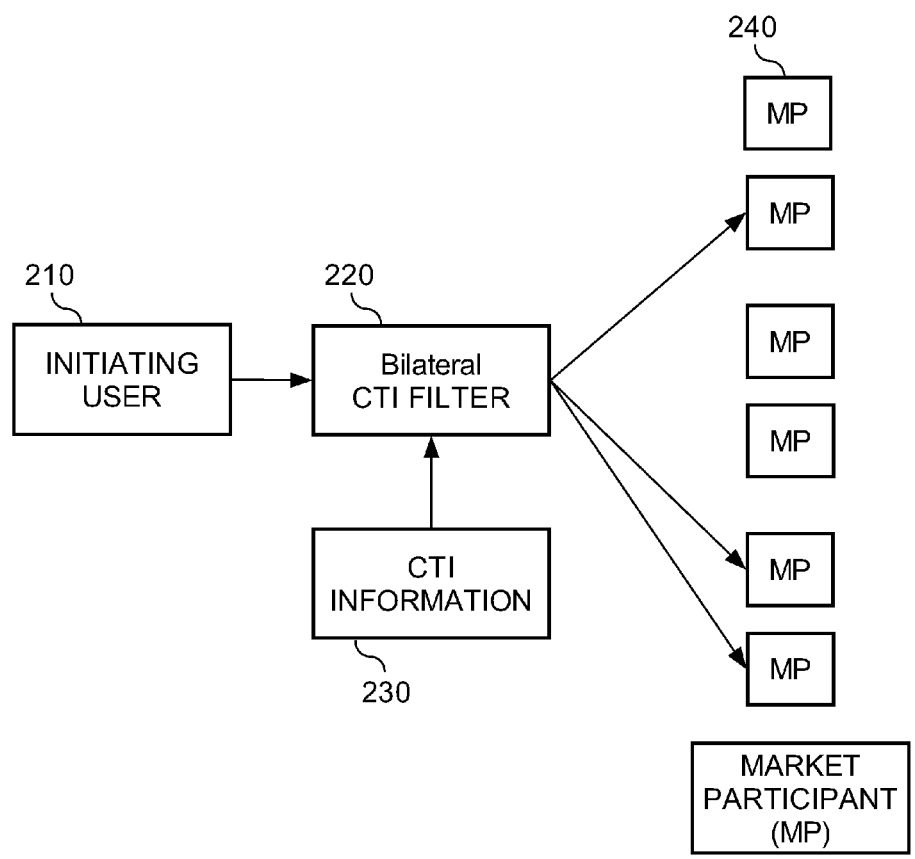

FIG. 25 is a schematic diagram depicting a preferred system for targeted dissemination of confidential information regarding trading interests.

Figure 26:
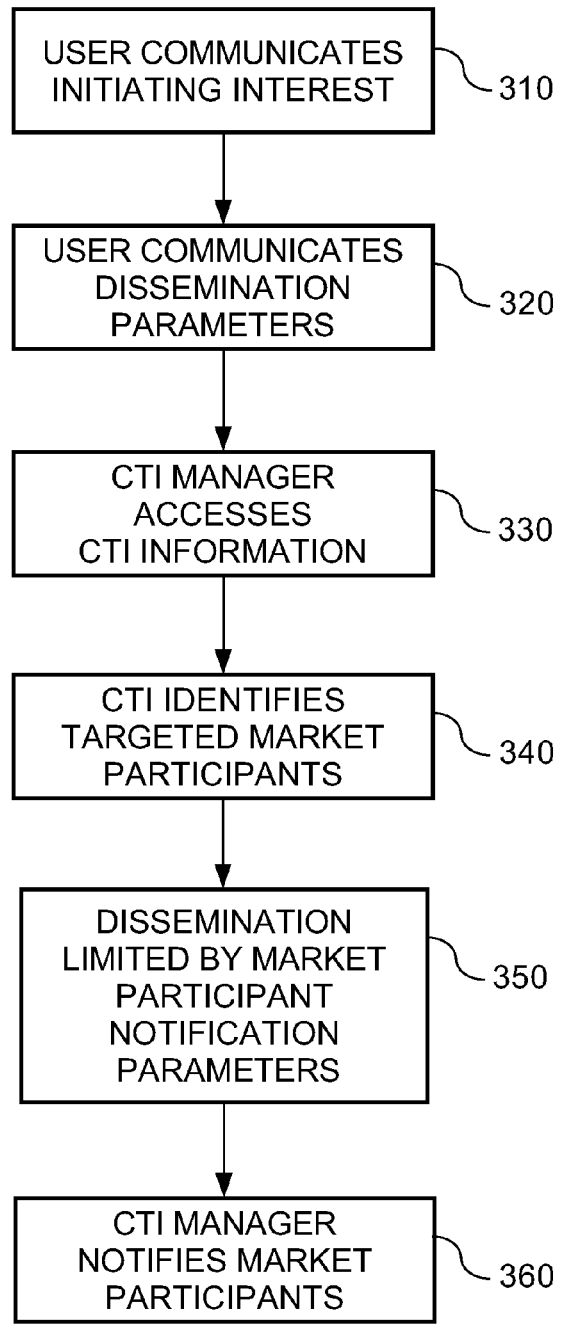

FIG. 26 is a flowchart illustrating steps of a preferred method of targeted dissemination of confidential information regarding trading interests.

Figure 27:
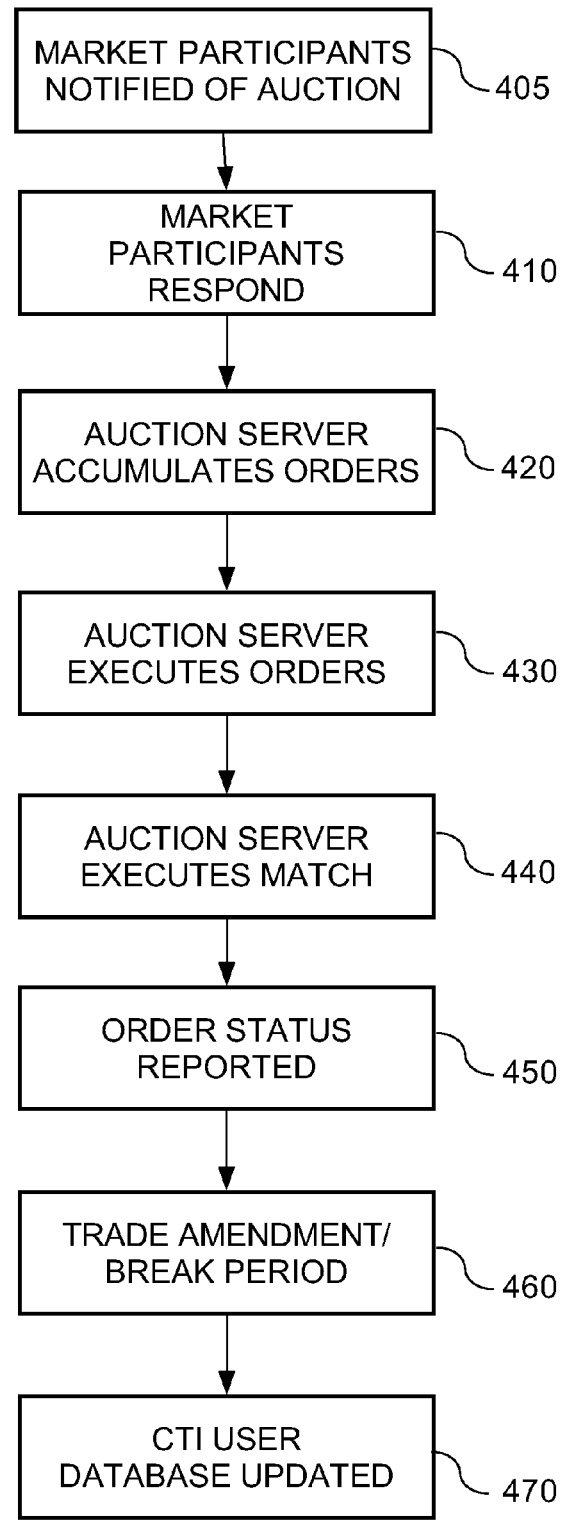

FIG. 27 is a flowchart showing steps of a preferred method of matching interests identified by targeted dissemination in an auction execution.

The subject invention relates to a method for managing certified trading information to direct and execute confidential trading interests over a computer network such as the Internet.

The term "trading interest" is used herein to describe any expressed interest in trading a given security or securities, and the term "certified trading interest" is used herein to describe a trading interest that has been verified as genuine and certified as such by some trusted third party. One example of a genuine trading interest is an order that has been placed on a securities market automatic matching system. A second example of a genuine trading interest is a trading interest expressed by a party with a documented history of aggressive trading. An example of a trading interest that would not be certified is an undocumented indication of interest (known in the art as an IOI).

In public securities markets, market mechanics and trading psychology create barriers to efficient information dissemination and price discovery. A market participant's decision to reveal information regarding a large trading interest typically represents a tradeoff between confidentiality and liquidity. By publicly revealing the details of a significant active buying interest, for example, a market participant assumes the risk of adverse price action. Other market participants with legitimate selling interests and market makers can "fade" their offers (become much less aggressive sellers). There is also an empirically demonstrable risk of adverse price action due to "front running" (buying activity by market participants in anticipation of price movement resulting from the large revealed order). Confidentiality can be maintained by splitting the large order up into many small orders to avoid arousing interest, but this is inefficient and will fail to attract substantial natural contra-interests. An economically efficient transaction is therefore avoided because the trading costs associated with disseminating information are too high. Also, the common practice of splitting large interests into smaller orders affects all price discovery. When confronting each order, a market participant must incorporate the possibility that the order is only a small part of a much larger interest, because it is often impossible for the market participant to verify that many such orders are not being sent simultaneously.

Another serious obstacle to efficient dissemination of trading interests and price discovery is the lack of validated information about trading interests. The validated trading interest information which does exist (e.g., displayed executable orders) is often of little assistance. Displayed orders are miniscule compared to undisclosed interest, and typically equate to no more than one or two minutes of trading in a liquid stock in the U.S. market. Displayed orders can therefore be easily manipulated, for example, to indicate excess buying interest when sellers are in fact abundant. In addition, non-validated misinformation is often created and disseminated by unscrupulous market participants to manipulate market prices. Voluntarily disseminated trading interests can be false or misleading if they are not verified either by proof of a current executable order, actual trades executed, or canceled orders which were at one point executable at risk in the market. Because there is often no way for a market participant to verify an expressed trading interest or to know which other market participants have a history of unscrupulous trading behavior, all prices must incorporate the possibility of such behavior.

One known approach to voluntary selective dissemination of non-validated trading interests and activity in public equity markets is used by the AutEx+® system. This is an electronic database and online network that provides users with the ability to voluntarily publicly indicate trading interests and executed trades. AutEx+® users can limit the recipients of a message regarding a trading interest by inclusion (a user-defined list) or exclusion (blocking specific named market participants). Users can also limit by name the securities on which they receive information and the other users from whom they receive information.

In the AutEx+® system the expressed trading interests and reported trades are not certified, however, and this creates the opportunity for deceptive dissemination. In addition, users of the system are not obligated to report all trades, which offers further opportunities to create false impressions of trading interests. Significantly, this approach does not enable the use of analysis of certified trading interests (CTI) to limit information dissemination to those market participants likely to have a contra-interest. It also does not enable using such CTI analysis to permit market participants to limit the trading interest indications received. It also does not provide the ability to initiate an auction based on disseminated CTI analysis information. It also does not enable the monitoring of user trading activity to generate a rating of the accuracy of disclosures or the correlation of trading activity to inappropriate trading practices.

One known approach to matching trading interests and executing trades while limiting information dissemination is employed by the POSIT® matching system. The POSIT® system allows trading interests to accumulate and initiates a matching sequence at set intervals. Market participants place confidential orders in the system and are unaware of the amount or aggressiveness of other orders on the same or contra side until the matching is released. This approach does not enable targeted communication of trading interests based on analysis of verified executable interests and trading activity, and does not provide the ability to initiate private auctions based on this analysis. It also does not enable granting the auction initiator any exclusivity over contra-orders entered in response to the targeted dissemination.

In this environment, there is an acute need for efficient dissemination of confidential information regarding trading interests. Market participants with large confidential trading interests wish to notify only those other market participants likely to have a significant contra-interest. Other market participants wish to be notified of confidential certified trading interests to which they are likely to have a contra-interest. Both groups wish to have a place to transact a trade once they have been connected through analysis of their certified trading interests. Market participants also desire certified information regarding the trading behavior of other market participants and a means of certifying expressed trading information.

Preferred embodiments of the subject invention overcome the limitations of known trading interest dissemination and execution systems by (1) enabling market participants to limit dissemination of trading interests to only those other market participants likely to have a significant contra-interest, (2) enabling market participants to ensure that other market participants' disseminated trading interests are legitimate, and (3) enabling auctions among trading interests targeted and validated in this manner. Software of a preferred embodiment identifies likely contra-interests by analyzing information from various sources regarding certified trading interests.

A preferred embodiment comprises a method of managing market information, comprising the steps of: electronically receiving data including confidential information regarding market participants; electronically storing said received data regarding market participants; electronically receiving information from a first market participant computer; electronically storing said information received from said first market participant computer; producing a targeted dissemination list of market participants based on said stored data regarding market participants and said information received from said first market participant computer; and electronically transmitting to the market participants on said targeted dissemination list data based on said information received from said first market participant computer.

Advantageously, this is done without revealing the confidential information of the market participants to the first market participant. In one embodiment, the identity of the first market participant is not revealed to the other participants.

Further embodiments are described below.

FIG. 24 illustrates a system configuration of a preferred embodiment of the subject invention that comprises a certified trading interest (CTI) manager 10 connected to various users 20 via a communication network 30. CTI manager 10 is a computer comprising a processor, a memory, and input/output including a communications interface. Computer programs stored in the memory operate the CTI manager in accordance with the invention. In the preferred embodiment, communication network 30 is the Internet, but alternate embodiments can employ dedicated communication networks, as is well known in the art. In the preferred embodiment, communication between users and the CTI manager is secured, because of the confidential nature of the information communicated. The CTI manager 10 is also connected to various external data sources 40, a CTI user database 50, and an auction server 60.

External data sources 40 provide information regarding positions held, trades executed, and active orders for the users 20. This enables the CTI manager to identify and verify users' historical and current trading interests. In an alternate embodiment, the CTI manager does not receive external data, but only uses data generated within the system. In a preferred embodiment applied to the U.S. equity market, the external data sources 40 include various electronic communication networks (ECNs) such as Instinet™, public markets such as NASDAQ™, stock exchanges, matching networks such as POSIT®, and publicly available data such as the published holdings of various institutional investors. In a preferred embodiment, the data regarding market participants used by the CTI manager comprises confidential information. For example, the identity of an executable order on an ECN is not typically available. Since the confidential information is not publicly available, the CTI system must obtain permission from the users 20 to utilize it. In the preferred embodiment users 20 agree to release this confidential information to the CTI system, with the understanding that the secure CTI system will use the information only for supplying the user with valuable confidential trading interests of others. In other words, the confidential information with which users 20 entrust the CTI manager 10 gives them access to more information (in particular, certified trading interests), but the confidential information provided by users 20 does not leak out to third parties.

In a preferred embodiment, the CTI manager 10 communicates in real time with external data sources 40 via the Internet. Alternate embodiments employ dedicated communication networks as is well known in the art. Also, alternate embodiments store information from external data sources 40 in a database and update the information periodically rather than in real time. For example, an alternate embodiment receives information regarding the published holdings of various institutional investors, stores the information in a database, and updates the information from the news service source only as frequently as new information is published. As will be apparent to those skilled in the art, the subject invention could also be used to direct confidential information in markets other than U.S. equities, since virtually all markets for fungible items of value pose the same informational inefficiencies.

In a preferred embodiment, the CTI user database 50 contains user data such as security and contact information, CTI notification parameters, and an activity history. The preferred embodiment maintains an activity history for each user that includes auctions initiated and their outcome (e.g., whether the auction was canceled, unsuccessful in locating a contra-interest, or resulted in a partial or full execution of the initiating interest). The activity history also includes the CTI notifications received, the orders placed in response, and their outcome (whether the responding order was canceled, unsuccessful, or resulted in a partial or full execution of the response order). In an alternate preferred embodiment, the CTI user database 50 simply maintains overall statistics regarding this activity history for each user.

The CTI notification parameters specify the circumstances in which CTI information is to be received and can be different for different securities and different users. For example, some users may limit CTI notifications to initiating interests over 100,000 shares for certain securities and 500,000 shares for others. In a preferred embodiment the notification parameters can be modified by the user at any time, and can be on the basis of order size, security, identity of initiating user, or statistics regarding the initiating user's activity history.

In an alternate preferred embodiment, the CTI user database 50 also contains information regarding inappropriate trading behavior such as peg gaming and front running. Peg gaming is possible when an auction sets the execution price to be the market midpoint at a specific time. An auction participant with a large buy order might sell actively in the market to pull the midpoint price down. Front running is possible in this context if, for example, a recipient of a notification of a large buy order starts buying CTI trades actively before the auction in anticipation of price action caused by the large CTI. The CTI manager of this embodiment will monitor the trading activity of all auction participants and note any suspected peg gaming or front running in the CTI user database, either as raw data or as a rating of trading behavior. An alternate embodiment maintains similar data and/or ratings in the CTI user database 50 regarding the accuracy of the market participants' non-certified disclosures on external systems such as AutEx+®. A further embodiment maintains similar data and/or ratings in the CTI user database 50 regarding the market participants' adherence to self-imposed trading limits set during negotiations. This list is not intended to be exhaustive; other embodiments will be apparent to those skilled in the art.

The auction server 60 manages the process of accumulating market participant (MP) contra-orders in response to a CTI notification and executing a matching auction. In an alternate embodiment, there is no auction server and the CTI system functions as a targeted information dissemination mechanism. FIG. 25 depicts the information management function of a preferred embodiment of the subject invention. An initiating user 210 communicates to the CTI manager a trading interest and parameters that limit the dissemination of the information. The CTI manager uses these parameters and CTI information 230 to determine which market participants 240 should receive the information. Also, each MP communicates his own parameters to the CTI manager delineating the trading interest information that the MP desires to receive. The CTI manager therefore acts as a bilateral CTI information filter 220. It limits dissemination of the initiating user's confidential information to those MPs 240 for which (1) the MP fits the initiating user's dissemination parameters, and (2) the initiating interest fits the MP's notification parameters. In an alternate embodiment, the CTI manager is only a unilateral information filter in which the system targets MPs to notify but does not allow the MP to similarly filter notifications. Comparing FIG. 24 and FIG. 25, in a preferred embodiment both the initiating user 210 and the market participants 240 are users 20 of the system, the bilateral CTI information filter 220 is the CTI manager 10, and the CTI information 230 is supplied by the external data sources 40 and the CTI user database.

FIG. 26 is a flow diagram of the operation of an information management function of a preferred embodiment. In step 310, a user communicates an initiating interest to the CTI manager. In the preferred embodiment, the initiating interest is a live executable order submitted to the CTI system to initiate an auction, but in alternate embodiments the initiating interest can be other information that the CTI system must then certify. For example, the user may wish to selectively disseminate the existence of a large executable order that a user has placed in another market or auction system such as an ECN or POSIT®. The user would submit information regarding the order, and the CTI system would then verify the existence of the claimed order, so that all market participants subsequently notified of the order can rely on the truthfulness of the dissemination. Similarly, the user can submit an indication of interest, which the system then certifies from verified information regarding current executable orders, recent trading history, and/or canceled orders which were once executable but were not filled. Once again, all market participants subsequently notified of the interest can rely on the truthfulness of the dissemination. In an alternate embodiment, the user can submit a non-certified trading interest, but this lack of certification is indicated to all market participants subsequently notified.

In a preferred embodiment, the initiating interest includes a price limit, which can be a nominal value (e.g., $11 21/2) or pegged to a market price when the price is set (e.g., market midpoint set at the termination of the auction). Alternate embodiments enable the initiating user to peg the price limit to a yet-to-be-determined market value or index. For example, in an alternate embodiment the user can peg the price limit to the daily volume weighted average price (VWAP) as will be calculated at the end of the trading session. In the preferred embodiment, the initiating interest includes auction parameters such as the length of the accumulation period.

In step 320, the user communicates the desired dissemination parameters. In the preferred embodiment, there are many dissemination parameters available to the user, the most important being various measures of certified contra-interest. In the preferred embodiment, the user can specify certified contra-interest from (1) live executable orders; (2) past executed trades; or (3) canceled orders that were once executable but were not filled. Examples of CTI-based filtering of dissemination of an interest to buy 500,000 shares of a certain stock include limiting dissemination to (1) MPs or other system users presently offering 10,000 or more shares of that stock in the marketplace; (2) MPs or other system users who have sold over 25,000 shares of that stock in the current trading session; (3) MPs or other system users who have offered blocks of over 10,000 shares of that stock in the current trading session; or (4) MPs or other system users who have bought at or above the National market Best Offer in the current trading session. The quantities and time horizons in these parameters are all selectable by the user.

In a preferred embodiment, there are many other parameters available to the user that employ market information from the external data sources 40 and the CTI user database 50 to more accurately target dissemination to desired market participants. For example, the user can choose to notify only those market participants with certain response or initiation statistics (e.g., directing the CTI manager to notify only market participants who have responded to 10% of CTI notifications received in a certain time frame or to a certain total number of CTI notifications). In addition, the preferred embodiment enables the user to target MPs with certain known holdings in the security of interest. The preferred embodiment also enables users to exclude MPs from notification on the basis of their history of trade breaks (e.g., preventing CTI information from reaching any MP who has broken some quantity of trades in some period of time). The preferred embodiment also enables users to include or exclude specific MPs from notification by name or identification number.

In an alternate preferred embodiment, the user can also target MPs based on more sophisticated analysis performed by the CTI manager on the trading patterns of various users to identify certain correlations or pattern recognition (e.g., buyer of technology stocks, sector rotation, etc.). In another preferred embodiment, the user can exclude MPs based on any identified inappropriate trading behavior such as front running and peg gaming stored in the CTI user database 50. In another alternate embodiment, the dissemination parameters are system-defined and not selectable by the user. In yet another alternate embodiment, the user can choose between defining some or all of the dissemination parameters and using system-defined default parameters.

Referring back to FIG. 26, at step 330 the CTI manager accesses the necessary CTI information from the external data sources 40 and the CTI user database 50 to perform the CTI filtering analysis. At step 340, the CTI manager analyzes CTI information using the dissemination parameters and produces a list of MPs to notify. At step 350, the CTI manager further reduces the MP notification list using the MP notification parameters stored in the CTI user database 50. At step 360, the CTI manager sends notification of the confidential initiating CTI to those MPs for which (1) the MP fits the initiating user's dissemination parameters, and (2) the initiating interest fits the MP's notification parameters. In an alternate embodiment, the notification includes statistics regarding the initiating user's past auctions (e.g., proportion filled, cancel rate, frequency of trade breaks, etc.).

In an alternate preferred embodiment, after step 350 the initiating user is shown a summary of the results of this analysis and is given the option of modifying the dissemination parameters given in step 320 to more accurately tailor/limit the dissemination of confidential CTI. For example, a user can modify dissemination parameters that are too inclusive (e.g., too many MPs have sold 10,000 or more shares of the relevant security today) or exclusive (e.g., there are no MPs who currently have a live order to sell over 50,000 shares). The production of the MP notification list is an iterative process in this embodiment, as the embodiment repeats steps 330-350 until the user is satisfied with the output of the dissemination analysis. The user interaction in this iterative process is performed through interface means that are well known in the art.

FIG. 27 is a flow diagram of the operation of the CTI management system in executing an auction based on the disseminated initiating interest. At step 405, notification of an auction initiated by a CTI is disseminated to targeted MPs in the process depicted in FIG. 26. At step 410, the notified MPs have the option of responding to the notification. In the preferred embodiment, this response is an executable price-limited contra-order sent to the auction server. As with the initiating interest, in the preferred embodiment the price limit can be either a nominal value or pegged to a market price. Alternate embodiments enable the responding MP to peg the price limit to a yet to be determined market value or index. For example, in an alternate embodiment the MP can peg the price limit to the end of day VWAP.

An alternate embodiment enables the notified MPs to simultaneously submit a trading interest and send a message to the initiating user to directly negotiate a trade. Another alternate embodiment enables the notified MPs to respond via a private chat session to directly negotiate a trade. Alternate preferred embodiments also enable the MP to respond in a semi-private negotiation chat session with the initiating user and some or all of the other notified MPs. The system provides the chat and messaging functionality using interactive communication technology as is well known in the art. Alternate preferred embodiments also provide the notified MPs with the initiating user's phone number and/or e-mail address to provide other channels of direct communication.

In step 420, the auction server 60 accumulates orders from the notified MPs. In the preferred embodiment, the duration of the accumulation period is set by the initiating user in the auction parameters communicated in step 310, subject to a system-defined minimum and maximum. This enables users of the CTI system to initiate auctions at any time and limit them to MPs with verified contra-interest, in sharp contrast with the POSIT® system in which users must wait for periodic matching sessions which are not targeted in any way. In alternate embodiments, there is a fixed, system-defined accumulation period. In another preferred embodiment, the system sets the end of the accumulation period, subject to a minimum and maximum. If possible, the system sets the end of the accumulation period to match the end of the accumulation period of any other pending auction so that the auctions can be combined to increase total liquidity. In the preferred embodiment, during the accumulation period, the initiating user and the notified MPs can modify or cancel their orders placed in the auction server. Alternate embodiments place restrictions on this ability. For example, an alternate embodiment does not permit the initiating user to cancel the auction after notified MPs have responded with contra-orders; the initiator is locked into the order once a MP has relied on it to respond with a contra-order.

In step 430, the auction server 60 of a preferred embodiment prioritizes the contra-orders sent by notified MPs. The preferred embodiment creates an execution priority by the following sequential rules: 1) Total matched size—Combinations of contra-orders are chosen which maximize total size executed. 2) Price limit—If competing MP contra-orders would produce equal matched quantities, the auction server will first execute MP contra-orders with more aggressive price limits. 3) Size limit—If competing MP contra-orders have the same (or no) price limit, the auction server will first execute orders with more aggressive size limits. 4) Time of entry—If competing MP contra-orders have the same size limit, the auction server will first execute orders entered earlier.

Alternate embodiments that employ different execution priority rules will be apparent to those skilled in the art. For example, one alternate embodiment ignores the size limit of the contra-order; in another alternate embodiment, where there are no price limits and actual execution is at the market midpoint at the moment of matching, execution priority is by time of entry.

The above description assumes that the initiating interest is the only order on one side, and all orders sent to the auction server by notified MPs are on the contra-side. It is possible that a notified MP responds with an order on the same side as the initiating interest, necessitating an execution priority for that side as well. In a preferred embodiment, the initiating interest has absolute execution priority over subsequent MP orders. This is an additional benefit of the CTI system from the initiating user's perspective. The system enables the initiating user to target dissemination of a confidential trading interest to MPs with a certified contra-interest, to influence the auction timing, and obtain priority in matching over contra-orders placed in response. All orders placed by notified MPs on the same side as the initiating interest are executed only after the initiating interest is filled, and according to the execution priority outlined above. Once again, alternate embodiments that employ different execution priority rules will be apparent to those skilled in the art. Furthermore, in an alternate embodiment, the initiating interest is not granted absolute priority over competing orders subsequently placed by notified MPs, and must compete according to the ordinary execution priority.

In another embodiment, more than one auction can be combined to pool liquidity. In a combined auction, each initiating interest is given exclusivity over contra-orders placed by notified MPs in response to that respective initiating order. By "exclusivity" it is meant that a contra-order placed in response to an initiating order cannot be matched with any other order until the initiating order is filled or canceled. In an alternate preferred embodiment, there is no priority or exclusivity granted to the initiating orders in a combined auction, and all orders compete according to the same execution priority. Alternate embodiments that employ other means of combining auctions will be apparent to those skilled in the art.

In step 440, the auction server executes the orders according to the execution priority set in step 430, all at a price set by the type of auction employed. If there are no MP responses or no trade is possible given the limit prices, the auction is unsuccessful and is terminated. In a preferred embodiment, the auction server employs a midpoint cross auction, where all orders are executed at market midpoint at a certain time. To avoid peg gaming, in the preferred embodiment the execution price is pegged to market at a random time during a ten minute "fuzz period" after the end of the accumulation period. In an alternate embodiment, there is no fuzz period and the auction execution price is determined at a known time at the end of the accumulation period.

Alternate embodiments employ various other auction types. For example, one alternate embodiment employs a "sealed envelope" auction where the limit price on all orders is kept confidential, and a single price is chosen to maximize the size of the matched execution. Another embodiment employs a "private outcry" auction where the initiating user and all notified MP can see all orders and their limit prices as they accumulate, and there is price competition among the responding MPs to trade with the initiating interest. The examples given assume that all orders are executed at the same price; another alternate embodiment employs discriminatory pricing where all orders from responding MPs trade at their limit price. This list is not intended to be exhaustive, as alternate embodiments that employ different auction types will be apparent to those skilled in the art. An alternate embodiment enables the initiating user to choose from more than one different auction type such as those described above.

In step 450, the auction server informs the initiating user and all responding users of the status of their respective orders (i.e., "fill," "partial execution," "canceled," "open," "expired"). In step 460, the auction server of the preferred embodiment enables participants in the auction to communicate with each other and a system administrator to resolve any perceived errors. In a preferred embodiment this communication is via semi-private chat messaging, but alternate embodiments supply telephone contact information. Users can break the trade or negotiate an amendment during a temporary window, after which the trade is final. The use of this window represents a tradeoff between the interest in instant finality to trades and the interest in minimizing the costs and disruption caused by errors. An alternate preferred embodiment does not offer a temporary window to negotiate changes to the executed auction. In step 470, the CTI manager 10 processes the auction activity and updates the CTI user information database to reflect the initiation, response, execution, and trade break activity that took place.

In an alternate preferred embodiment, the auction server 60 also contains a depository of orders not related to an active auction. In this embodiment, any user can place an order in the depository without initiating an auction or invoking CTI targeted notification. These orders are dormant until an auction is initiated in that stock, at which time they are treated by the auction server as a response received from a notified MP in step 410. In an alternate embodiment, the auction server performs a match at periodic intervals without any CTI initiation to clear out the depository of dormant orders. An alternate embodiment performs these auctions only when sufficient dormant interest has accumulated, rather than at defined intervals. In yet another embodiment, these orders are not dormant and are continuously executable subject to their price limit, as in an ECN. Another embodiment enables live execution but with a price limit defined relative to an external price, such as the market midpoint or a certain spread to the end of day VWAP.

In an alternate preferred embodiment, there is no auction server or execution functionality, and the CTI system functions as the targeted information dissemination mechanism depicted in FIG. 25. In this alternate embodiment, after the notification process depicted in FIG. 26, the CTI system does not perform the auction process depicted in FIG. 27, but rather enables the notified MPs to respond to the initiating user via a private or semi-private negotiation chat session as described above. Alternate preferred embodiments also provide the notified MPs with the initiating user's phone number and/or e-mail address to provide other channels of direct communication. After the initiating interest expires or is canceled, the preferred embodiment updates the CTI user database to reflect the initiation and response activity.

In an alternate embodiment, a third-party matching facility, such as Optimark, uses the CTI system to drum up liquidity for a match, then executes the match. For example, a MP may send an order to Optimark and request that a notification be sent out announcing: "There is an order for DELL in Optimark for the next round; please participate." In this embodiment, there is no chat, but there is an address (in the example, Optimark's) where the match is to be executed.

In a further preferred embodiment, the CTI system functions in a manner roughly analogous to a rating service. In this embodiment, the system compares non-certified disseminations of trading activity (such as the disclosures on AutEx+®) to actual certified information, to generate a measure of the overall accuracy of market participants' disclosures. This accuracy rating can be used by other market participants to discriminate among the disclosures on the basis of demonstrated trustworthiness. In another embodiment, the CTI system rates a market participant's compliance with the MP's own stated trading limits. For example, when a MP is negotiating a trade, in order to receive a better price the MP may agree to be bound to a trading cap, to demonstrate that the present order is not part of a much larger trading interest, and that the MP is not simultaneously negotiating similar trades with other MPs. The CTI system can compare the MP's stated trading limits to actual certified information, to generate a measure of the MP's demonstrated trustworthiness. This rating can be used by other MPs to accurately price the likelihood that a negotiated order is part of a much larger order.

In a further embodiment, the CTI system monitors a MP's trading activity for correlation to inappropriate trading behavior, to generate a behavior rating. In this embodiment, the CTI system monitors MP activity for suspected front running. When the system becomes aware that a MP has been notified of a large trading interest (e.g., from an auction notification on the system or through a CTI disseminated over the system), the system monitors the subsequent trading activity of notified MPs to analyze correlation between their trading activity and the revealed CTI. In another embodiment, the CTI system monitors MP activity for suspected peg gaming. The system monitors the trading activity of MPs participating in auctions (on the CTI system or on another system such as POSIT®) in which the price is set relative to a market price such as the midpoint. This trading activity is monitored for negative correlation to represented auction orders (e.g., MPs who sell while a buy order is represented in the auction), which indicates a possible attempt to manipulate the price of the auction execution. In another embodiment, the behavior rating also incorporates information regarding the MP's history of trade breaks.

In all of these "rating service" embodiments, the MP being rated permits the CTI system to use confidential information to rate the MP's past behavior (e.g., disclosures, trade breaks, inappropriate trading activity) in order to receive better prices on future trades or more order flow. This rating information is stored in the CTI user database 50 and can come in many forms, as will be apparent to one skilled in the art. Examples of ratings forms include numerical data (percent divergence between disclosed and actual trading activity or between stated trading cap and actual trading activity), boolean indicators (has the market participant exhibited inappropriate trading behavior or not), or scaled ratings (rating from 1 to n that incorporates information regarding various trading activity scaled according to, for example, recency and frequency of certain activity, degree of correlation to inappropriate behavior, etc.). These examples are not exhaustive, and many representations of the rating data will be apparent to those skilled in the art. In an alternate embodiment, an MP may request that a rating "certificate" be provided to a potential counterparty, to demonstrate to the counterparty the trustworthiness of the MP. The certificate is a certified report based on the MP's market behavior history.

These embodiments provide the described "rating service" function in addition to the auction and execution functionality described in FIG. 27; the ratings can also be used as a dissemination parameter in these embodiments. Alternate embodiments that provide the rating function do not offer the execution functionality and operate as the targeted information dissemination mechanism depicted in FIG. 25; the ratings can be used as a dissemination parameter in these embodiments as well. Further embodiments do not offer execution or targeted dissemination functionality and simply operate as a certification and rating system.

While the embodiments shown and described herein are fully capable of achieving the objects of the subject invention, it is evident that numerous alternatives, modifications, and variations will be apparent to those skilled in the art in light of the foregoing description. These alternatives, modifications, and variations are within the scope of the subject invention, and it is to be understood that the embodiments describe herein are shown only for the purpose of illustration and not for the purpose of limitation.

XIV. MORE EMBODIMENTS

The following should be interpreted as embodiments, not claims.

A. A method comprising:
  receiving a number of first indications, in which each first indications indicates a respective first order, in which each first order defines a respective first trade;
  querying a plurality of participants regarding the first orders;
  after receiving the number of first indications, receiving a second indication of a second order, in which the second order defines a second trade;
  constraining a cancellation of the second order for a period of time;
  querying the plurality of participants regarding the second order; and
  allowing the cancellation of the second order after the period of time if an acceptance to enter into the second trade is not identified during the period of time.

A.1. The method of claim A, further comprising:
  for each of the first orders, determining at least one of:
    that no matching order is stored in an order management system associated with any of the plurality of participants, and
    that none of the plurality of participants accepts an offer to enter into the respective first trade defined by the first order.

A.1.1. The method of claim A.1, in which determining at least one of: that no matching order is stored in the order management system associated with any of the plurality of participants, and that none of the plurality of participants accepts the offer to enter into the respective first trade defined by the first order, includes determining that no matching order is stored in the order management system associated with any of the plurality of participants.

A.1.1.1. The method of claim A.1.1, in which determining that no matching order is stored in the order management system associated with any of the plurality of participants includes determining that no indication that a matching order is stored in the order management system associated with any of the plurality of participants was received.

A.1.2. The method of claim A.1, in which determining at least one of: that no matching order is stored in the order management system associated with any of the plurality of participants, and that none of the plurality of participants accepts the offer to enter into the respective first trade defined by the first order, includes determining that none of the plurality of participants accepts the offer to enter into the respective first trade defined by the first order.

A.1.2.1. The method of claim A.1.2, in which determining that none of the plurality of participants accepts the offer to enter into the respective first trade defined by the first order includes determining that no indication of an acceptance of the offer was received.

A.2. The method of claim A, further comprising determining that each of the first orders have not been fulfilled by a trade by any of the plurality of participants.

A.3. The method of claim A, further comprising determining the number.

A.3.1. The method of claim A.3, in which determining the number includes randomly determining the number.

A.4. The method of claim A, in which each of the number of first indications and the second indication is received from a single submitter.

A.5. The method of claim A, in which the number of first indications are received from a plurality of submitters.

A.6. The method of claim A, in which the time period includes about 5 seconds.

A.7. The method of claim A, in which querying the plurality of participants regarding the first orders includes querying each participant of the plurality of participants to determine if a respective matching order for each first order is stored in a respective order management system associated with the participant and if the participant accepts an offer to enter into the respective first trade.

A.8. The method of claim A, in which querying the plurality of participants regarding the second order includes querying each participant of the plurality of participants to determine if a matching order for the second order is stored in a respective order management system associated with the participant and if the participant accepts an offer to enter into the second trade.

A.9. The method of claim A, further comprising providing an indication of whether the time period has passed to a submitter of the second order.

A.10. The method of claim A, further comprising:
receiving a request to cancel the second order during the time period; and in which constraining the cancellation includes queuing the request for cancellation until after the time period.

A.10.1. The method of claim A.10, further comprising cancelling the second order after the time period.

A.11. The method of claim A, further comprising:
receiving a request to cancel the second order during the first time period;
determining that a matching order of the second order is stored in an order management system associated with a participant of the plurality of participants and the participant accepts an offer to enter into a trade fulfilling at least part of each of the matching order and the second order during the time period; and
facilitating execution of a trade fulfilling at least a portion of each of the second order and the matching order.

A.11.1. The method of claim A.11, in which the request to cancel the second order is received before the determination is made.

A.12. The method of claim A, further comprising determining that no matching order to the second order is stored in an order management system associated with any of the plurality of participants before the end of the time period.

A.13. One or more machine-readable media having stored thereon a plurality of instructions that when executed by one or more processors cause the processors to perform the method of claim A.

A.14. A system comprising:
one or more machine-readable media having stored thereon a plurality of instructions that when executed by one or more processors cause the processors to perform the method of claim A; and
the one or more processors.

A.15. A method comprising submitting an order to the system of claim A.14.

B. A method comprising
receiving a number of first indications, in which each first indications indicates a respective first order, in which each first order defines a respective first trade;
for each of the first orders, determining at least one of:
that no matching order is stored in an order management system associated with any of a plurality of participants, and
that none of the plurality of participants accepts an offer to enter into the respective first trade defined by the first order;
after receiving the number of first indications, receiving a second indication of a second order
constraining a cancellation of the second order for a first period of time; and
allowing the cancellation of the second order after the period of time if an acceptance to enter into the second trade is not identified during the period of time.

B.1. The method of claim B, in which determining at least one of: that no matching order is stored in the order management system associated with any of the plurality of participants, and that none of the plurality of participants accepts the offer to enter into the respective first trade defined by the first order, includes determining that no matching order is stored in the order management system associated with any of the plurality of participants.

B.1.1. The method of claim B.1, in which determining that no matching order is stored in the order management system associated with any of the plurality of participants includes determining that no indication that a matching order is stored in the order management system associated with any of the plurality of participants was received.

B.2. The method of claim B, in which determining at least one of: that no matching order is stored in the order management system associated with any of the plurality of participants, and that none of the plurality of participants accepts the offer to enter into the respective first trade defined by the first order, includes determining that none of the plurality of participants accepts the offer to enter into the respective first trade defined by the first order.

B.2.1. the method of claim B.2, in which determining that none of the plurality of participants accepts the offer to enter into the respective first trade defined by the first order includes determining that no indication of an acceptance of the offer was received.

B.3. The method of claim B, further comprising determining the number.

B.3.1. The method of claim B.3, in which determining the number includes randomly determining the number.

B.4. The method of claim B, in which each of the number of first indications and the second indication is received from a single submitter.

B.5. The method of claim B, in which the number of first indications are received from a plurality of submitters.

B.6. The method of claim B, in which the time period includes about 5 seconds.

B.7. The method of claim B, further comprising querying each participant of the plurality of participants to determine if a respective matching order for each first order is stored in a respective order management system associated with the participant and if the participant accepts an offer to enter into the respective first trade.

B.8. The method of claim B, further comprising querying each participant of the plurality of participants to determine if a respective matching order for the second order is stored in a respective order management system associated with the participant and if the participant accepts an offer to enter into the second trade.

B.9. The method of claim B, further comprising providing an indication of whether the time period has passed to a submitter of the second order.

B.10. The method of claim B, further comprising:
receiving a request to cancel the second order during the time period; and in which constraining the cancellation includes queuing the request for cancellation until after the time period.

B.10.1. The method of claim B.10, further comprising cancelling the second order after the time period.

B.11. The method of claim B, further comprising:
receiving a request to cancel the second order during the time period;
determining that a matching order of the second order is stored in an order management system associated with a participant of the plurality of participants and the participant accepts an offer to enter into a trade fulfilling at least part of each of the matching order and the second order during the time period; and facilitating execution of a trade fulfilling at least a portion of each of the second order and the matching order.

B.11.1. The method of claim B.11, in which the request to cancel the second order is received before the determination is made.

B.12. The method of claim B, further comprising determining that no matching order to the second order is stored in an order management system associated with any of the plurality of participants before the end of the time period.

B.13. One or more machine-readable media having stored thereon a plurality of instructions that when executed by one or more processors cause the processors to perform the method of claim B.

B.14. A system comprising:
one or more machine-readable media having stored thereon a plurality of instructions that when executed by one or more processors cause the processors to perform the method of claim B; and
the one or more processors.

B.15. A method comprising submitting an order to the system of claim B.14.

C. A method comprising:
receiving an indication of an order, in which the order defines a trade of a financial instrument;
determining that no matching order to the order is stored in a respective order management system associated with any of a plurality of participants before an end of a time period;
determining that a cancellation of the order should be constrained during the time period; and
constraining the cancellation of the order during the time period.

C.1. The method of claim C, further comprising allowing the cancellation of the order after the time period.

C.2. The method of claim C, in which determining that the cancellation of the order should be constrained includes determining that a number of orders have been received from a submitter of the order before the indication of the order is received.

C.2.1. The method of claim C.2, in which the number of orders includes orders that were not fulfilled when the indication of the order is received.

C.2.2. The method of claim C.2, in which the number of orders includes orders that at least one of: have no matching orders stored in the order management systems of any of the plurality of participants and have not been accepted by any of the plurality of participants.

C.3. The method of claim C, in which determining the cancellation of the order should be constrained includes making a random determination.

C.4. The method of claim C, further comprising querying each participant of a plurality of participants to determine if a matching order for the order is stored in a respective order management system associated with the participant and if the participant accepts an offer to enter into the second trade.

C.5. The method of claim C, further comprising providing an indication of whether the time period has passed to a submitter of the order.

C.6. The method of claim C, further comprising:
receiving a request to cancel the order during the time period; and in which constraining the cancellation includes queuing the request for cancellation until after the time period.

C.6.1. The method of claim C.6, further comprising cancelling the second order after the time period.

C.7. The method of claim C, further comprising:
receiving a request to cancel the order during the time period;

determining that a matching order of the order is stored in an order management system associated with a participant of the plurality of participants and the participant accepts an offer to enter into a trade fulfilling at least part of each of the matching order and the order during the time period; and
facilitating execution of a trade fulfilling at least a portion of each of the order and the matching order.

C.7.1. The method of claim C.11, in which the request to cancel the order is received before the determination is made.

C.8. The method of claim C, in which determining that no matching order to the order is stored in the order management system associated with any of the plurality of participants before an end of a time period, includes determining that no indication that the matching order is stored in an order management system was received.

C.9. The method of claim C, in which determining that no matching order to the order is stored in the order management system associated with any of the plurality of participants before an end of a time period, includes determining that an indication that no matching order is stored in an order management system from each of the plurality of participants.

C.10. One or more machine-readable media having stored thereon a plurality of instructions that when executed by one or more processors cause the processors to perform the method of claim C.

C.11. A system comprising:
one or more machine-readable media having stored thereon a plurality of instructions that when executed by one or more processors cause the processors to perform the method of claim C; and
the one or more processors.

C.12. A method comprising submitting an order to the system of claim C.11.

What is claimed is:
1. A method comprising:
determining, by a computer system of an electronic marketplace, a number;
counting, by the computer system of the electronic marketplace, the number of received first indications, in which each first indications indicates a respective first order, in which each first order defines a respective first trade;
querying, by the computer system of the electronic marketplace, a plurality of participants regarding the first orders;
after receiving the number of first indications, receiving, by the computer system of the electronic marketplace, a second indication of a second order, in which the second order defines a second trade;
constraining, by the computer system of the electronic marketplace in response to having counted the number of first indications before the second indication, a cancellation of the second order for a period of time;
querying, by the computer system of the electronic marketplace, the plurality of participants for an acceptance to enter into the second trade; and
allowing, by the computer system of the electronic marketplace, the cancellation of the second order after the period of time if an acceptance to enter into the second trade is not identified during the period of time.

2. The method of claim 1, further comprising:
for each of the first orders, determining at least one of:
that no matching order is stored in an order management system associated with any of the plurality of participants, and that none of the plurality of participants accepts an offer to enter into the respective first trade defined by the first order.

3. The method of claim 2, in which determining at least one of: that no matching order is stored in the order management system associated with any of the plurality of participants, and that none of the plurality of participants accepts the offer to enter into the respective first trade defined by the first order, includes determining that no matching order is stored in the order management system associated with any of the plurality of participants.

4. The method of claim 3, in which determining that no matching order is stored in the order management system associated with any of the plurality of participants includes determining that no indication that a matching order is stored in the order management system associated with any of the plurality of participants was received.

5. The method of claim 2, in which determining at least one of: that no matching order is stored in the order management system associated with any of the plurality of participants, and that none of the plurality of participants accepts the offer to enter into the respective first trade defined by the first order, includes determining that none of the plurality of participants accepts the offer to enter into the respective first trade defined by the first order.

6. The method of claim 5, in which determining that none of the plurality of participants accepts the offer to enter into the respective first trade defined by the first order includes determining that no indication of an acceptance of the offer was received.

7. The method of claim 1, further comprising determining that each of the first orders has not been fulfilled by a trade involving any of the plurality of participants and in which constraining the cancellation includes constraining the cancellation in response to determining that each of the first orders has not been fulfilled by the trade.

8. The method of claim 1, in which determining the number includes randomly determining the number.

9. The method of claim 1, in which each of the number of first indications and the second indication is received from a single submitter, and in which the number includes a number specific to the single submitter.

10. The method of claim 1, in which the number of first indications are received from a plurality of submitters.

11. The method of claim 1, in which the time period includes about 5 seconds.

12. The method of claim 1, in which querying the plurality of participants regarding the first orders includes querying each participant of the plurality of participants to determine if a respective matching order for each first order is stored in a respective order management system associated with the participant and if the participant accepts an offer to enter into the respective first trade.

13. The method of claim 1, in which querying the plurality of participants regarding the second order includes querying each participant of the plurality of participants to determine if a matching order for the second order is stored in a respective order management system associated with the participant and if the participant accepts an offer to enter into the second trade.

14. The method of claim 1, further comprising providing an indication of whether the period of time has passed to a submitter of the second order.

15. The method of claim 1, further comprising:
receiving a request to cancel the second order during the period of time; and in which constraining the cancellation includes queuing the request for cancellation until after the period of time.

16. The method of claim 15, further comprising cancelling the second order after the period of time.

17. The method of claim 1, further comprising:
receiving a request to cancel the second order during the period of time;
determining that a matching order of the second order is stored in an order management system associated with a participant of the plurality of participants and the participant accepts an offer to enter into the second trade fulfilling during the period of time; and
facilitating execution of the second trade.

18. The method of claim 17, in which the request to cancel the second order is received before the determination is made.

19. The method of claim 1, further comprising determining that no matching order to the second order is stored in an order management system associated with any of the plurality of participants before the end of the time period.

20. The method of claim 1, in which querying the plurality of participants regarding the second order includes identifying the period of time to at least some of the plurality of participants.

21. An apparatus comprising:
one or more non-transitory machine-readable media having stored thereon a plurality of instructions that when executed by one or more processors cause the processors to:
determine a number;
count the number of received first indications, in which each first indications indicates a respective first order, in which each first order defines a respective first trade;
query a plurality of participants of a marketplace regarding the first orders;
after receiving the number of first indications, receive a second indication of a second order, in which the second order defines a second trade;
constrain, in response to having counted the number of first indications before the second indication, a cancellation of the second order for a period of time;
query the plurality of participants for an acceptance to enter into the second trade; and
allow the cancellation of the second order after the period of time if an acceptance to enter into the second trade is not identified during the period of time.

22. The apparatus of claim 21, further comprising the one or more processors.

23. A method comprising
determining, by a computer system of an electronic marketplace, a number;
counting, by the computer system of the electronic marketplace, the number of received first indications, in which each first indications indicates a respective first order, in which each first order defines a respective first trade;
for each of the first orders, determining, by the computer system of the electronic marketplace, at least one of:
that no matching order is stored in an order management system associated with any of a plurality of participants, and
that none of the plurality of participants accepts an offer to enter into the respective first trade defined by the first order;

after receiving the number of first indications, receiving, by the computer system of the electronic marketplace, a second indication of a second order constraining, by the computer system of the electronic marketplace in response to having counted the number of first indications before the second indication, a cancellation of the second order for a first period of time; and allowing, by the computer system of the electronic marketplace, the cancellation of the second order after the period of time if an acceptance to enter into the second trade is not identified during the period of time.

24. The method of claim 23, further comprising querying each participant of the plurality of participants to determine if a respective matching order for each first order is stored in a respective order management system associated with the participant and if the participant accepts an offer to enter into the respective first trade.

* * * * *